(12) United States Patent
Schultz et al.

(10) Patent No.: US 10,489,376 B2
(45) Date of Patent: *Nov. 26, 2019

(54) COMPUTER-IMPLEMENTED METHOD OF ASSESSING THE QUALITY OF A DATABASE MAPPING

(71) Applicant: Colorquick, L.L.C., Pennsauken, NJ (US)

(72) Inventors: Daniel E. Schultz, Providence, RI (US); Daniel J. Freiman, Wayne, PA (US); Mark A. Weiss, Rydal, PA (US)

(73) Assignee: Mark A. Weiss, Rydal, PA (US)

( * ) Notice: Subject to any disclaimer, the term of this patent is extended or adjusted under 35 U.S.C. 154(b) by 761 days.

This patent is subject to a terminal disclaimer.

(21) Appl. No.: 14/246,616

(22) Filed: Apr. 7, 2014

(65) Prior Publication Data

US 2014/0279935 A1   Sep. 18, 2014

Related U.S. Application Data

(63) Continuation of application No. 12/126,106, filed on May 23, 2008, now Pat. No. 8,694,518.

(60) Provisional application No. 60/944,063, filed on Jun. 14, 2007.

(51) Int. Cl.
| | |
|---|---|
| *G06F 17/30* | (2006.01) |
| *G06F 7/00* | (2006.01) |
| *G06F 16/23* | (2019.01) |
| *G06F 16/25* | (2019.01) |

(52) U.S. Cl.
CPC ......... *G06F 16/2365* (2019.01); *G06F 16/25* (2019.01)

(58) Field of Classification Search
USPC .......................................... 707/687, 758, 802
See application file for complete search history.

(56) References Cited

U.S. PATENT DOCUMENTS

| | | | |
|---|---|---|---|
| 5,845,303 A | 12/1998 | Templeman | |
| 5,895,477 A | 4/1999 | Orr et al. | |
| 6,199,082 B1 | 3/2001 | Ferrel et al. | |
| 6,631,497 B1 * | 10/2003 | Jamshidi | G06F 17/246 |
| | | | 707/E17.006 |
| 6,785,689 B1 * | 8/2004 | Daniel | G06F 17/30292 |
| | | | 707/754 |
| 6,996,589 B1 * | 2/2006 | Jayaram | G06F 17/30569 |

(Continued)

OTHER PUBLICATIONS

Oracle® Database Utilities 10g Release 2 (10.2) B14215-01 Jun. 2005.*
Oracle7™ Server Utilities, Release 7.3, Feb. 1996, Oracle®.*

*Primary Examiner* — Kuen S Lu
(74) *Attorney, Agent, or Firm* — Panitch Schwarze Belisario & Nadel LLP

(57) ABSTRACT

A computer-implemented method is provided of assessing the quality of a database mapping. Fields of a source file are mapped to fields of a target database using a database mapping. A sampled subset of the records in the source file are converted to records in the target database using the field mappings, wherein the quality of the records in the source file is presumed to be high. A data validator is selected from a plurality of different data validators, wherein the selection is made based at least in part on the purpose of the target database. A sampled subset of the converted records are tested with the selected data validator to determine the quality of the database mapping.

16 Claims, 93 Drawing Sheets

(56) References Cited

U.S. PATENT DOCUMENTS

| | | | |
|---|---|---|---|
| 7,299,240 B1* | 11/2007 | Crozier | G06F 17/30569 |
| 7,373,593 B2 | 5/2008 | Uchida | |
| 7,546,286 B2* | 6/2009 | Dickinson | G06F 17/246 |
| 2002/0174098 A1* | 11/2002 | Wu | G06F 17/30595 |
| 2003/0110158 A1* | 6/2003 | Seals | G06F 17/30864 |
| 2003/0217069 A1* | 11/2003 | Fagin | G06F 17/30569 |
| 2005/0050068 A1* | 3/2005 | Vaschillo | G06F 17/30569 |
| 2005/0102130 A1* | 5/2005 | Quirk | G06F 17/28 704/4 |
| 2005/0209876 A1* | 9/2005 | Kennis | G06F 17/30569 726/1 |
| 2005/0246390 A1* | 11/2005 | House | G06F 17/30312 |
| 2007/0038670 A1 | 2/2007 | Dettori et al. | |
| 2007/0073526 A1* | 3/2007 | Maebayashi | G06Q 10/06 703/8 |
| 2007/0203923 A1* | 8/2007 | Thomas | G06F 17/30917 |
| 2008/0140694 A1* | 6/2008 | Mangla | G06F 17/30569 |
| 2008/0215640 A1* | 9/2008 | Hartz | G06F 17/30876 |

* cited by examiner

*Figure 1*

QuickMail

You are logged in as: qmavltest          Logout

Active Primary List: *(no active list selected)*

List Management

- Upload a New List
- Browse / Search Lists
- Edit Description / Usage / Sharing
- Edit List Items
- Multi List Operations

- Filter List          *(creates a new asset)*
- Manage Data Connector Library
- DPV Validation
- Remove Duplicate Records

Postal Sorting

- Sort a List with an Existing Project          New Sort          Re-Sort
- Sort a List with No Related Project

Reports and Response Tracking

*Figure 2*

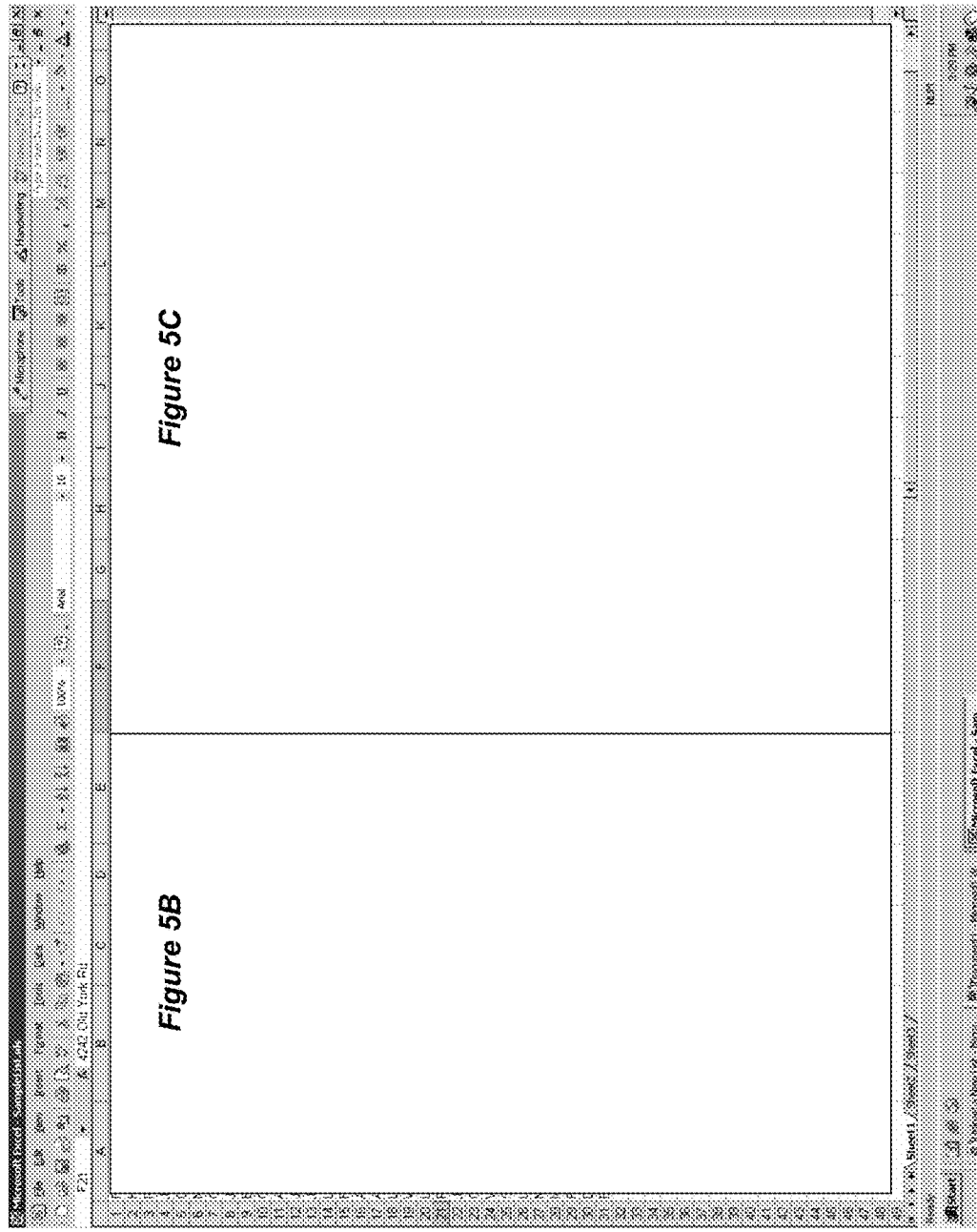

|   | A | B | C | D | E |
|---|---|---|---|---|---|
| 1 | Firstname | Lastname | Nickname | Title | Company |
| 2 | Henry | Angevin | Henry II | King | England |
| 3 | Richard | Angevin | the Lionhearte | King | England |
| 4 | John | Angevin | Prince John | King | England |
| 5 | Charles | Martel | the Hammer | Major Dom | France |
| 6 | Marc | Bohemund |  | Prince | Antioch |
| 7 | Charles | Magna | Charlemagne | King | France |
| 8 | Joan | D'Arc | Joan of Arc | General | France |
| 9 | Eleanor | Aquitaine |  | Queen | France/England |
| 10 | Cid | Velasques | El Cid | Lord | Spain |
| 11 | Anna | Comnena |  | Princess | Byzantium |
| 12 | John | Chrysanthus |  | Bishop | Damascus |
| 13 | John | Wycliff |  | Preacher | England |
| 14 | Lorenzo | DeMedici | the Magnificer | Banker | Florence |
| 15 | Frederick | Barbarosa |  | Emperor | Germany |
| 16 | Alfred | Wessex | the Great | King | England |
| 17 | Alexius | Commenus |  | Emperor | Byzantium |
| 18 | Lewis | Germanus | the German | Emperor | Germany |
| 19 | William | Rufus |  | King | England |
| 20 | Louis | Bourbon | the Pious | King | France |
| 21 | Robert | Bruce | the Bruce | King | Scotland |
| 22 | John | Baliol |  | King | Scotland |
| 23 | Owen | Glendower |  | King | Wales |
| 24 | William | Wallace |  | Lord | Scotland |
| 25 | Sala | Al-Adin | Saladin | Sultan | Middle East |
| 26 | Lief | Erikson |  | Explorer | Greenland |
| 27 | Magnus | Magnerson |  | King | Norway |
| 28 | Ivan | Romanov | the Terrible | Grand Prin | Russia |
| 29 | Francis | Assissi |  | Priest | Rome |
| 30 | Dante | Alegheri |  | Writer | Florence |
| 31 | Edward | Longshanks |  | King | England/Scotland |
| 32 |  |  |  |  |  |
| 33 |  |  |  |  |  |
| 34 |  |  |  |  |  |
| 35 |  |  |  |  |  |
| 36 |  |  |  |  |  |
| 37 |  |  |  |  |  |

*Figure 5B*

| Address1 | Address2 | City | State | ZIP | Telephone | e-mail | Salesman | Customer Number |
|---|---|---|---|---|---|---|---|---|
| 455 W. 17th Street | | Philadelph | PA | 19128 | 215-555-96 | ha@ek.org | Bill | 57571 |
| 456 W. 17th Street | | Philadelph | PA | 19128 | 215-555-96 | ca@ek.org | Bill | 57572 |
| 457 W. 17th Street | | Philadelph | PA | 19128 | 215-555-95 | ja@ek.org | Bill | 57573 |
| 388 E. Kaighn Ave. | | Cherry Hill | NJ | 8002 | 610-555-9 | cm@fk.org | Frank | 57574 |
| 422 E. Harrison Ave. | | Glenside | PA | 19038 | 215-555-1 | fmb@ap.or | Frank | 57575 |
| 388 E. Kaighn Ave. | | Cherry Hill | NJ | 8002 | 610-555-44 | cm@fk.org | Frank | 57576 |
| 218 Bedford Ave. | | Cherry Hill | NJ | 8002 | 610-555-44 | jd@fg.org | Frank | 57577 |
| 457 W. 17th Street | | Philadelph | PA | 19128 | 215-555-86 | ea@fek.org | Frank | 57578 |
| 466 N. 47th St. | | Pennsauke | NJ | 8109 | 610-555-96 | ee@sr.org | Frank | 57579 |
| 955 Limekiln Pk. | | Glenside | PA | 19038 | 610-555-97 | ac@lp.org | Frank | 57580 |
| 755 Glenside Ave. | | Glenside | PA | 19038 | 267-555-97 | jc@oc.org | Frank | 57581 |
| 4245 Cottman Ave. | | Philadelph | PA | 19128 | 215-555-54 | tw@ch.org | Frank | 57582 |
| 222 Westfield Ave. | | Pennsauke | NJ | 8109 | 610-555-01 | lm@fl.org | Rick | 57583 |
| 332 Market St. | | Camden | NJ | 8101 | 610-555-02 | fb@hre.org | Rick | 57584 |
| 457 W. 17th Street | | Philadelph | PA | 19128 | 215-555-01 | aw@vk.org | Rick | 57585 |
| 955 Limekiln Pk. | | Glenside | PA | 19038 | 215-555-02 | ab@be.org | Rick | 57586 |
| 233 Market St. | | Camden | NJ | 8101 | 610-555-03 | lg@gk.org | Rick | 57587 |
| 457 W. 17th Street | | Philadelph | PA | 19128 | 215-555-05 | cw@ek.org | Harry | 57588 |
| 388 E. Kaighn Ave. | | Cherry Hill | NJ | 8002 | 215-555-74 | lb@fk.org | Harry | 57589 |
| 4242 Old York Rd. | | Abington | PA | 19001 | 646-555-96 | nth@sk.org | Harry | 57590 |
| 4243 Old York Rd. | | Abington | PA | 19002 | 646-555-85 | jb@sk.org | Harry | 57591 |
| 256 Jericho Rd. | | Abington | PA | 19003 | 267-555-01 | og@vk.org | Harry | 57592 |
| 858 Susquehanna Ave. | | Jenkintown | PA | 19004 | 610-555-96 | ww@sr.org | Harry | 57593 |
| 653 Laverock Rd | | Jenkintown | PA | 19038 | 610-555-32 | saa@ml.o | Harry | 57594 |
| 779 Township Line Rd. | | Jenkintown | PA | 19046 | 267-555-41 | le@ve.org | Harry | 57595 |
| 865 Greenwood Ave. | | Jenkintown | PA | 19046 | 215-555-82 | mm@nm.c | Harry | 57596 |
| 325 West Rd | | Jenkintown | PA | 19046 | 267-555-97 | m@rp.org | Kelly | 57597 |
| 263 Washington Ave. | | Pennsauke | NJ | 8109 | 610-555-96 | fa@cr.org | Kelly | 57598 |
| 755 Westfield Ave. | | Pennsauke | NJ | 8109 | 267-555-86 | da@mw.or | Kelly | 57599 |
| 457 W. 17th Street | | Philadelph | PA | 19128 | 267-555-86 | el@ek.org | Kelly | 57510 |

*Figure 5C*

Edit Metadata for this Data Asset

Original File Name: SampleList.xls

Description:

Comment:

Licensing Options for Mailing Lists
- ⦿ Unlimited Use
- ○ Use until Expiration Date    -- month --  -- day --  -- year --
- ○ Maximum Number of Uses    0
- ○ Use until Expration Date OR Maximum Number of Uses
  (fill-in date and number of uses above)

Usage Rights for Mailing Lists
- ☐ Disable Edits
- ☐ Disable Viewing
- ☐ Disable Sharing
- ☐ Destroy On Expiration *(this will disable the ability to track responses and some statistical reports)*
- ☐ Authorization Required to Download
- ☐ Disable Downloads

Sharing Preferences for this Asset
- ☐ Allow Use by All QuickMail Users

This Email Domain

This Email Address **

This User ID **

*\** Separate Multiple Users with a Semi-Colon or Comma*

[Cancel]  [Save and Continue]

*Figure 6*

≡QuickMail

Edit Metadata for this Data Asset

Original File Name: SampleList.xls

Description: Middle Age Notable Figures

Comment: This is a sample list

Licensing Options for Mailing Lists
- ⦿ Unlimited Use
- ○ Use until Expiration Date — month -- / -- day -- / -- year --
- ○ Maximum Number of Uses [0]
- ○ Use until Expration Date OR Maximum Number of Uses
  (fill-in date and number of uses above)

Usage Rights for Mailing Lists
- ☐ Disable Edits
- ☐ Disable Viewing
- ☐ Disable Sharing
- ☐ Destroy On Expiration *(this will disable the ability to track responses and some statistical reports)*
- ☐ Authorization Required to Download
- ☐ Disable Downloads

Sharing Preferences for this Asset
- ☐ Allow Use by All QuickMail Users

This Email Domain
This Email Address **
This User ID **

** Separate Multiple Users with a Semi-Colon or Comma

[Cancel] [Save and Continue]

*Figure 7*

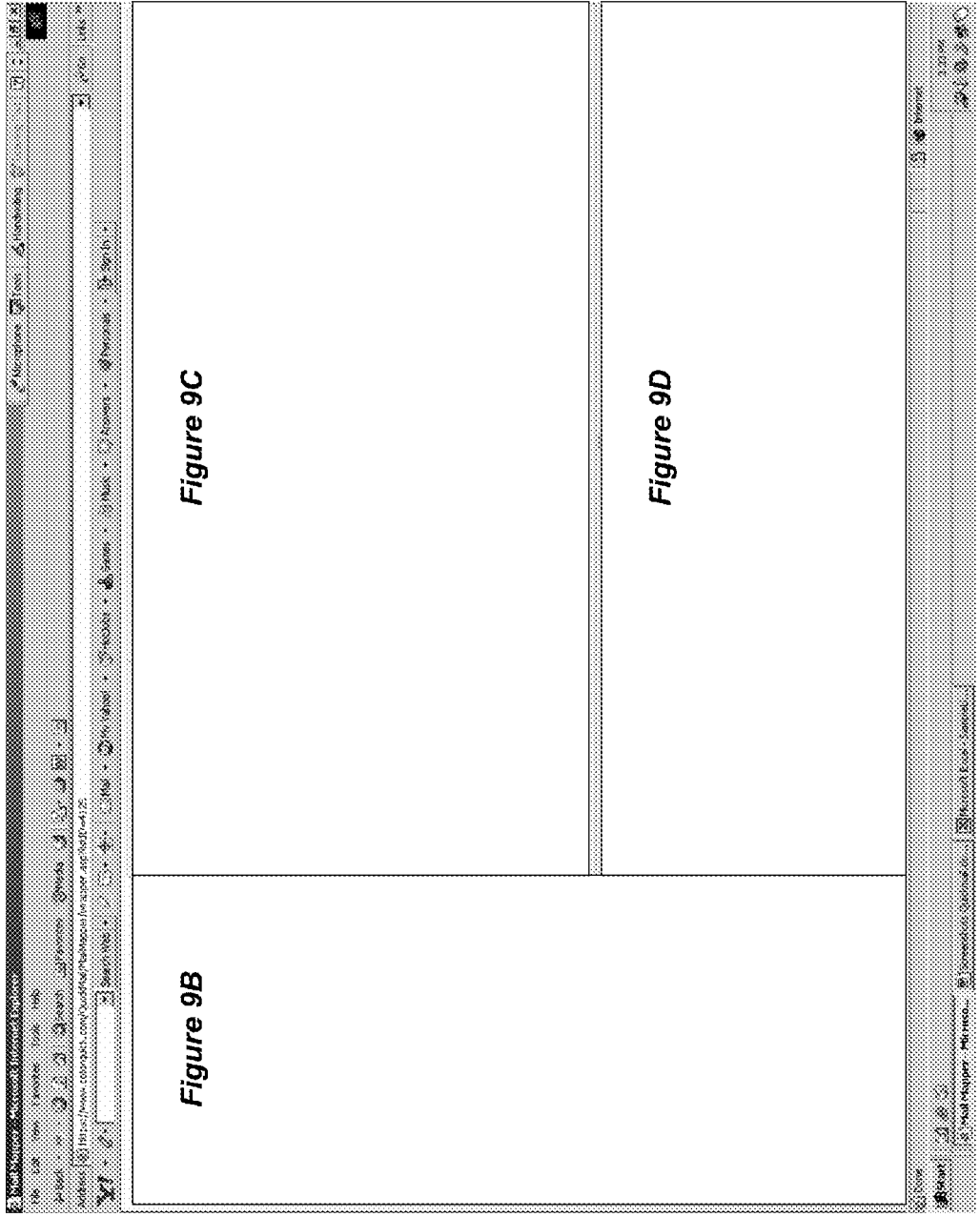

WELCOME TO LIST MAPPER!
This interview process has been created to help you map your items. You may close this interview at any time to manually map your list or use the advanced functionality of this program. When you are done, click the 'Finish' button at the bottom of your screen. Click the 'Next' button to start your interview.

[ Previous ]  [ Close Interview ]  [ Begin Interview ]

UPLOADED FILE COMLUMNS

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57371 |

[ Previous Record ]  [ Next Record ]
[ Back ]  [ Finish ]

*Figure 9B*

QUICKMAIL DATABASE FIELDS

| QuickMail Field Name | Uploaded File Field | Function | Preview | Examples |
|---|---|---|---|---|
| Job Title | | functions ▼ | | (Chairman, VP of Sales, etc.) |
| Honorific | | functions ▼ | | (Mr., Mrs., Dr., Sir, etc) |
| First Name | 0 | functions ▼ | Henry | |
| Last Name | 1 | functions ▼ | Angevin | |
| Suffix | | functions ▼ | | (Jr., Sr., M.D., etc.) |
| Mail Attention | | functions ▼ | | |

*Figure 9C*

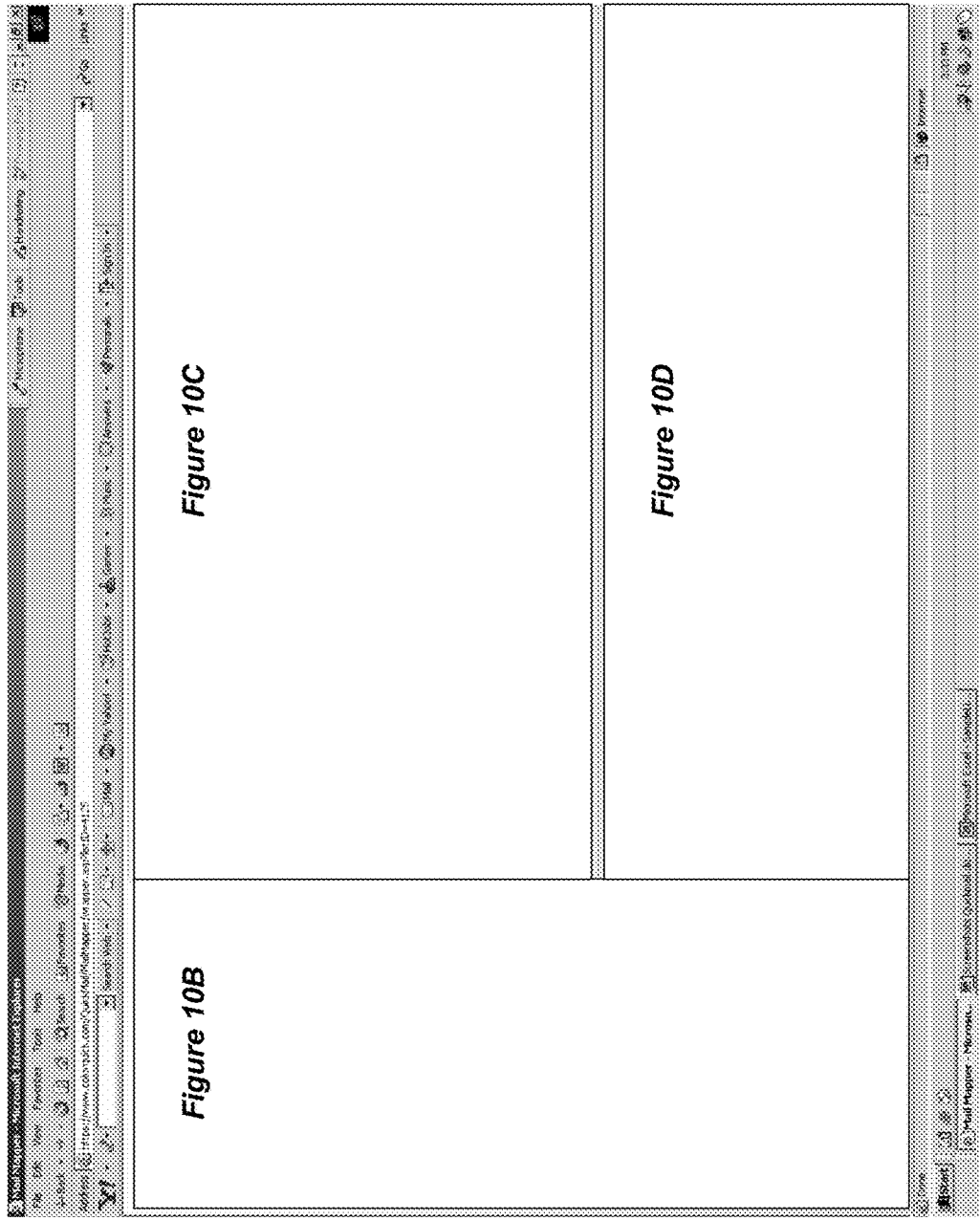

If available, select the field below that contains Job Title of the addressee and any function to be applied to it.

| | |
|---|---|
| Selected Field | Title |
| Applied Functions | functions ▼ |
| Preview | King |
| Examples | (Chairman, VP of Sales, etc.) |

[Previous]  [Close Interview]  [Next]

UPLOADED FILE COMLUMNS

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

[Previous Record]  [Next Record]

[Back]  [Finish]

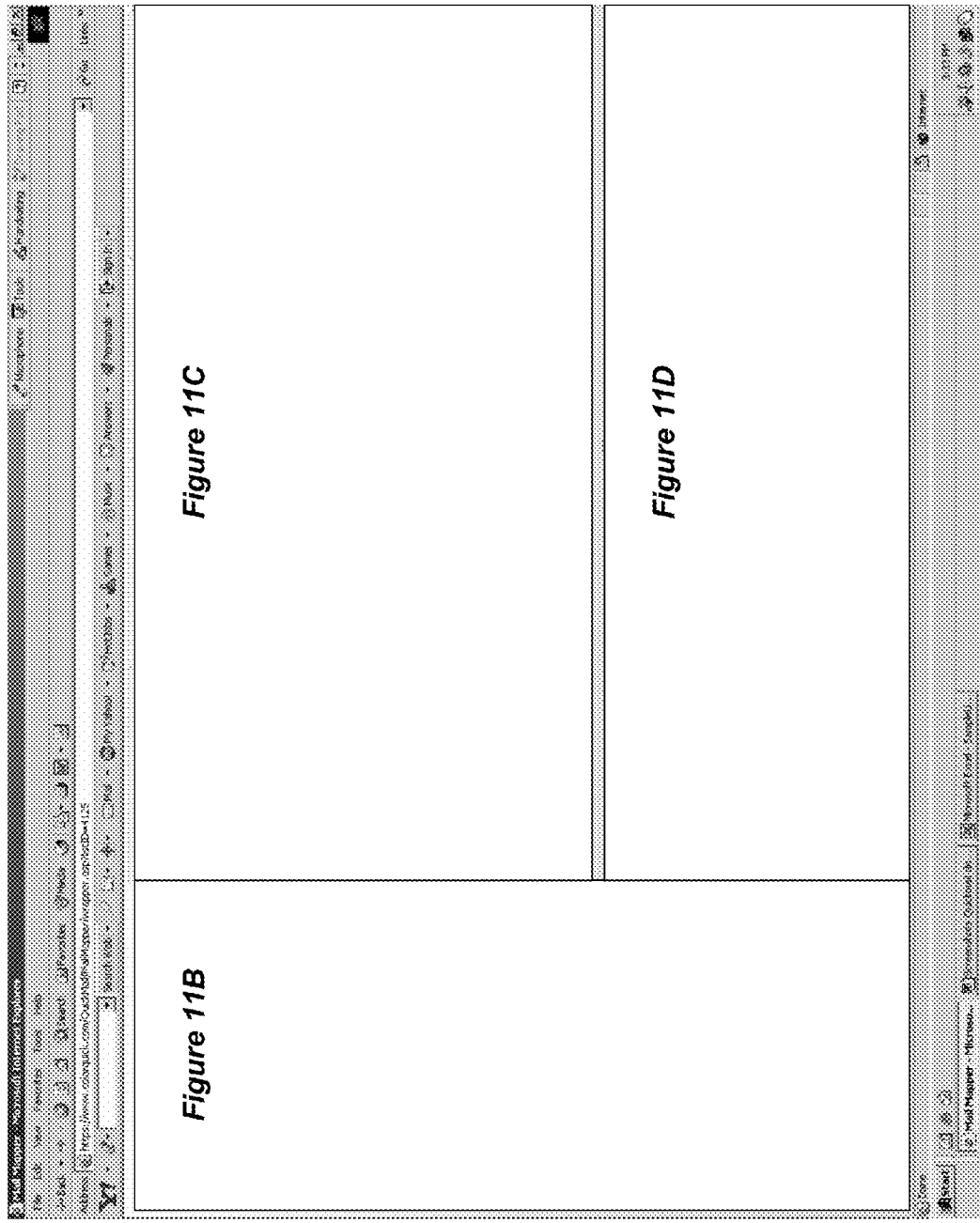

If available, select the field below that contains
Job Title of the addressee and any function to be
applied to it.

| | |
|---|---|
| Selected Field | Title |
| Applied Functions | functions ▼ |
| | Proper Case |
| Preview | • UPPER CASE |
| Examples | lower case  les, etc.) |

[ Previous ]  [ Close Interview ]  [ Next ]

UPLOADED FILE COMLUMNS

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

[ Previous Record ]     [ Next Record ]
Back                    Finish

If available, select the field below that contains
Job Title of the addressee and any function to be
applied to it.

| | |
|---|---|
| Selected Field | Title |
| Applied Functions | functions ▼ |
| Preview | KING |
| Examples | (Chairman, VP of Sales, etc.) |

[ Previous ]   [ Close Interview ]   [ Next ]

UPLOADED FILE COMLUMNS

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

[ Previous Record ]   [ Next Record ]
[ Back ]   [ Finish ]

*Figure 12B*

QUICKMAIL DATABASE FIELDS

| QuickMail Field Name | Uploaded File Field | Function | Preview | Examples |
|---|---|---|---|---|
| Job Title | Title | functions ▼ | KING | (Chairman, VP of Sales, etc.) |
| Honorific | 0 | functions ▼ | | (Mr., Mrs., Dr., Sir, etc) |
| First Name | 1 | functions ▼ | Henry | |
| Last Name | | functions ▼ | Angevin | |
| Suffix | | functions ▼ | | (Jr., Sr., M.D., etc) |
| Mail Attention | | | | |

*Figure 12C*

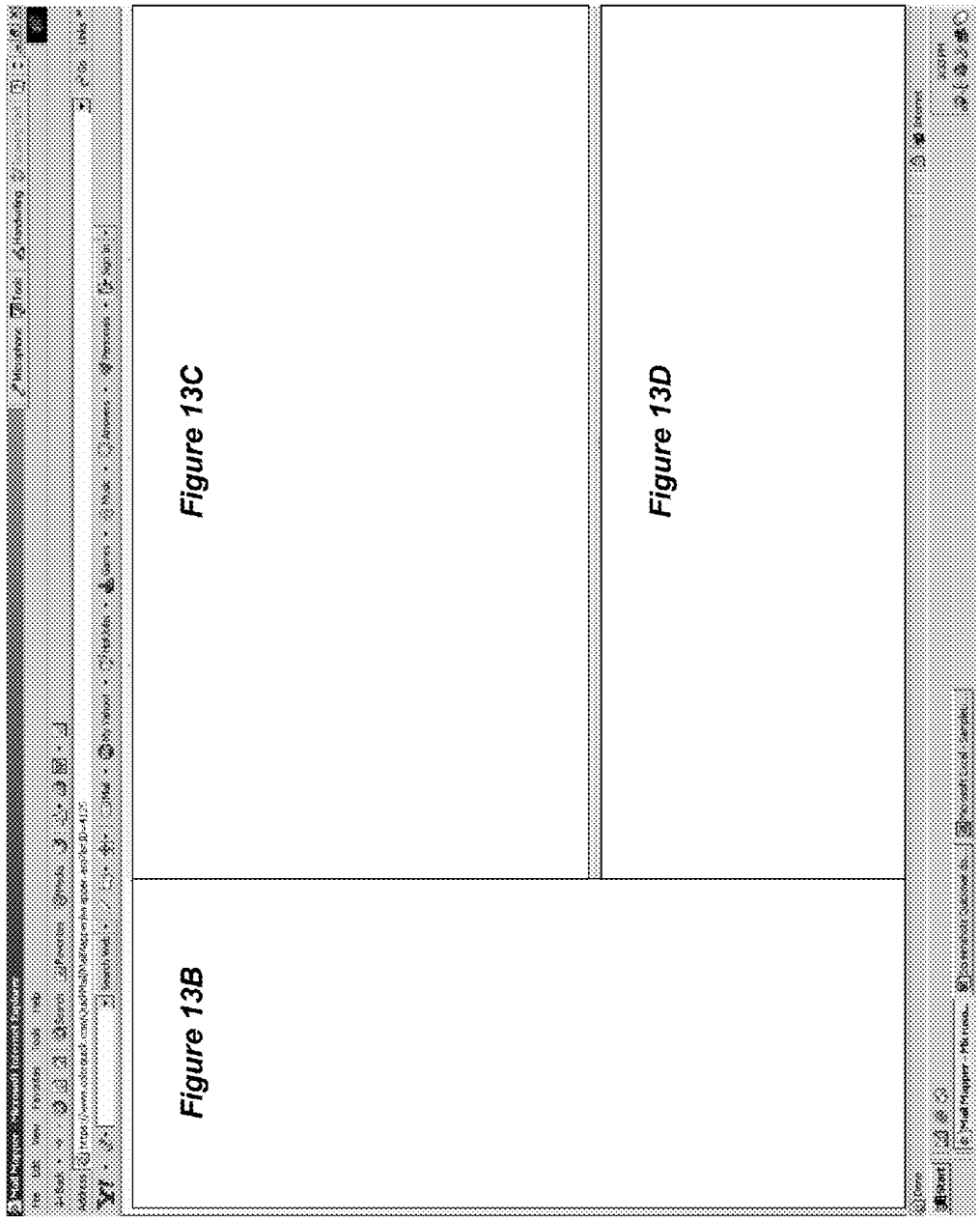

If available, select the field below that contains
<u>First Name</u> of the addressee and any function
to be applied to it.

| | |
|---:|---|
| Selected Field | Firstname |
| Applied Functions | functions ▼ |
| Preview | Henry |
| Examples | |

[ Previous ]  [ Close Interview ]  [ Next ]

UPLOADED FILE COMLUMNS

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

[ Previous Record ]  [▓▓▓]  [ Next Record ]
[ Back ]                              [ Finish ]

QUICKMAIL DATABASE FIELDS

| QuickMail Field Name | Uploaded File Field | Function | Preview | Examples |
|---|---|---|---|---|
| Job Title | Title | functions | KING | (Chairman, VP of Sales, etc.) |
| Honorific | | functions | | (Mr., Mrs., Dr., Sir, etc) |
| First Name | Firstname | functions | Henry | |
| Last Name | 1 | functions | Angevin | |
| Suffix | | functions | | (Jr., Sr., M.D., etc) |
| Mail Attention | | functions | | |

Personal | Address | Contact | User Fields

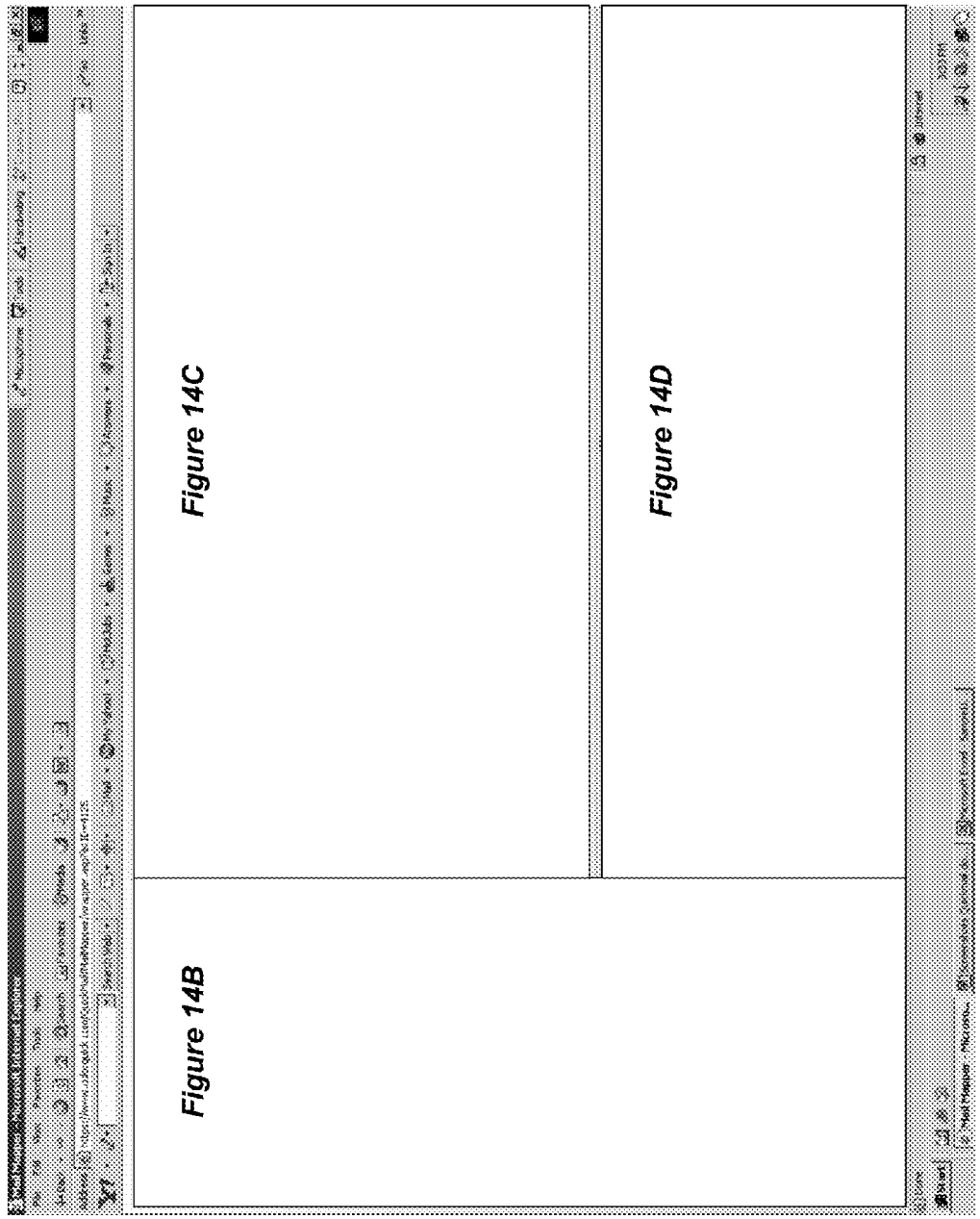

*Figure 14B*

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

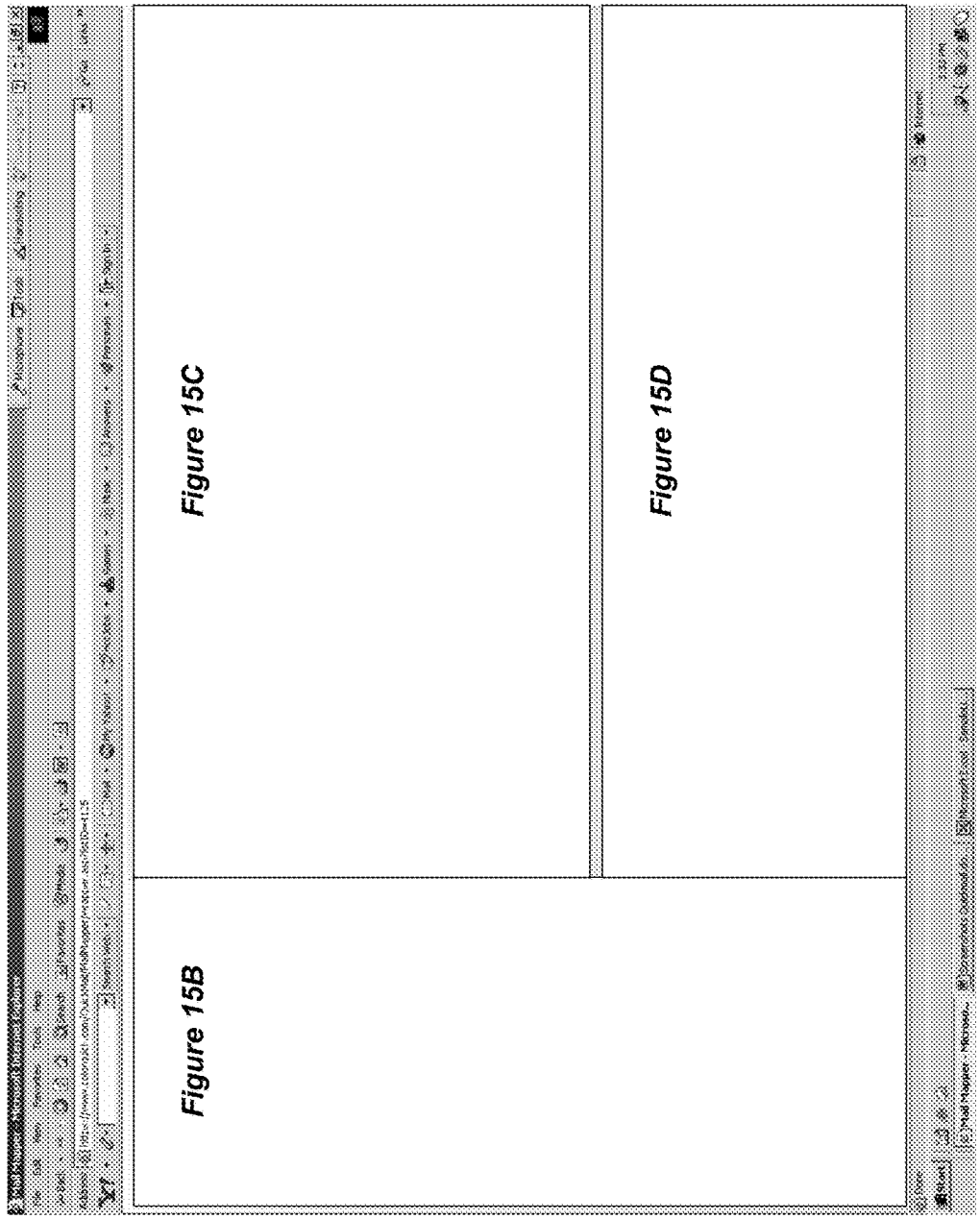

| Show DataConnector Library | Show DPV Validator | Show Interview |

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 485 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

Previous Record    Next Record
Back    Finish

*Figure 15B*

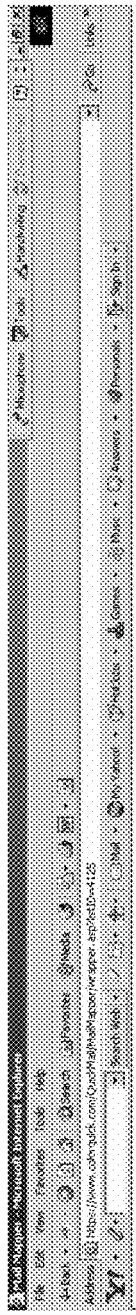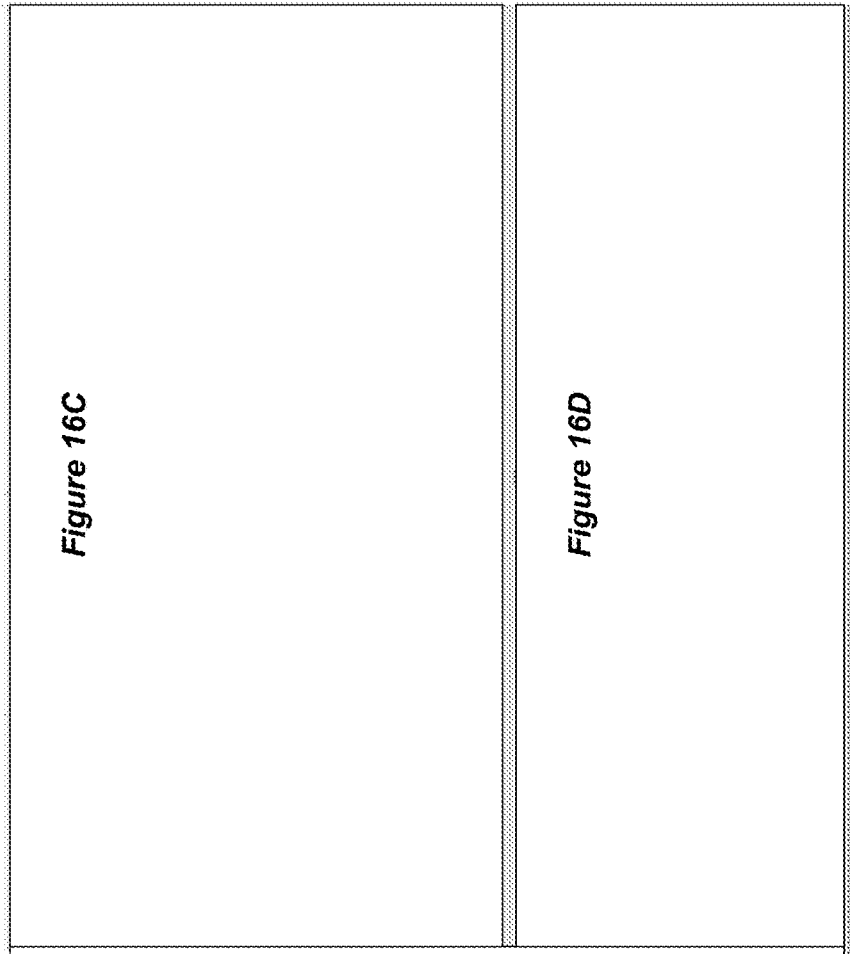
*Figure 16B*
*Figure 16C*
*Figure 16D*
*Figure 16A*

| Show DataConnector Library | Show DPV Validator | Show Interview |

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

Previous Record | Next Record
Back | Finish

*Figure 16B*

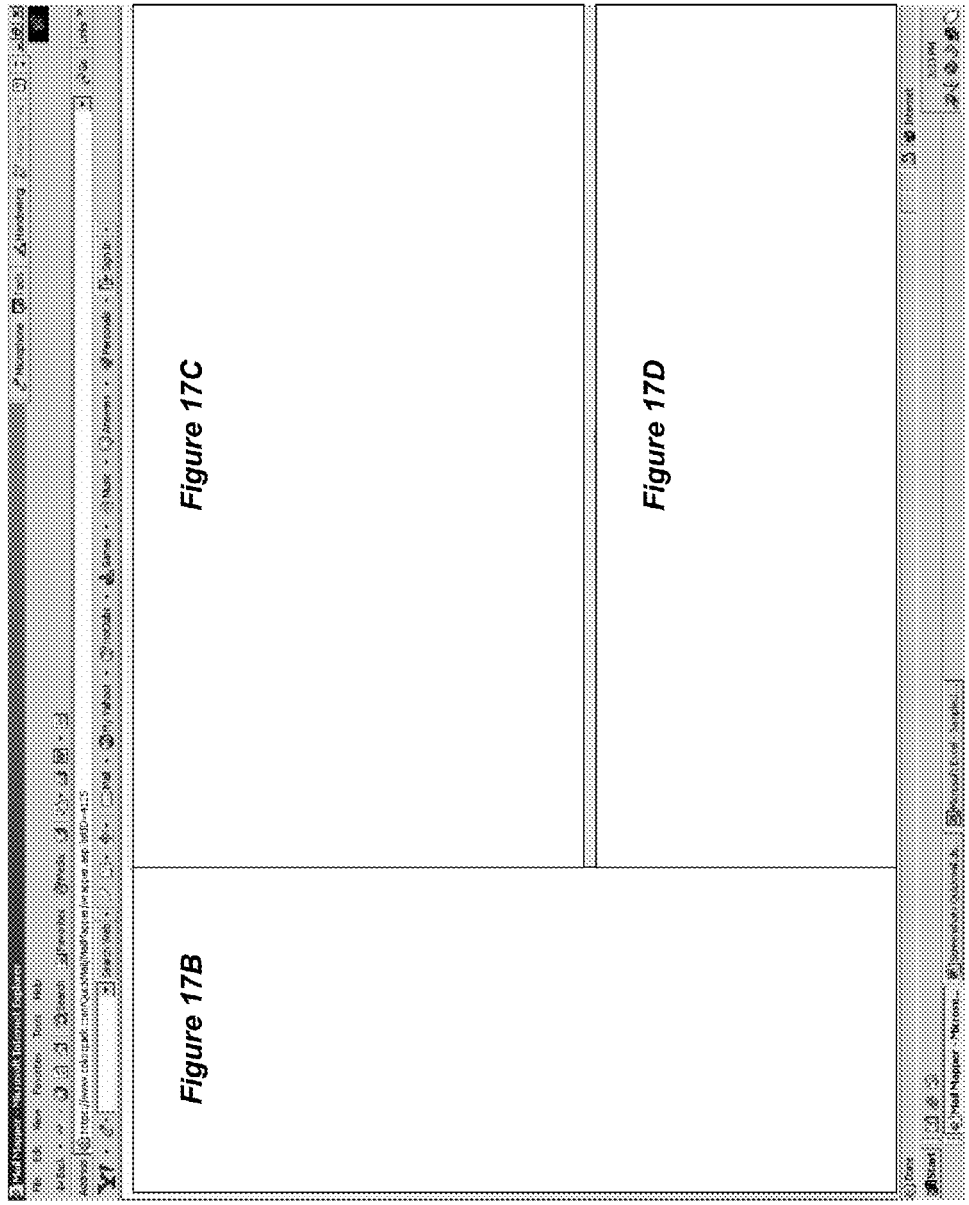

| Show DataConnector Library | Show DPV Validator | Show Interview |

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

Previous Record                Next Record

Back                           Finish

| Show DataConnector Library | Show DPV Validator | Show Interview |

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19129 |
| Telephone | 215-555-9595 |
| e-mail | ha@ek.org |
| Salesman | Bill |
| Customer Number | 57571 |

Previous Record | Next Record
Back | Finish

| Show DataConnector Library | Show DPV Validator | Show Interview |

UPLOADED FILE COLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19129 |
| Telephone | 215-555-9595 |
| e-mail | ha@ek.org |
| Salesman | Bill |
| Customer Number | 57571 |

Previous Record | Next Record
Back | Finish

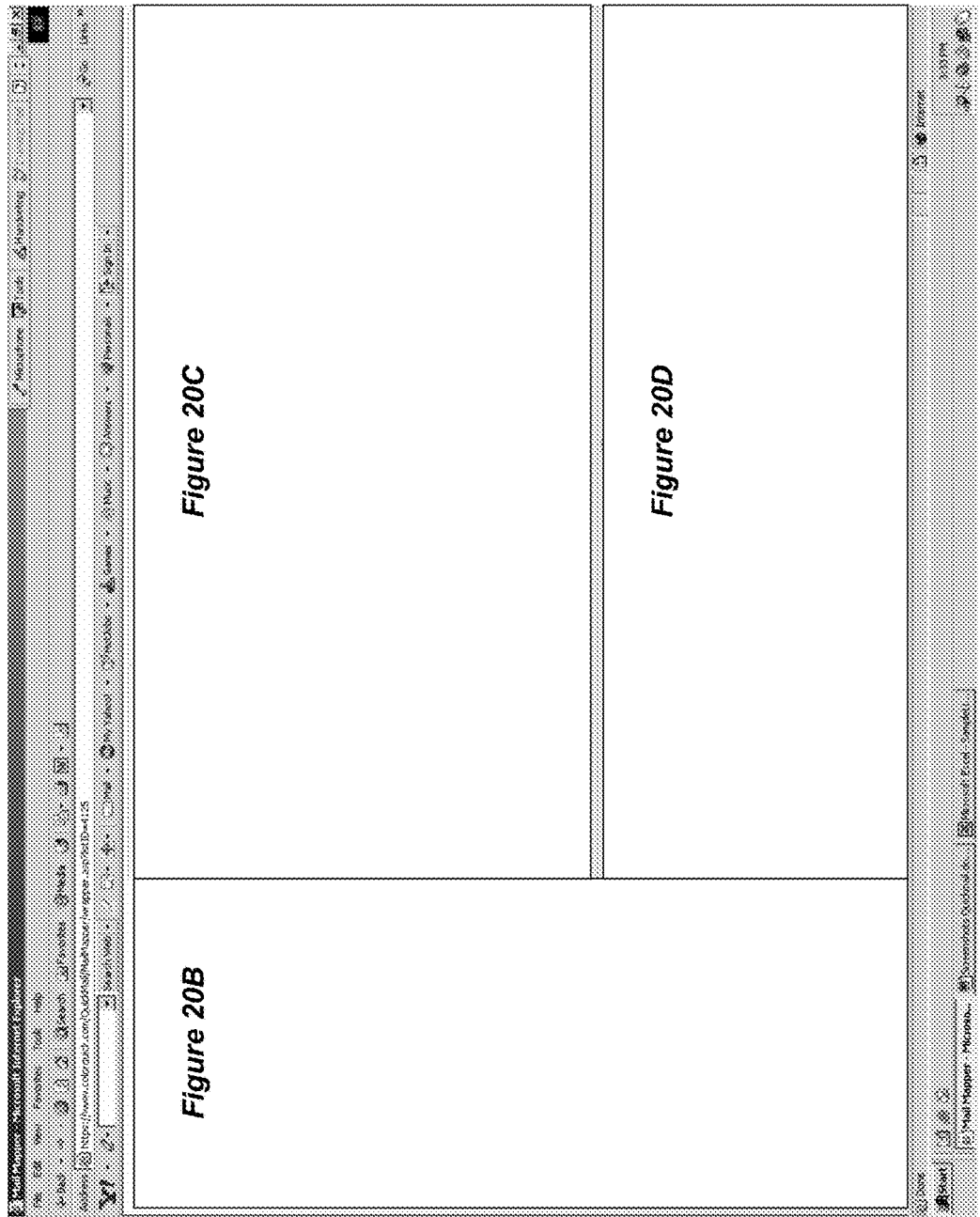

| Show DataConnector Library | Show DPV Validator | Show Interview |

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

| Previous Record | | Next Record |
| Back | | Finish |

| Field Name | Preview Value (Record 1) |
|---|---|
| Firstname | Henry |
| Lastname | Angevin |
| Nickname | Henry II |
| Title | King |
| Company | England |
| Address1 | 495 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

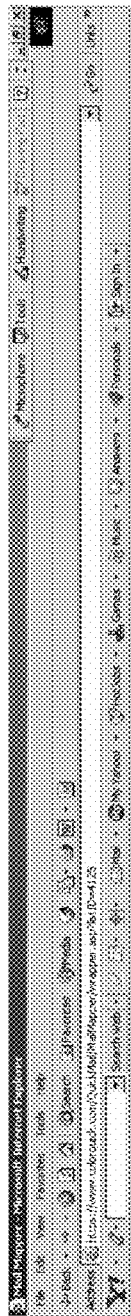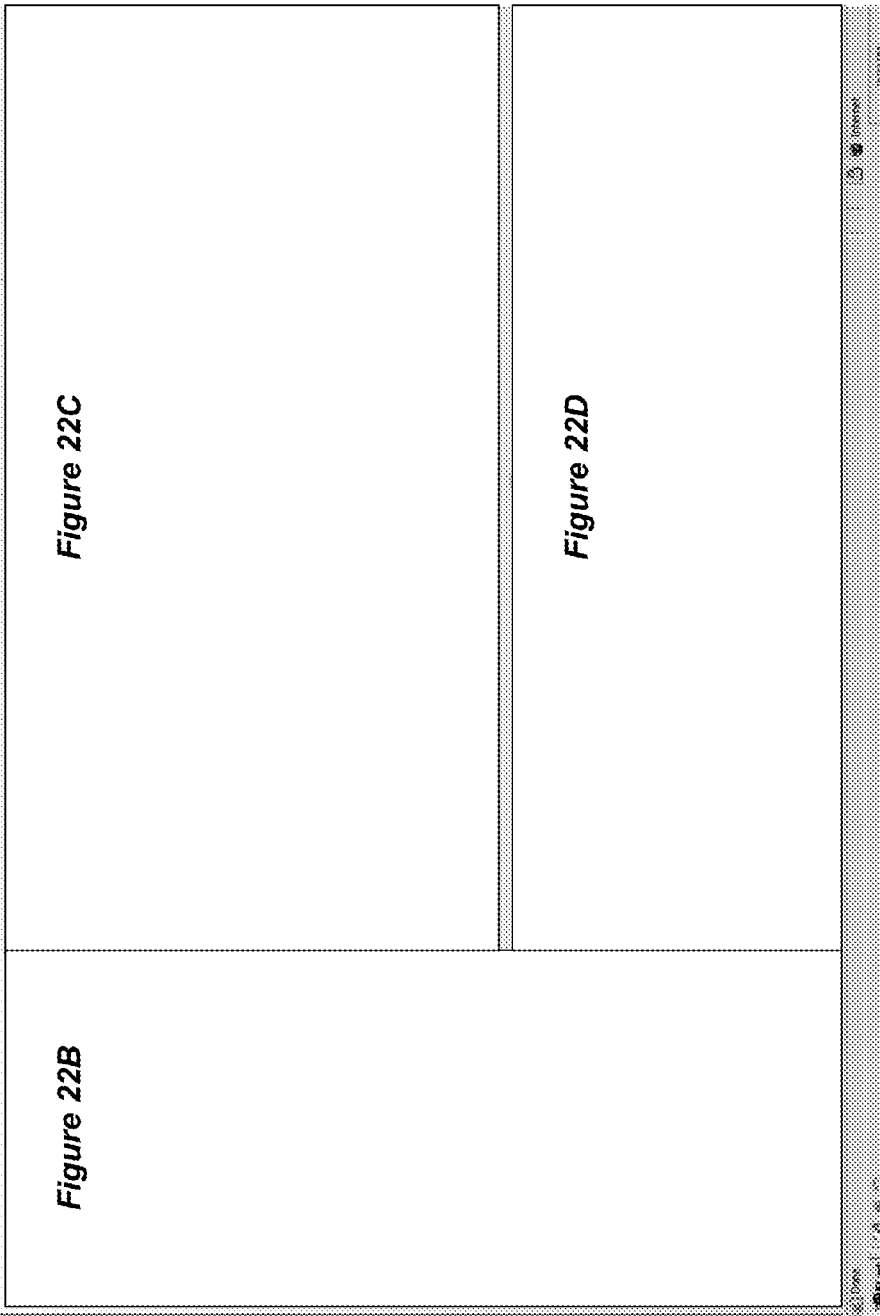
*Figure 22B*
*Figure 22C*
*Figure 22D*
*Figure 22A*

| Name | Description | ID | Modified Date | Creator | Score |
|---|---|---|---|---|---|
| Mail Connector | | 35 | 2007-05-17T09 | qmailtest | -85 |
| (New Dataconne | | 37 | 2007-05-29T10 | qmailtest | -85 |
| My First DataCo | please work | 8 | 2007-03-15T14 | qmailtest | -100 |
| My second Data | try dos | 9 | 2007-03-15T16 | qmailtest | -100 |
| New Format | | 10 | 2007-03-16T10 | qmailtest | -100 |
| New Test | please work | 26 | 2007-05-02T14 | qmailtest | -100 |

[ Select ]     [ New ]     [ Cancel ]

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 453 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57571 |

[ Previous Record ]     [ Next Record ]
[ Back ]                 [ Finish ]

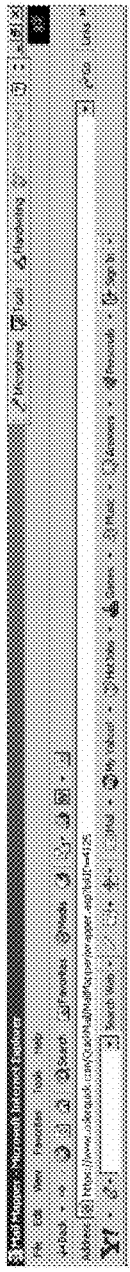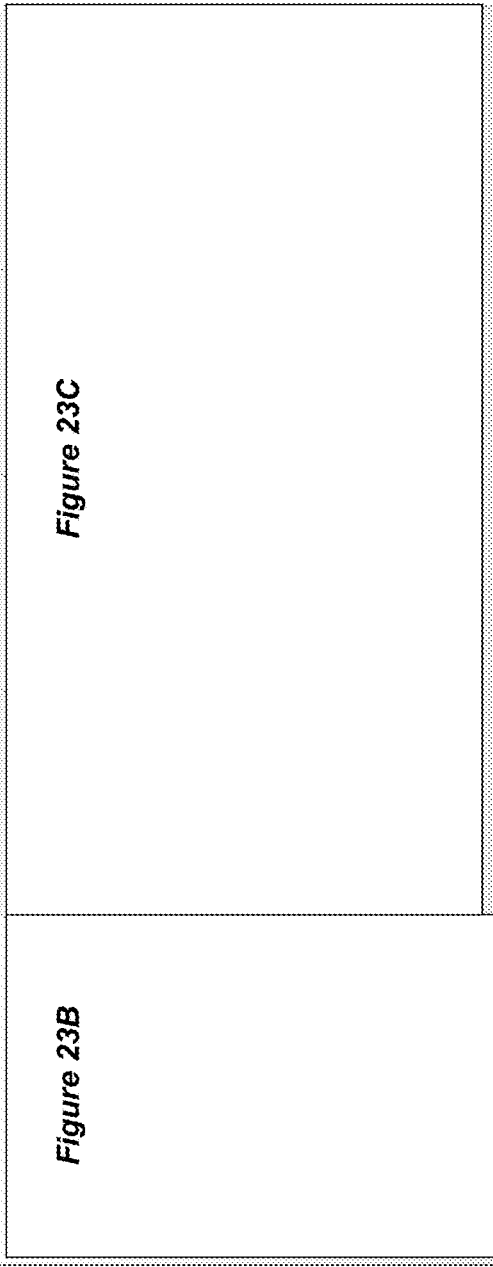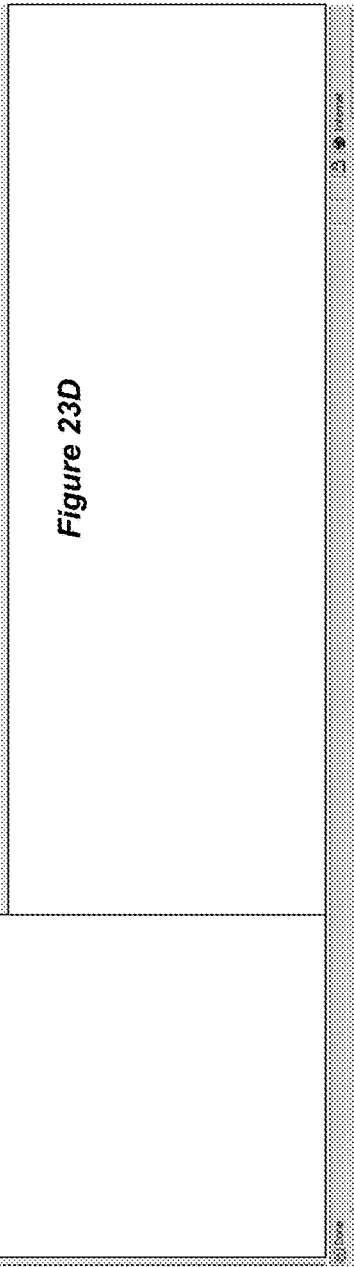
Figure 23A
Figure 23B
Figure 23C
Figure 23D

| Record | Result |
|---|---|
| 1 | Matched to undeliverable address; 5- |
| 2 | Valid ZIP Code required to choose fro |
| 3 | Matched to undeliverable address; 5- |
| 4 | Street name invalid |
| 5 | Failed DPV because of invalid primary |
| 6 | Street name invalid |

[ DPV ]  [ Hide DPV Validator ]

UPLOADED FILE COMLUMNS

Drag These Columns onto the QuickMail Database Fields.

| Field Name | Preview Value (Record 1) |
|---|---|
| Firstname | Henry |
| Lastname | Angevin |
| Nickname | Henry II |
| Title | King |
| Company | England |
| Address1 | 455 W. 17th Street |
| Address2 | |
| City | Philadelphia |
| State | PA |
| ZIP | 19128 |
| Telephone | 215-555-9595 |
| e-mail | ha@ek.org |
| Salesman | Bill |
| Customer Number | 57971 |

[ Previous Record ]  [ Next Record ]
[ Back ]  [ Finish ]

*Figure 23B*

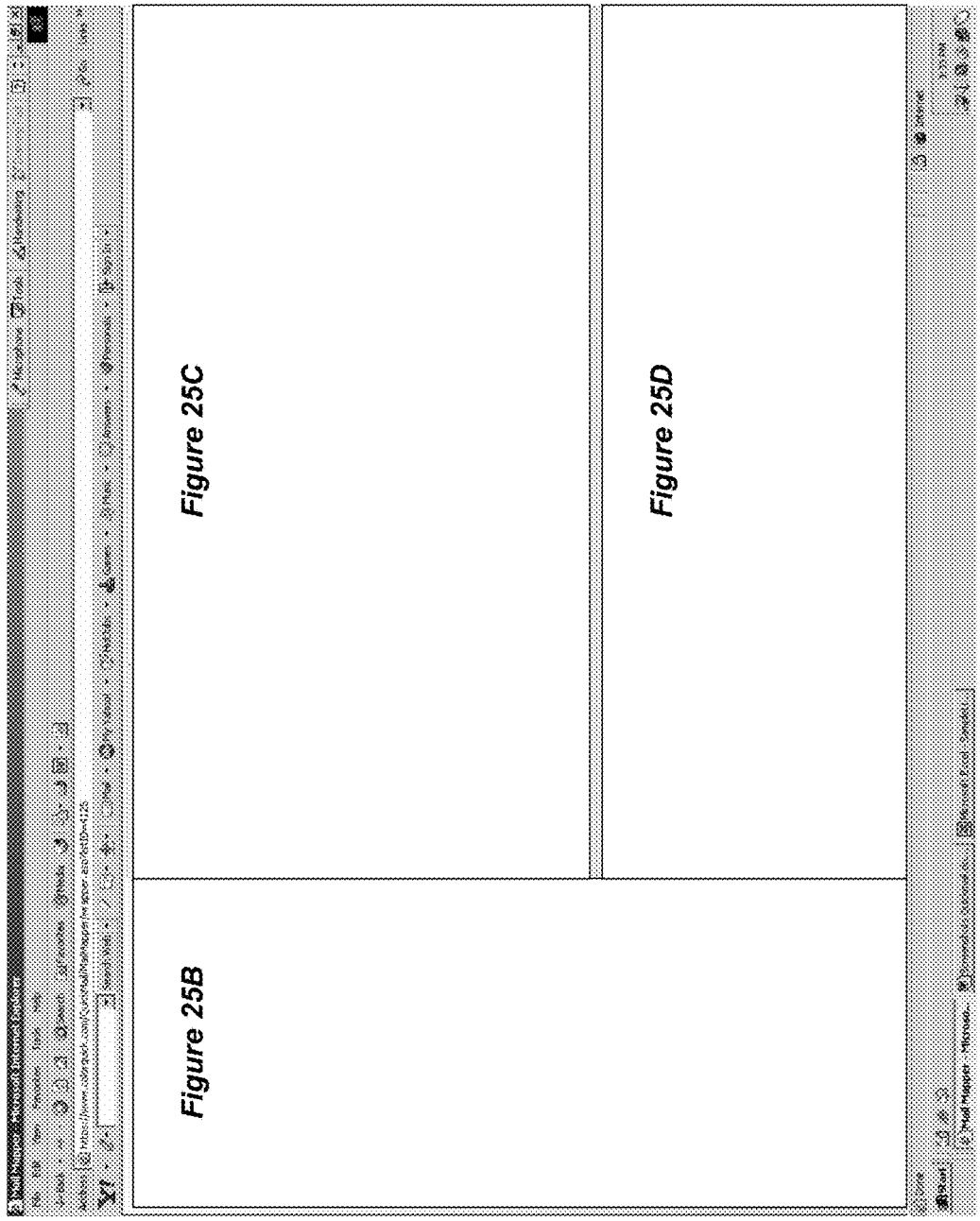

| Show DataConnector Library | Show DPV Validator | Show Interview |

UPLOADED FILE COMLUMNS

Drag These Columns onto the QuickMail Database Fields.

| Field Name | Preview Value (Record 5) |
|---|---|
| Firstname | Marc |
| Lastname | Bohemund |
| Nickname | |
| Title | Prince |
| Company | Antioch |
| Address1 | 422 E. Harrison Ave. |
| Address2 | |
| City | Glenside |
| State | PA |
| ZIP | 19038 |
| Telephone | 215-555-1122 |
| e-mail | mb@ap.org |
| Salesman | Frank |
| Customer Number | 57575 |

Previous Record          Next Record

Back                     Finish

*Figure 25B*

*You are logged in as: qmalitest*

Active Primary List: Middle Age Notable Figures (4125)

List Management

- Upload a New List
- Browse / Search Lists
- Edit Description / Usage / Sharing
- Edit List Items
- Multi List Operations

- Filter List
- Manage Data Connector Library
- DPV Validation
- Remove Duplicate Records (creates a new asset)

Postal Sorting

- Sort a List with an Existing Project — New Sort
- Sort a List with No Related Project — Re-Sort

Reports and Response Tracking

*Figure 26*

QuickMail

Return to Administrator Console

| | | | | | | |
|---|---|---|---|---|---|---|
| Select | Sala | Al-Adin | 653 Laverock Rd. | Glenside | PA | 19038 | 610-555-3258 |
| Select | Dante | Alegheri | 755 Westfield Ave. | Pennsauken | NJ | 8109 | 267-555-8541 |
| Select | Henry | Angevin | 455 W. 17th Street | Philadelphia | PA | 19128 | 215-555-9595 |
| Select | John | Angevin | 457 W. 17th Street | Philadelphia | PA | 19128 | 215-555-9567 |
| Select | Richard | Angevin | 456 W. 17th Street | Philadelphia | PA | 19128 | 215-555-9566 |
| Select | Eleanor | Aquitaine | 457 W. 17th Street | Philadelphia | PA | 19128 | 215-555-8899 |
| Select | Francis | Assissi | 263 Washington Ave. | Pennsauken | NJ | 8109 | 610-555-9865 |
| Select | John | Baliol | 4243 Old York Rd. | Abington | PA | 19002 | 646-555-8524 |
| Select | Frederick | Barbarosa | 332 Market St. | Camden | NJ | 8101 | 610-555-0258 |
| Select | Marc | Bohemund | 422 E. Harrison Ave. | Glenside | PA | 19038 | 215-555-1122 |
| Select | Louis | Bourbon | 388 E. Kaighn Ave. | Cherry Hill | NJ | 8002 | 215-555-7410 |
| Select | Robert | Bruce | 4242 Old York Rd. | Abington | PA | 19001 | 646-555-9630 |
| Select | John | Chrysanthus | 755 Glenside Ave. | Glenside | PA | 19038 | 267-555-9713 |
| Select | Alexius | Commenus | 955 Limekiln Pk. | Glenside | PA | 19038 | 215-555-0258 |
| Select | Anna | Cormena | 955 Limekiln Pk. | Glenside | PA | 19038 | 267-555-8426 |
| Select | Joan | D'Arc | 218 Bedford Ave. | Cherry Hill | NJ | 8002 | 610-555-4444 |
| Select | Lorenzo | DeMedici | 222 Westfield Ave. | Pennsauken | NJ | 8109 | 610-555-0147 |
| Select | Lief | Erikson | 779 Township Line Rd. | Jenkintown | PA | 19046 | 267-555-4158 |
| Select | Lewis | Germanus | 233 Market St. | Camden | NJ | 8101 | 610-555-0369 |
| Select | Owen | Glendower | 256 Jericho Rd. | Abington | PA | 19003 | 267-555-0147 |

☐ Only show incomplete records

Previous | Return to Administrator Console | Next

Match the fields found in the supplied database to those in our Mailing Database. Simply drag your field name next to the Mailing Database Field name, in the "Fields to Use" column. There are some simple data transformations that you can do to help us deliver exactly what you want. For instance, if your database has only the full names of the individuals, you can use the Left Word operation to get the first name, and the Right Word operation to get the last name. CAPS will capitalize the work, and Proper will attempt to apply proper capitalization rules to the field.

| Mailing Database Field | Operation | Fields to Use |
|---|---|---|
| Record Number | | |
| Code | | |
| Year | | |
| Title | | |
| Honorific | | |
| First Name | | |
| Middle Name/Initial | | |
| Last Name | | |
| Gender | | |
| Company | | |
| Suffix | | |
| Office | | |
| Mail Attention | | |
| Address 1 | | |
| Address 2 | | |
| Address 3 | | |
| Address 4 | | |

First N
SHARON

Last name
MAHONY

Address 1
1440 BROADWAY

Address 2
10TH Floor

City
NEW YORK

State
NY

Zip Code
10018

Phone Number
1237822044

( UPPER CASE )
( Proper Case )
( lower case )
( Get First Name )
( Get Last Name )
( Get Middle Name )
( Get Surname )
( Get Suffix )
( Genderize Name )
( Get Street )
( Get House # )
( Get Predirection )
( Get Postdirection )

*Figure 39*

Match the fields found in the supplied database to those in our Mailing Database. Simply drag your field name next to the Mailing Database Field name, in the "Fields to Use" column. There are some simple data transformations that you can do to help us deliver exactly what you want. For instance, if your database has only the full names of the individuals, you can use the Left Word operation to get the first name, and the Right Word operation to get the last name. CAPS will capitalize the work, and Proper will attempt to apply proper capitalization rules to the field.

| Mailing Database Field | Operation | Fields to Use |
|---|---|---|
| Record Number | | |
| Code | | |
| Year | | |
| Title | | |
| Honorific | | |
| First Name | | |
| Middle Name/Initial | First N / SHARON | |
| Last Name | | |
| Gender | | |
| Company | | |
| Suffix | | |
| Office | | |
| Mail Attention | | |
| Address 1 | | |
| Address 2 | | |
| Address 3 | | |
| Address 4 | | |

Side panel:
- Last name: MAHONY
- Address 1: 1440 BROADWAY
- Address 2: 10TH Floor
- City: NEW YORK
- State: NY
- Zip Code: 10018
- Phone Number: 1237822044

Operations:
- UPPER CASE
- Proper Case
- lower case
- Get First Name
- Get Last Name
- Get Middle Name
- Get Surname
- Get Suffix
- Genderize Name
- Get Street
- Get House #
- Get Predirection
- Get Postdirection

*Figure 40*

Match the fields found in the supplied database to those in our Mailing Database. Simply drag your field name next to the Mailing Database Field name, in the "Fields to Use" column. There are some simple data transformations that you can do to help us deliver exactly what you want. For instance, if your database has only the full names of the individuals, you can use the Left Word operation to get the first name, and the Right Word operation to get the last name. CAPS will capitalize the work, and Proper will attempt to apply proper capitalization rules to the field.

| Mailing Database Field | Operation | Fields to Use |
|---|---|---|
| Record Number | | |
| Code | | |
| Year | | |
| Title | | |
| Honorific | | |
| First Name | Proper Case | First N |
| Middle Name/Initial | | |
| Last Name | | |
| Gender | | |
| Company | | |
| Suffix | | |
| Office | | |
| Mail Attention | | |
| Address 1 | | |
| Address 2 | | |
| Address 3 | | |
| Address 4 | | |

Side panel:
- First N: SHARON
- Last name: MAHONY
- Address 1: 1440 BROADWAY
- Address 2: 10TH Floor
- City: NEW YORK
- State: NY
- Zip Code: 10018
- Phone Number: 1237822044

Operations:
- UPPER CASE
- lower case
- Get First Name
- Get Last Name
- Get Middle Name
- Get Surname
- Get Suffix
- Genderize Name
- Get Street
- Get House #
- Get Predirection
- Get Postdirection

*Figure 41*

COMPUTER-IMPLEMENTED METHOD OF ASSESSING THE QUALITY OF A DATABASE MAPPING

CROSS REFERENCE TO RELATED APPLICATION

This application is a continuation of copending U.S. application Ser. No. 12/126,106 filed May 23, 2008, the entire disclosure of which is incorporated herein by reference.

This application claims the benefit of U.S. Provisional Patent Application No. 60/944,063 filed Jun. 14, 2007.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The increase in the availability of computers and associated software to create lists to manage information, along with cost-effective variable digital printing (VDP) in small quantities, has made the acceptance of integrating customer-supplied lists into the "print" production process a common occurrence.

The conventional processing of a customer-supplied list that is provided with no standard format required a skilled computer operator to either remap the fields in the list to a normalized format, or to program variable imaging software to utilize non-standard information. If done conventionally, this process would take one-half hour to days depending on the complexity of the project. Since the work would typically be performed by a programmer who is unfamiliar with the data, the possibility of error increases dramatically. In addition, every job would be started from scratch since there is no mechanism to recover and reuse prior programming efforts.

There is an unmet need to address the above-identified deficiencies in conventional processes and to provide new functionality for management of customer-supplied lists.

BRIEF SUMMARY OF THE INVENTION

A computerized stored library of a plurality of database mappings is provided. Each database mapping represents the manner in which fields of a source database maps to fields of a target database. When a source database needs to be mapped to a target database, one or more of the database mappings are selected from the library and used to perform a mapping. Data transformations may be performed on one or more of the fields of the source database during the mapping.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIGS. 1-30 show user interface display screens in accordance with one embodiment of the present invention.

FIGS. 39-41 show how data connector is created and used to map one or more source databases/input files to one or more target databases/output files in accordance with another preferred embodiment of the present invention.

DETAILED DESCRIPTION OF THE INVENTION

I. Overview of Present Invention

Figure 3:
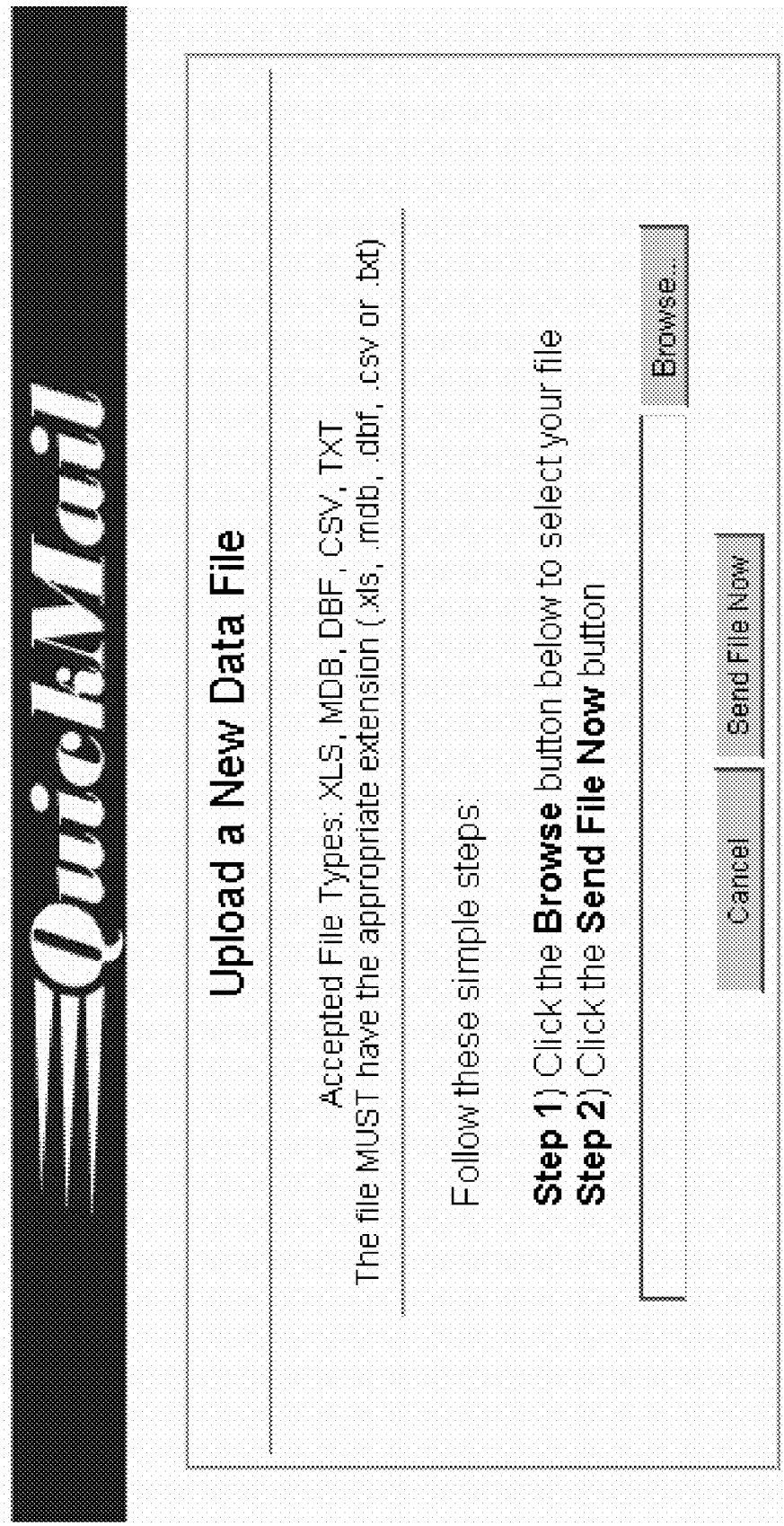

The concept of data field remapping or field conversion is well-known. The present invention improves upon this concept by providing a computerized stored library of a plurality of database mappings (referred to herein as "Data Connectors") that provides for the creation of an indexable program, which is treated as an object. This allows the user or system to submit new lists with potentially different field layouts, and have the list data transformed into a normalized database. In doing this, users could reuse prior work, reduce mistakes and greatly speedup the creation and execution of data-driven projects.

The present invention is based upon the creation and treatment of a "Data Connector" as an element of a library in a process that streamlines the normalization of lists of data. The Data Connector contains information that defines a relationship between one or more input or source databases and one or more output or target databases. This information is indexed in such a way that given one or more input or source databases, the most appropriate Data Connector available to be used to normalize the data into a regular desired form can be selected either automatically or manually.

In order to better evaluate the appropriateness of a Data Connector, the purpose of the target list or database (e.g., mailing list, phone list, email list) is considered in ranking the available Data Connectors. This information is then used to help the user or system select the best available Data Connector. If no acceptable Data Connector exists, the system prompts the user to create a new Data Connector, or edit an existing one to better complete the specific data mapping and transformation. Once a Data Connector is selected, the process continues with the actual data mapping and transformation being done, following the relationships contained in the selected Data Connector.

The Data Connectors described herein are used in conjunction with source and target databases. In many cases, the source and target databases are merely forms of input or source files and output or target files. However, the scope of the present invention includes use of the data connectors with input or source data files and output or target data files that are not databases, such as Microsoft Access® files, spreadsheets and XML files.

II. Detailed Disclosure

The present invention is described in the context of a commercial service called Quickmail™ commercially offered by ColorQuick.com, Pennsauken, N.J. However, the scope of the present invention is not limited to this particular implementation of the invention. The present invention is described in the context of a plurality of distributed computers, all of which are linked together by an electronic network, such as a LAN or the Internet. The computers may be any type of computing device that allows a user to interact with a web site via a web browser. For example, the computers may be personal computers (PC) that run a Microsoft Windows® operating system. The computers may also be handheld, wireless devices.

A. Overview of Figures

Figure 1:
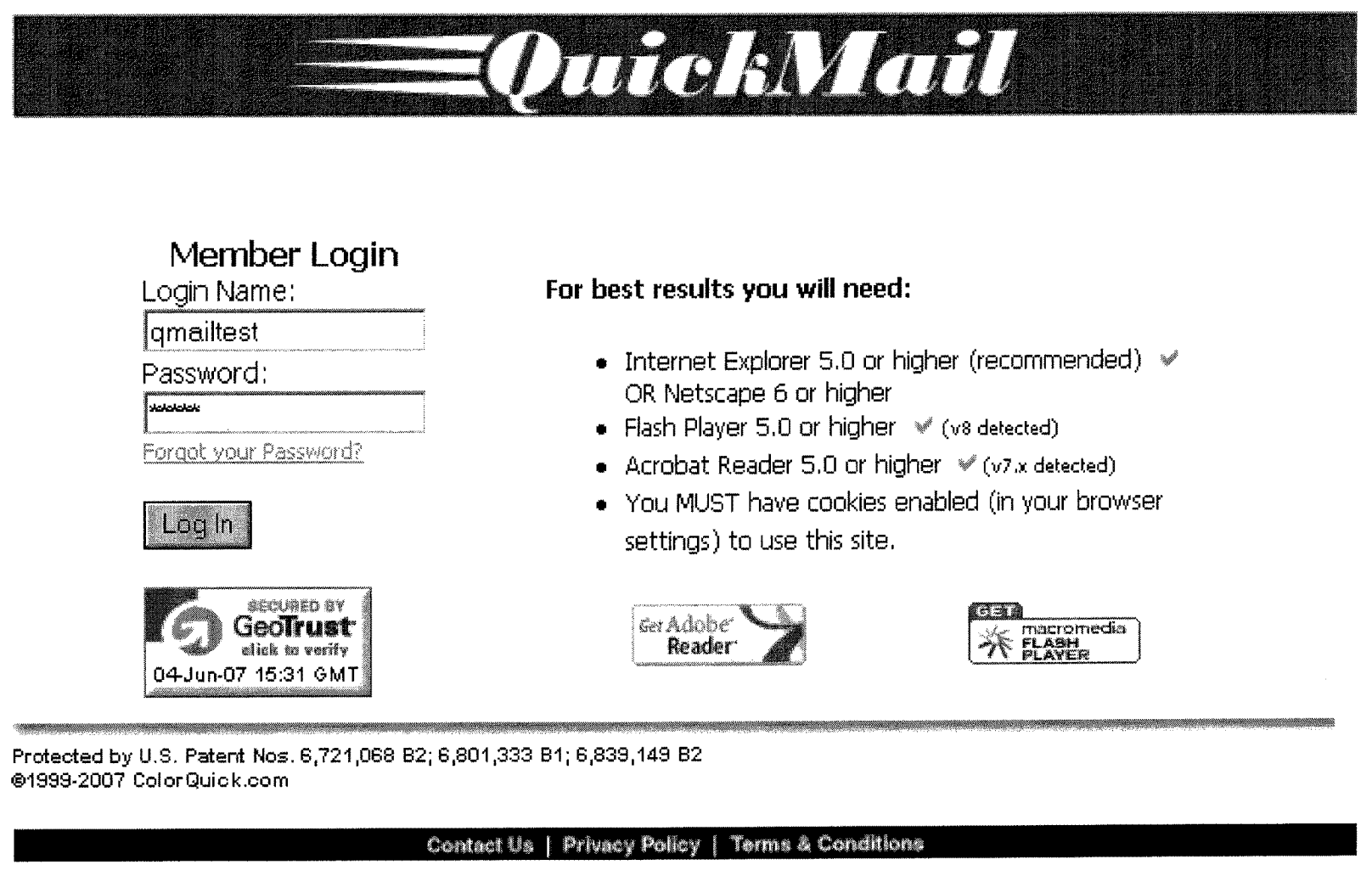

FIG. 1 shows a login screen. The library of Data Connectors that a user has available is dependent on the user's identity and related permissions.

FIG. 2 shows an Administrative Console. This screen is used to navigate to the various functions in a direct mail workflow, including the creation, selection, and management of Data Connectors to be used in list transformations.

FIG. 3 shows the user interface for Uploading new data files. From this screen, the user may upload any of the accepted data file types to be processed using a Data Connector.

Figures 4A, 4B, 4C:
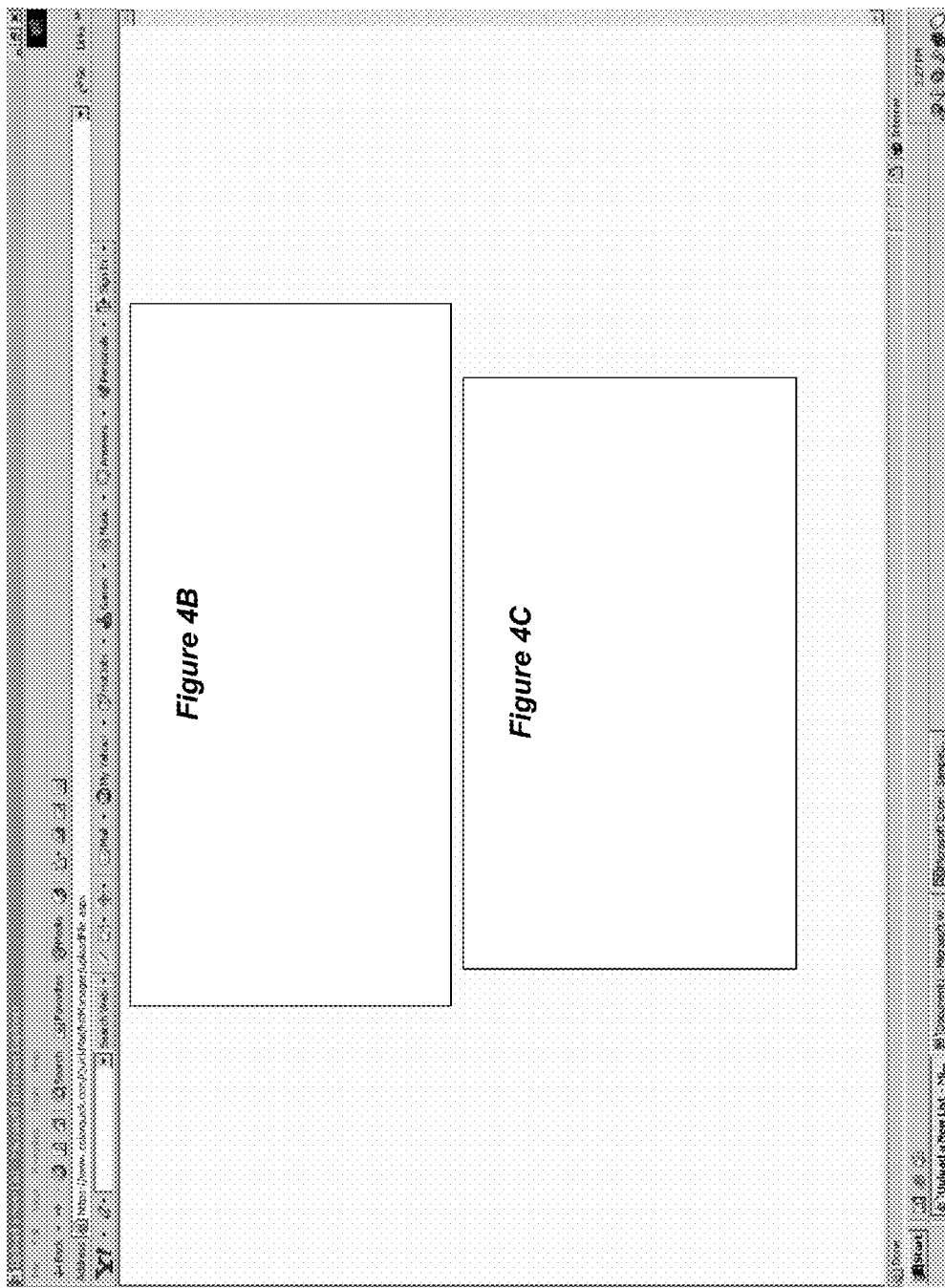
Figure 4B:
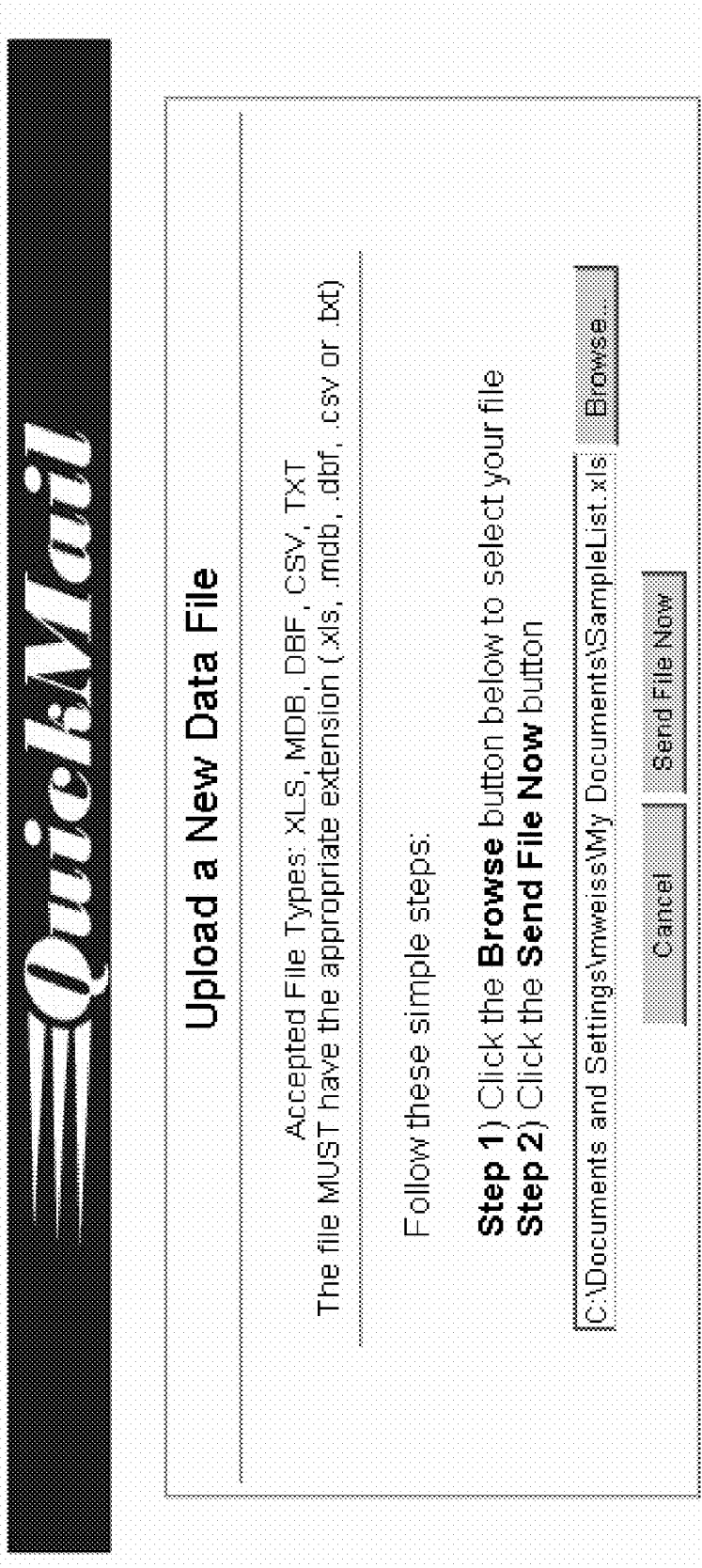
Figure 4C:
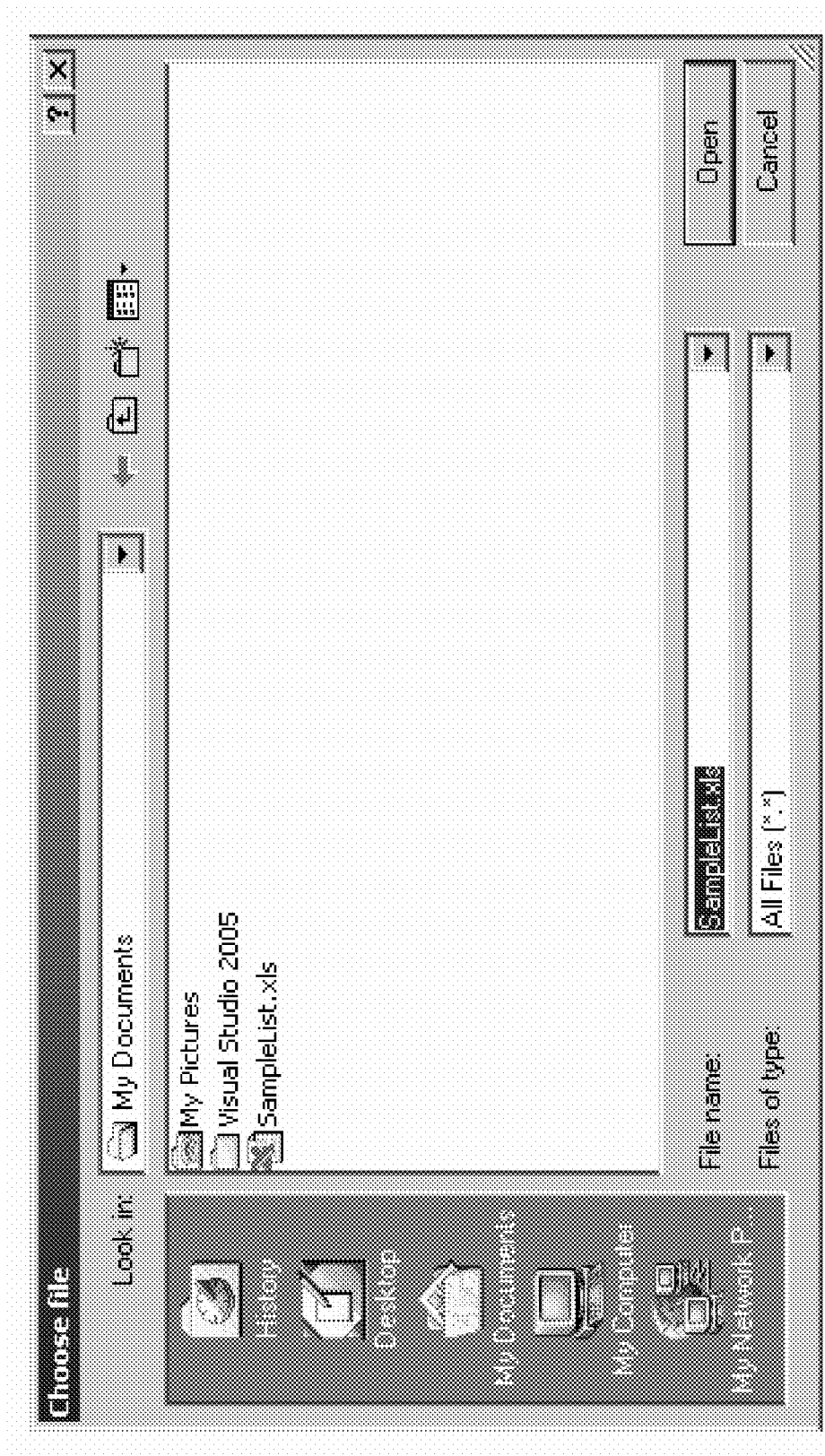

FIGS. 4A-4C, taken together, show the browsing menu. From this menu, the user can select any accepted file type on his/her computer to be uploaded for managing.

FIGS. 5A-5C, taken together, show an example of a list may be inputted for use with the Data Connector library. This example is an Excel® Workbook, but it could be any number of different file types.

FIG. 6 shows a screen which allows the user to assign a description, use limits, and usage rights for a newly uploaded data file. While part of the workflow, this does not affect the Data Connector or Normalization process.

FIG. 7 shows possible user edits of the screen in FIG. 6.

Figure 8:
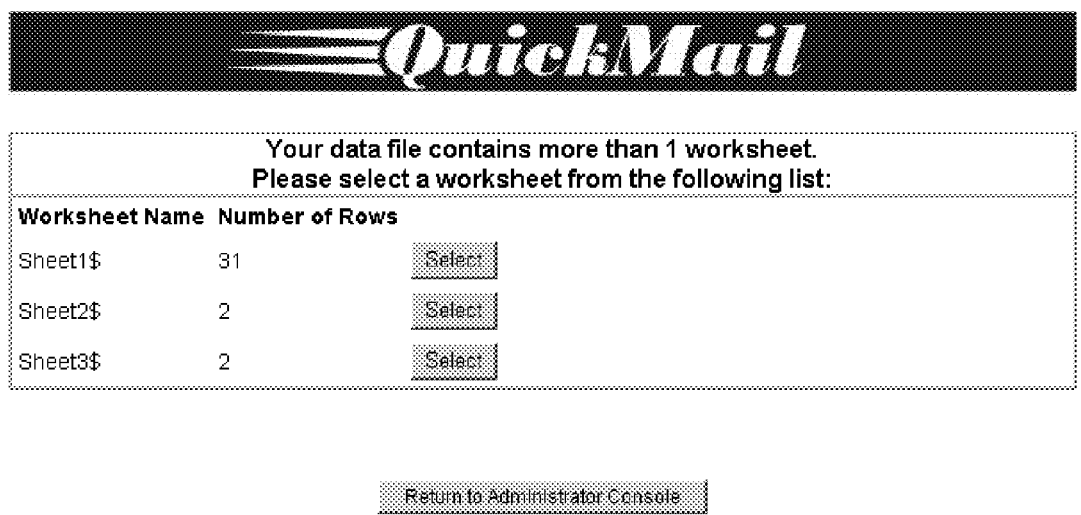
Figure 9D:
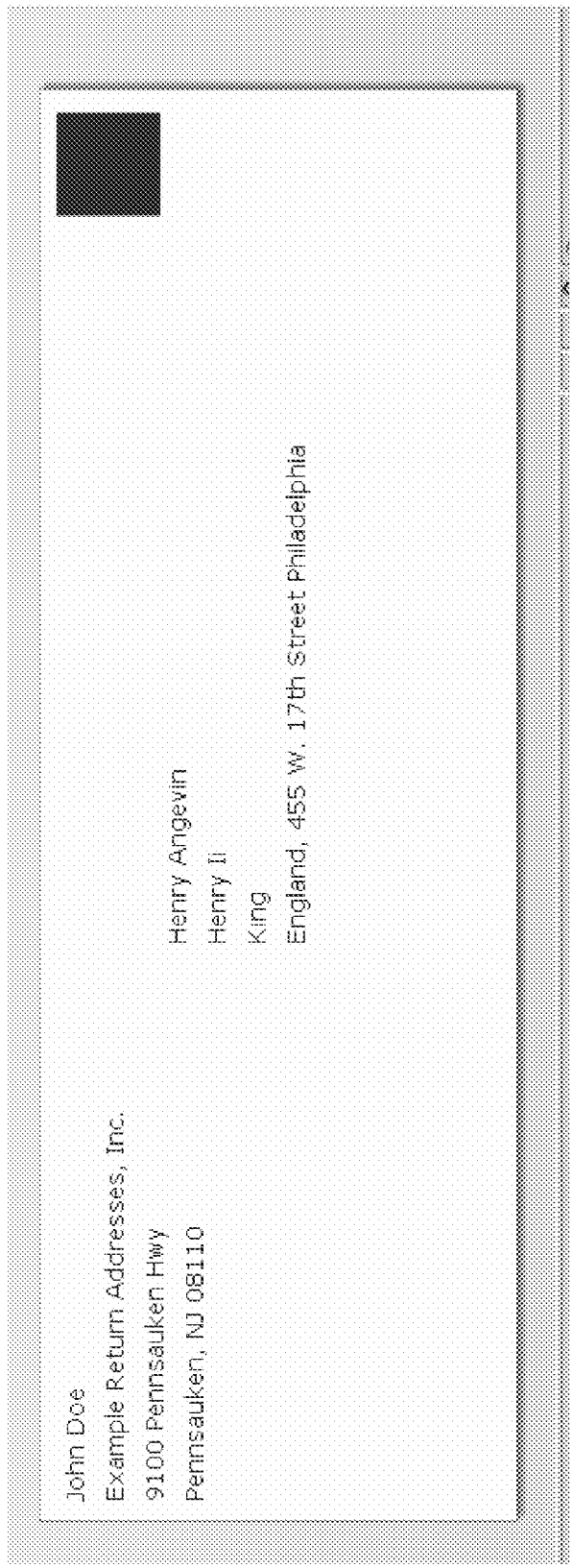
Figure 10D:
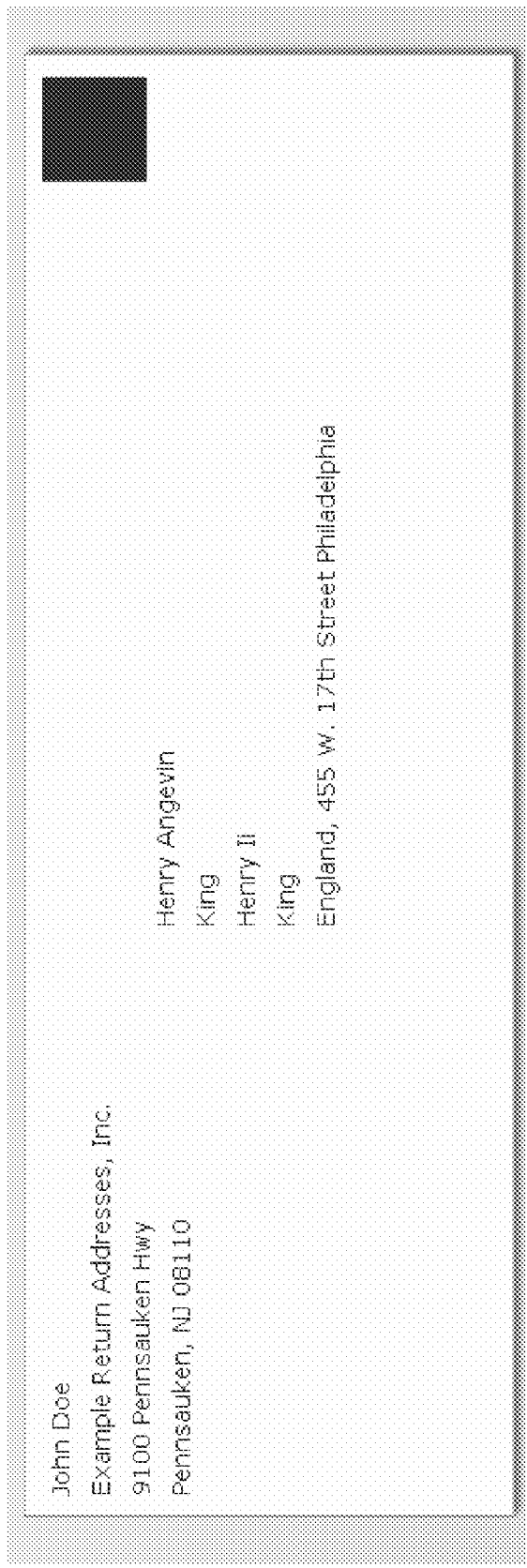
Figure 11D:
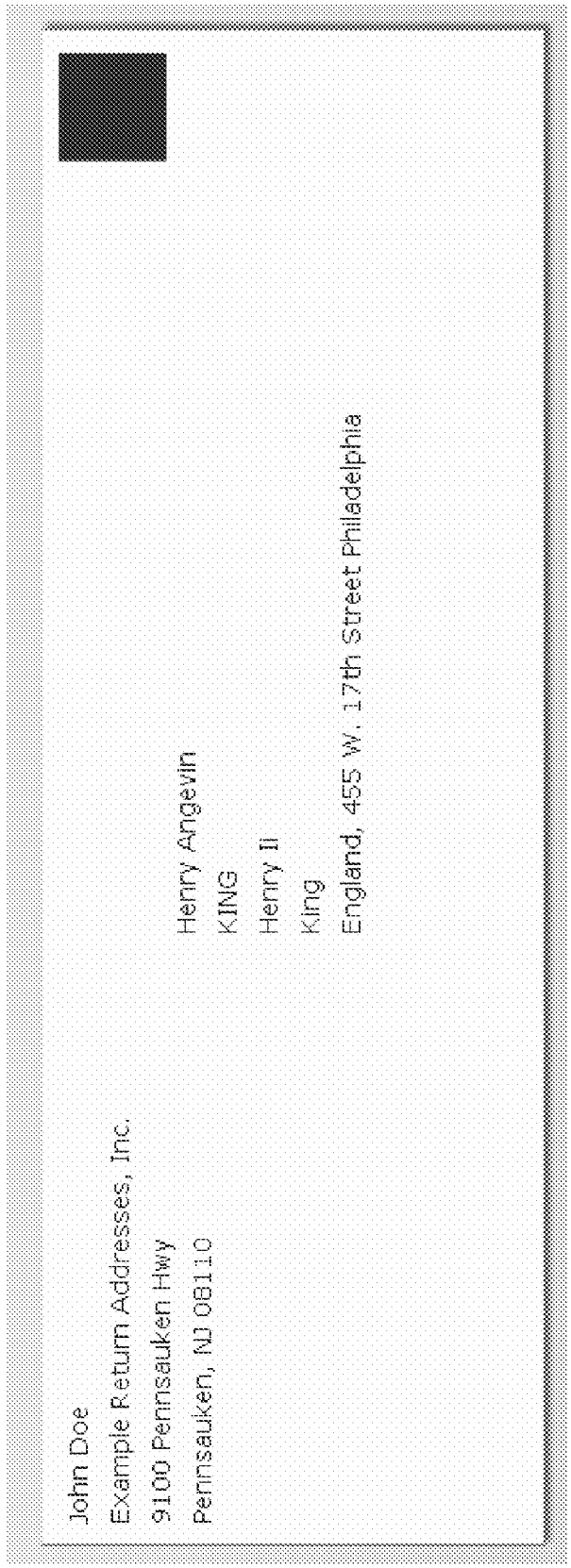
Figure 12A:
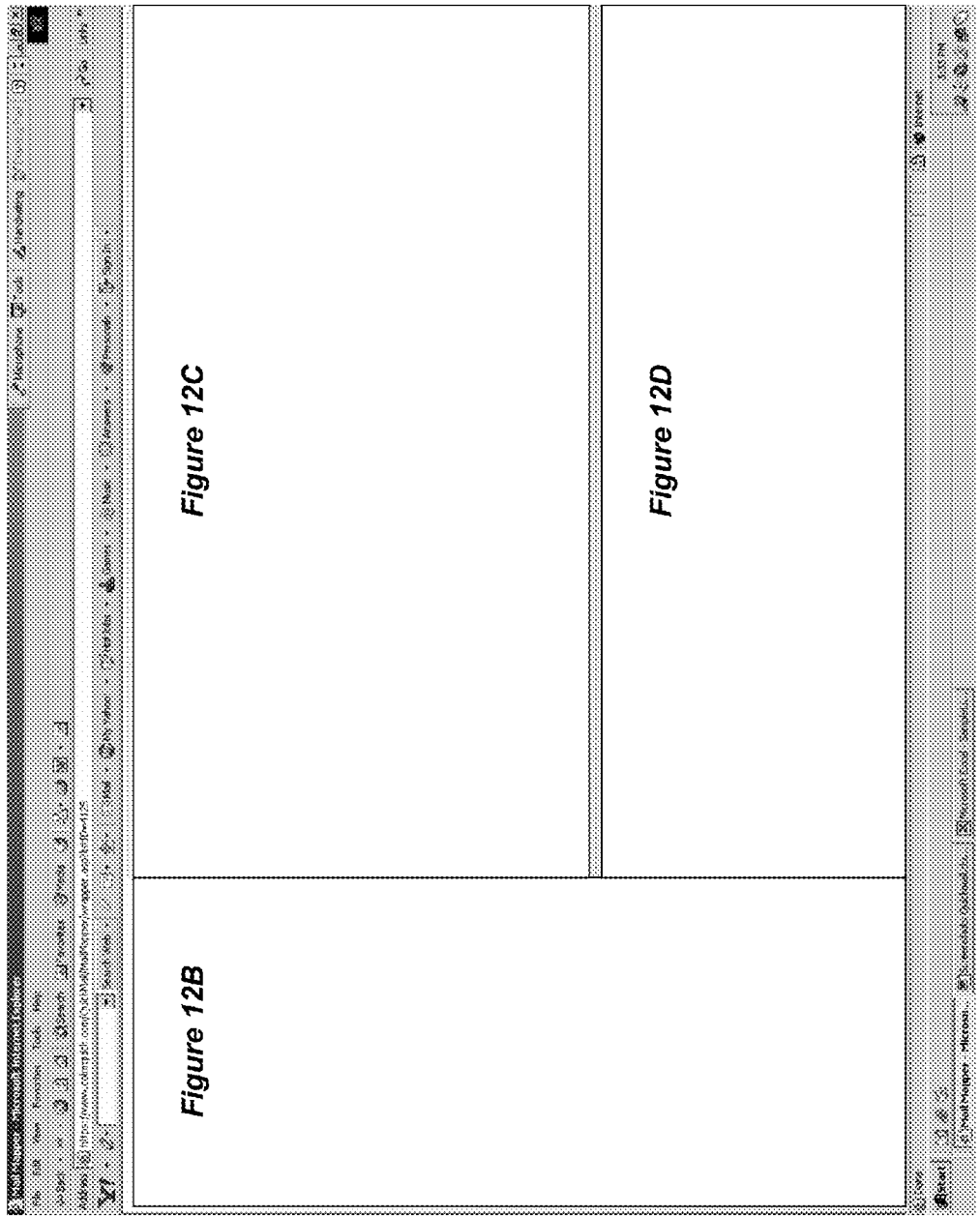
Figure 12D:
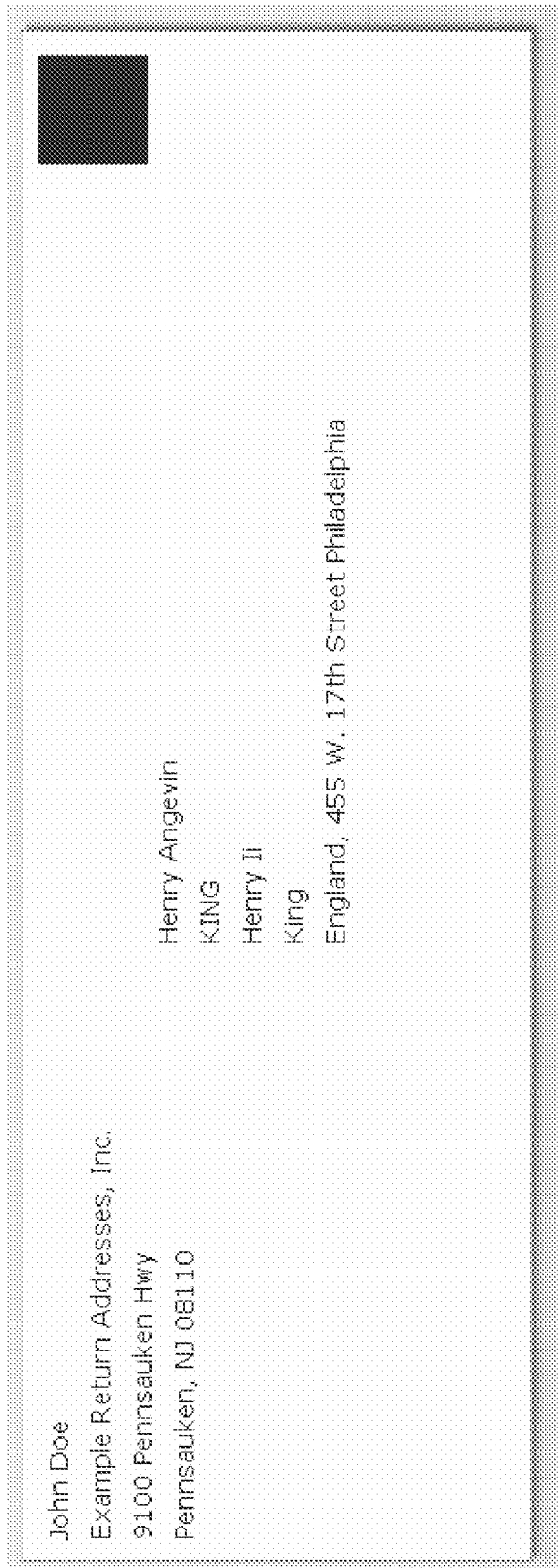
Figure 13D:
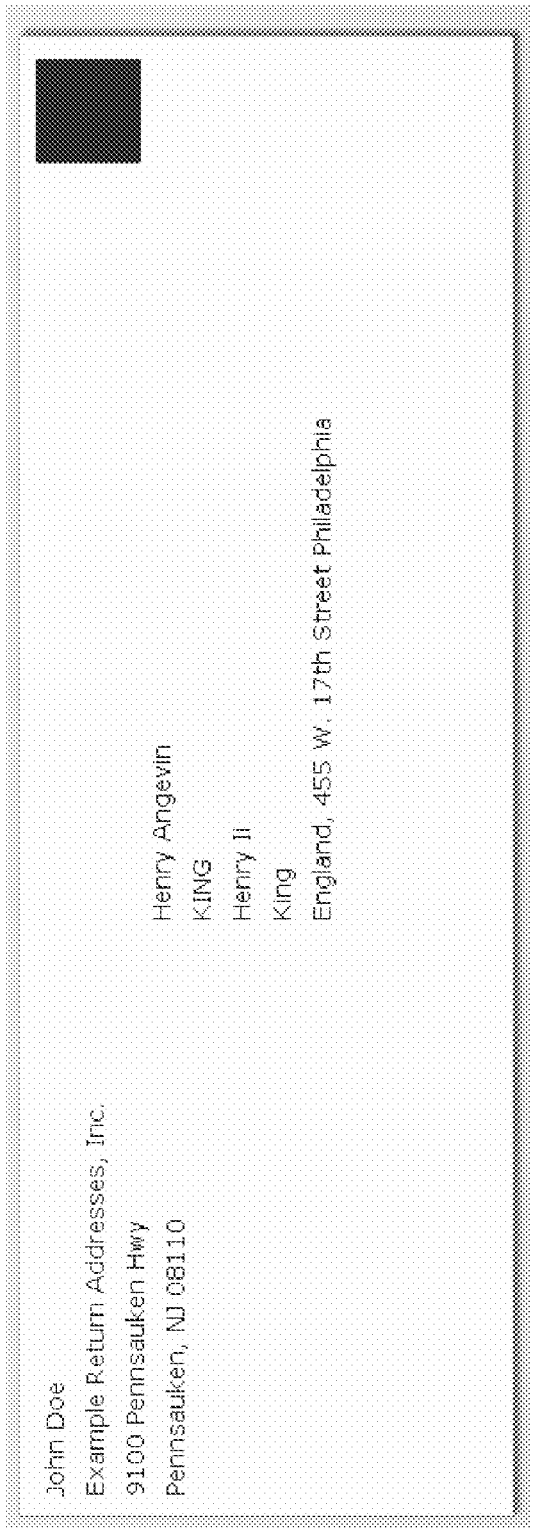
Figure 14C:
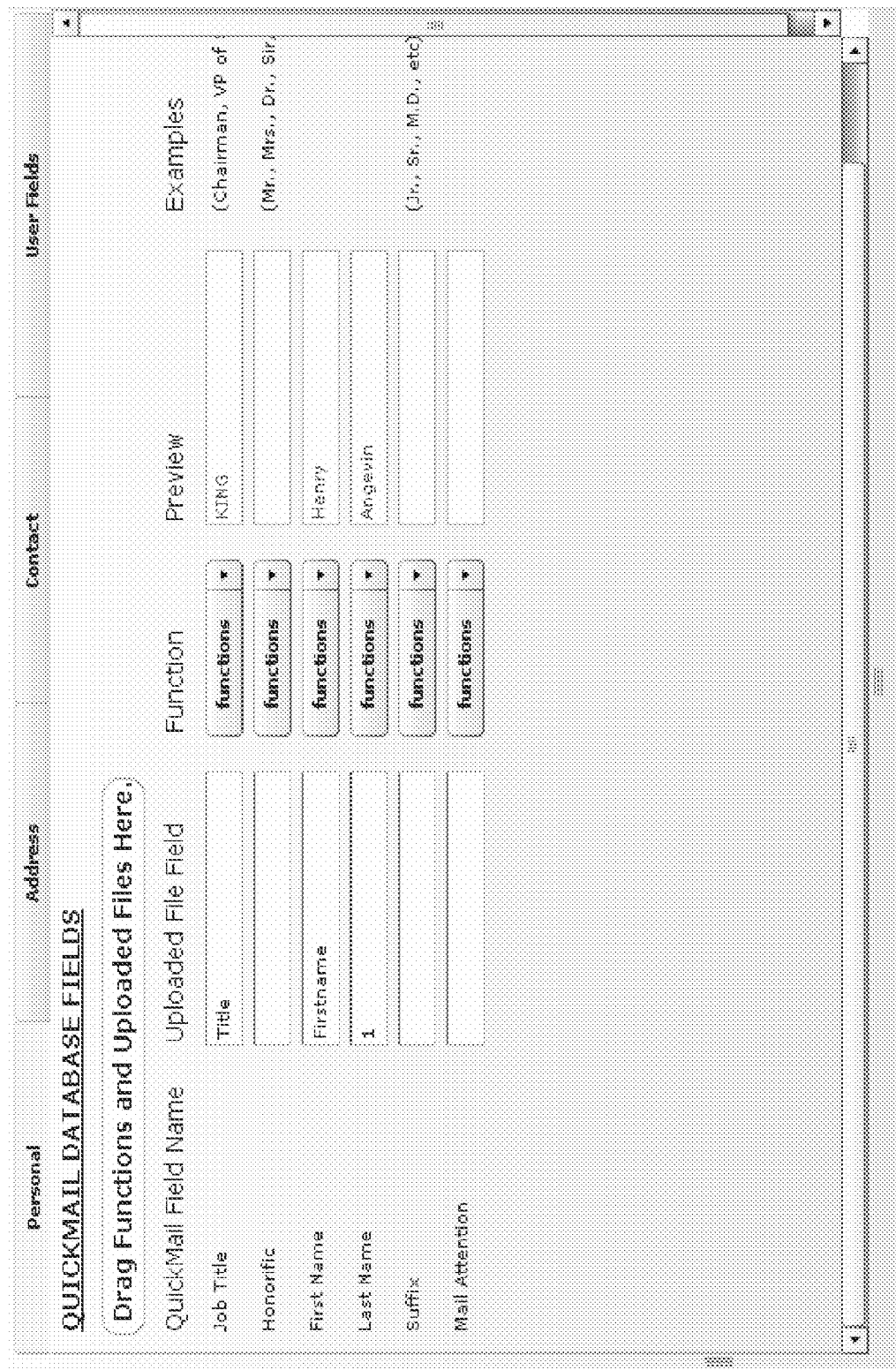
Figure 14D:
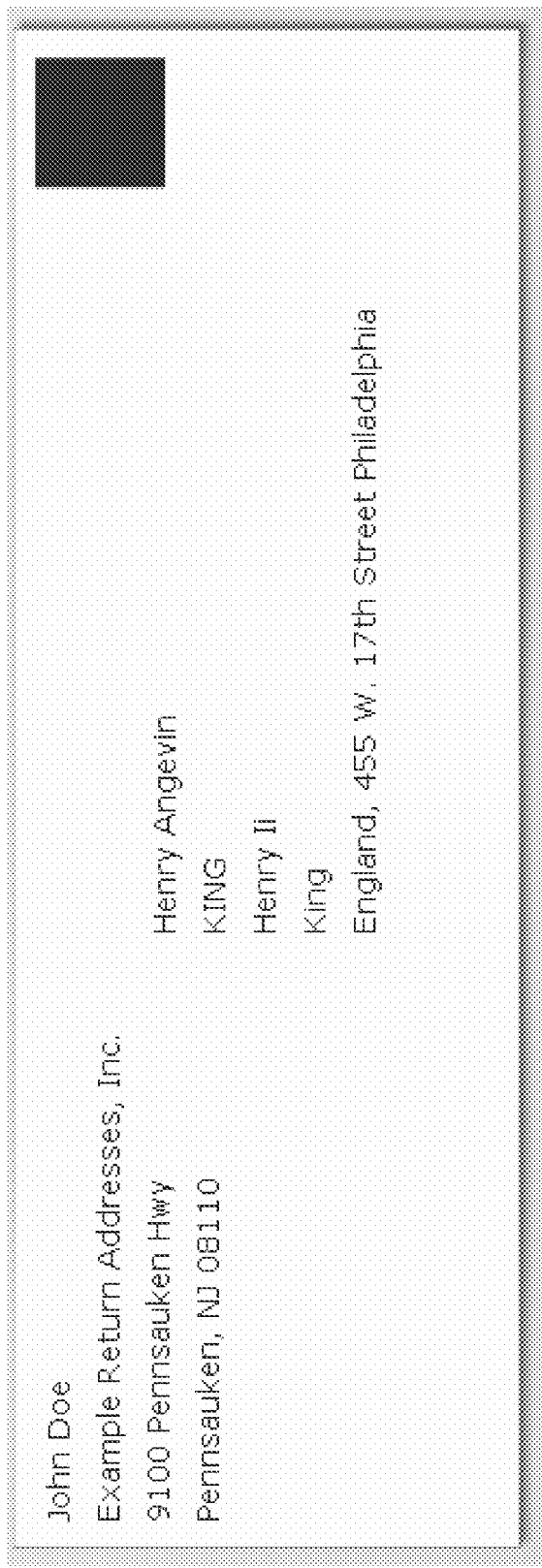
Figure 15C:
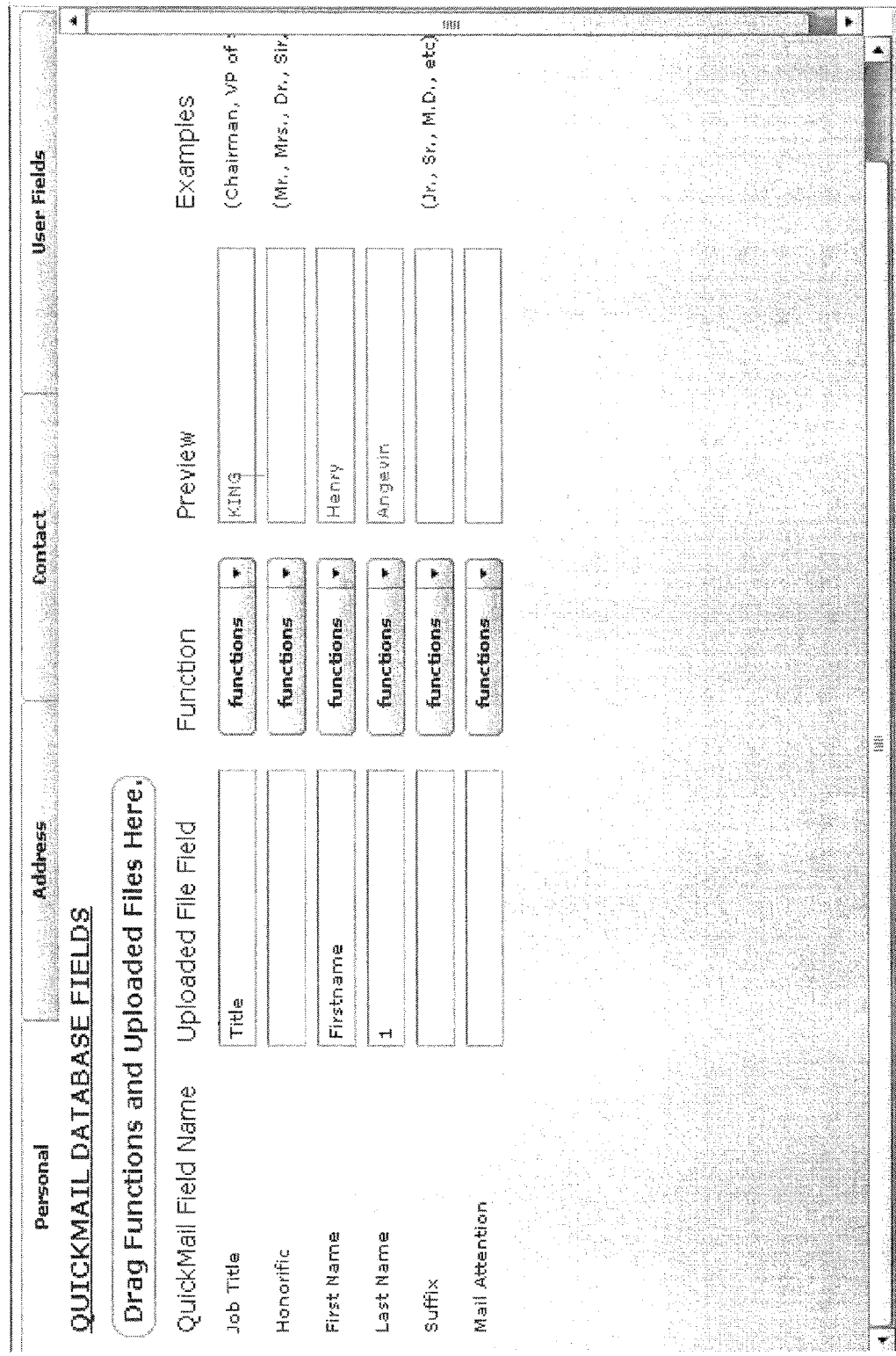
Figure 15D:
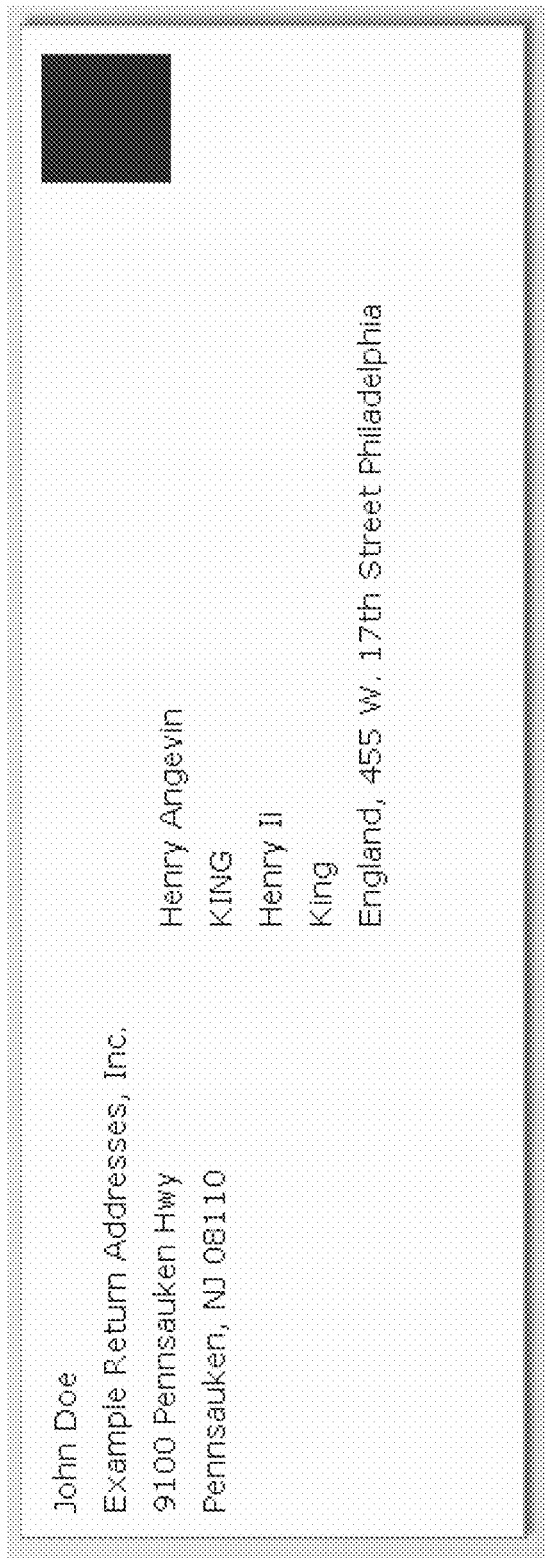
Figure 16C:
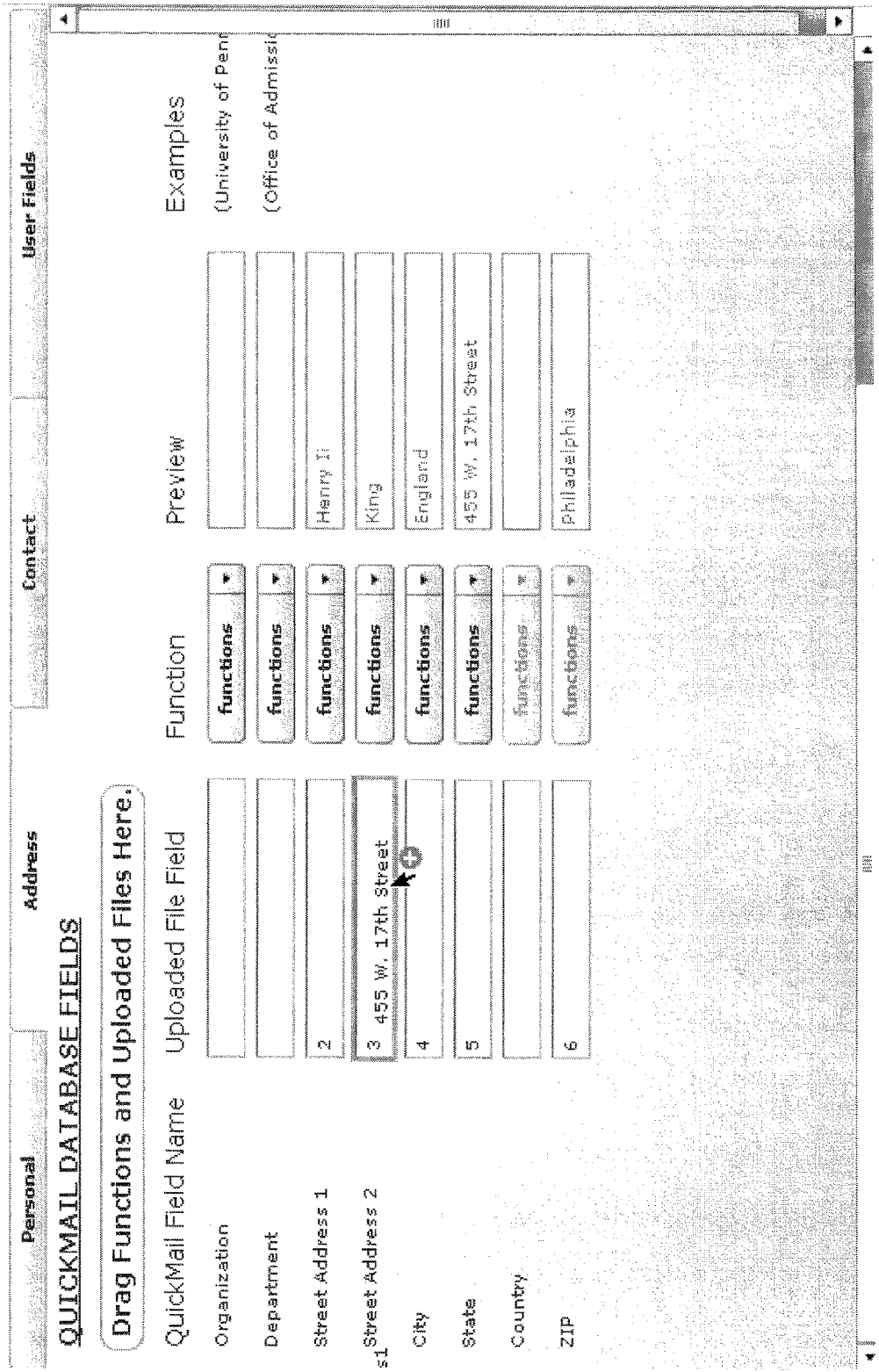
Figure 16D:
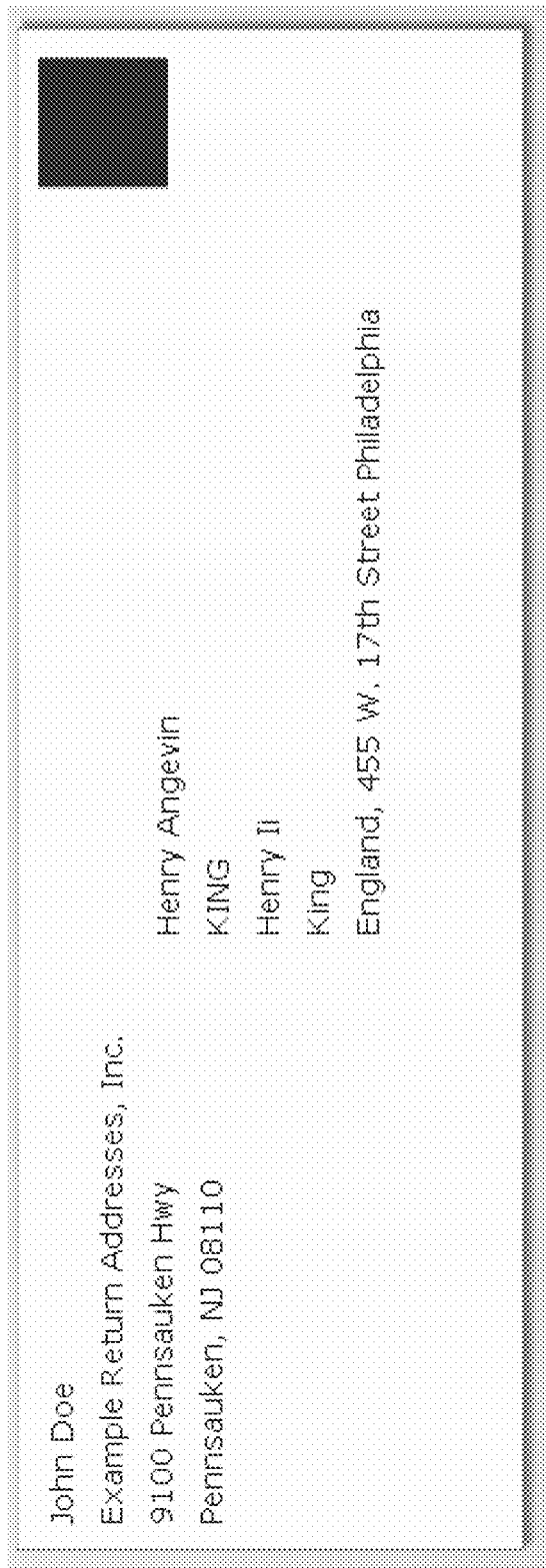
Figure 17C:
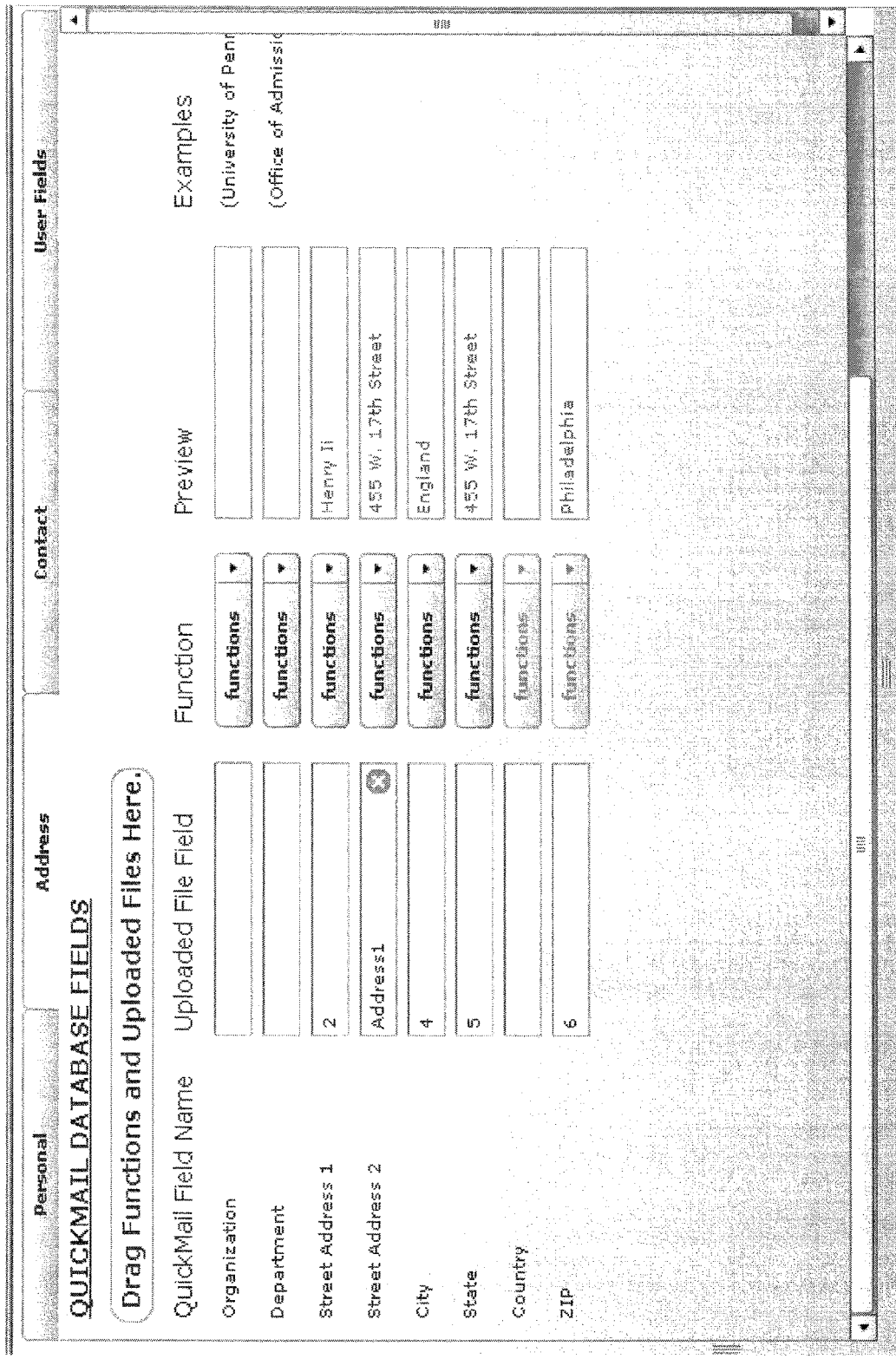
Figure 17D:
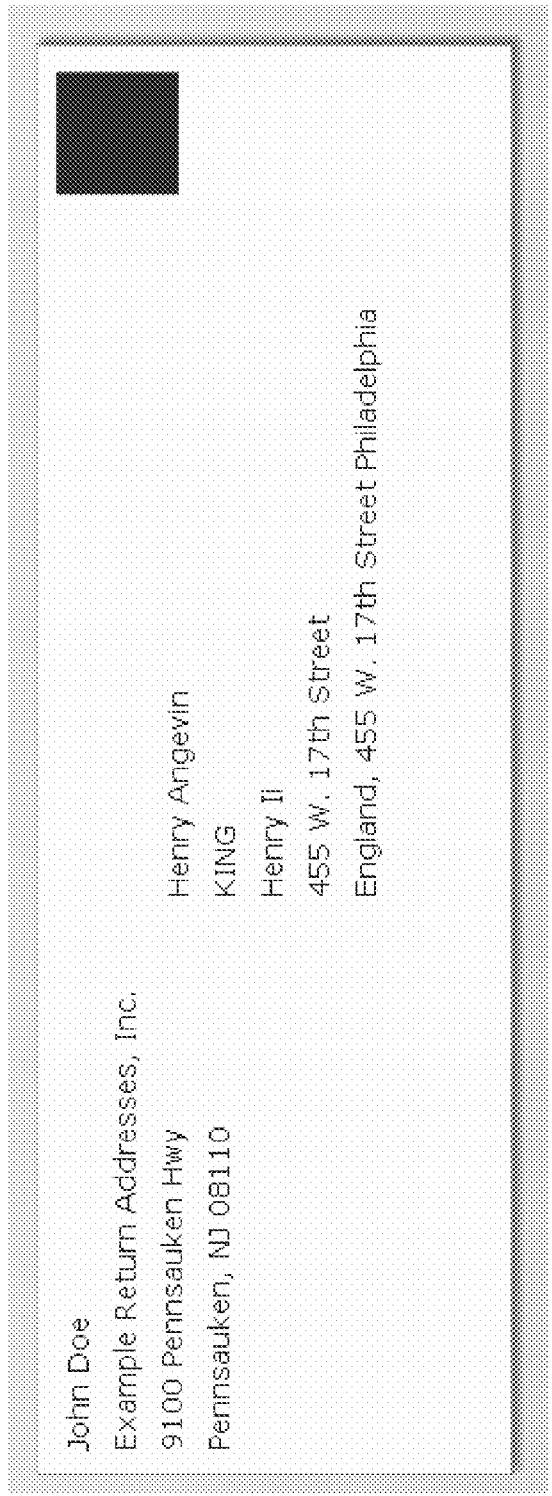
Figure 18C:
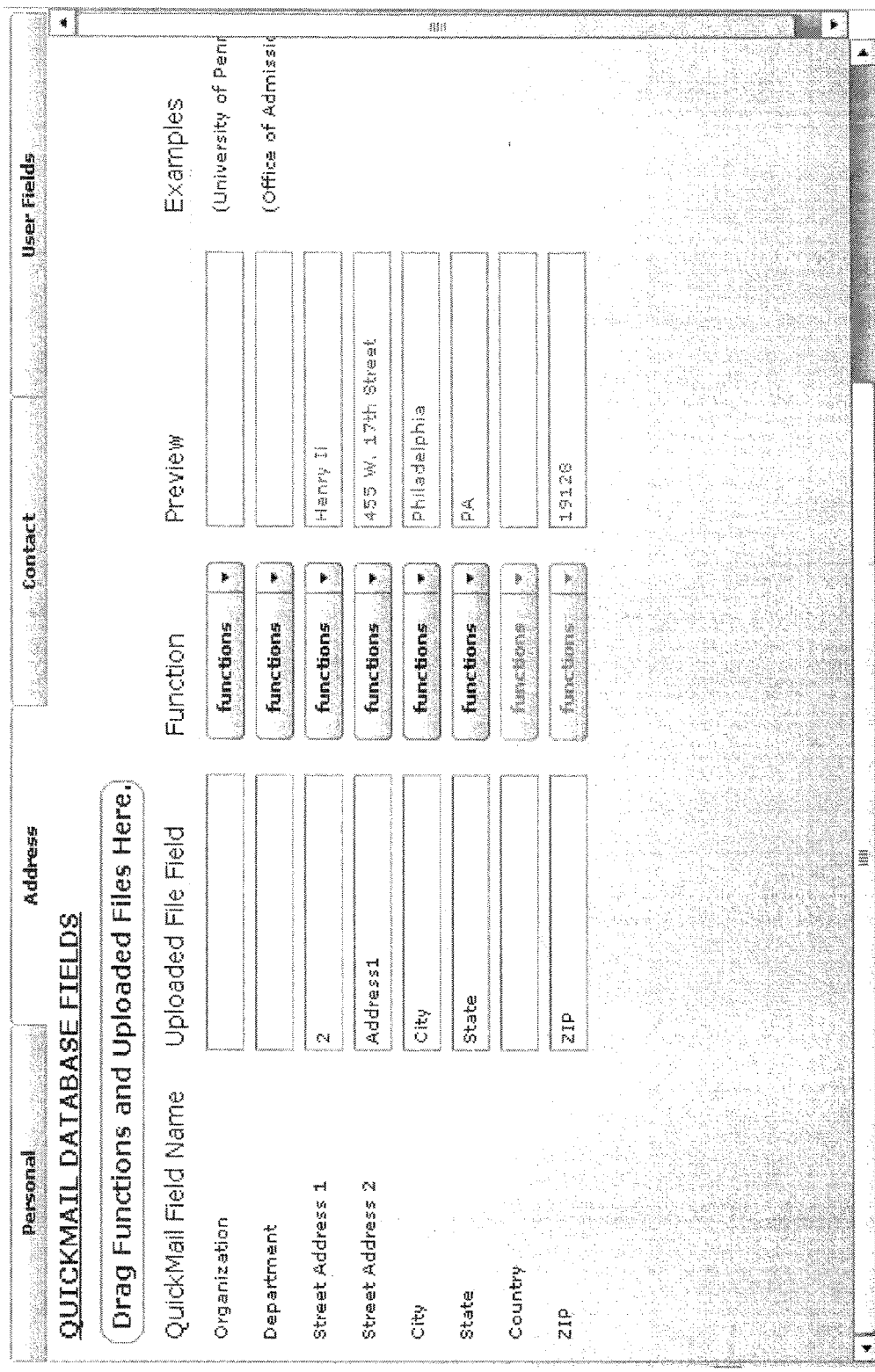
Figure 18D:
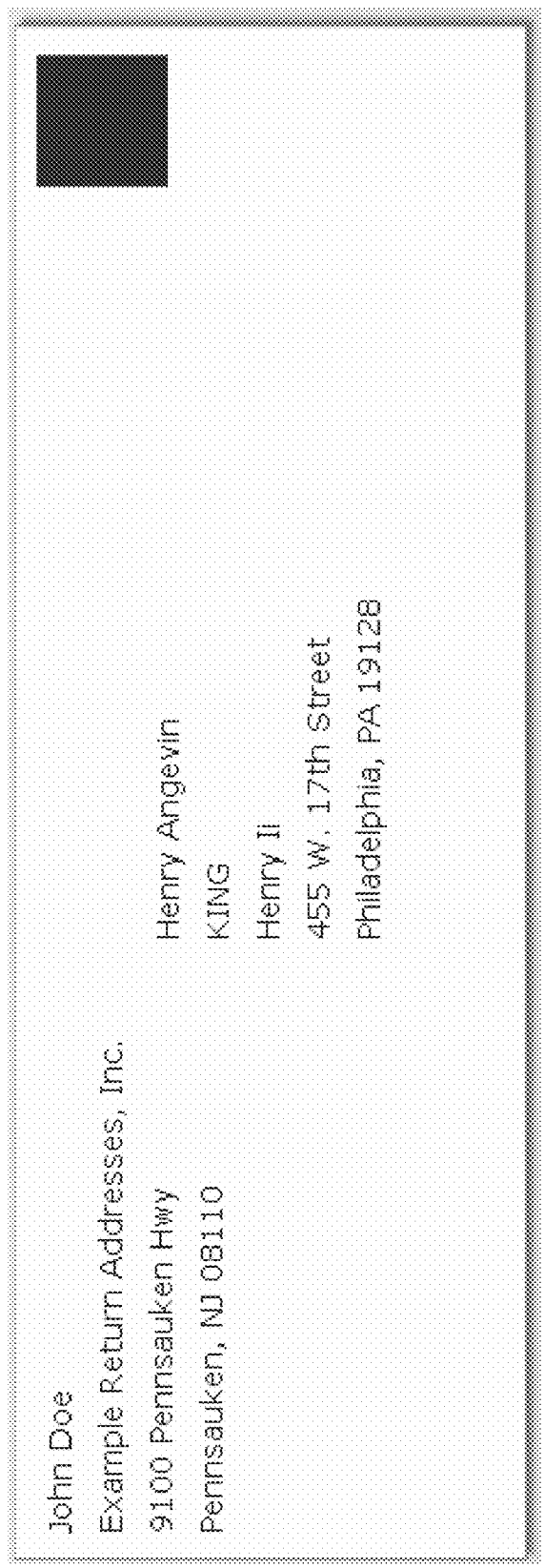
Figure 19D:
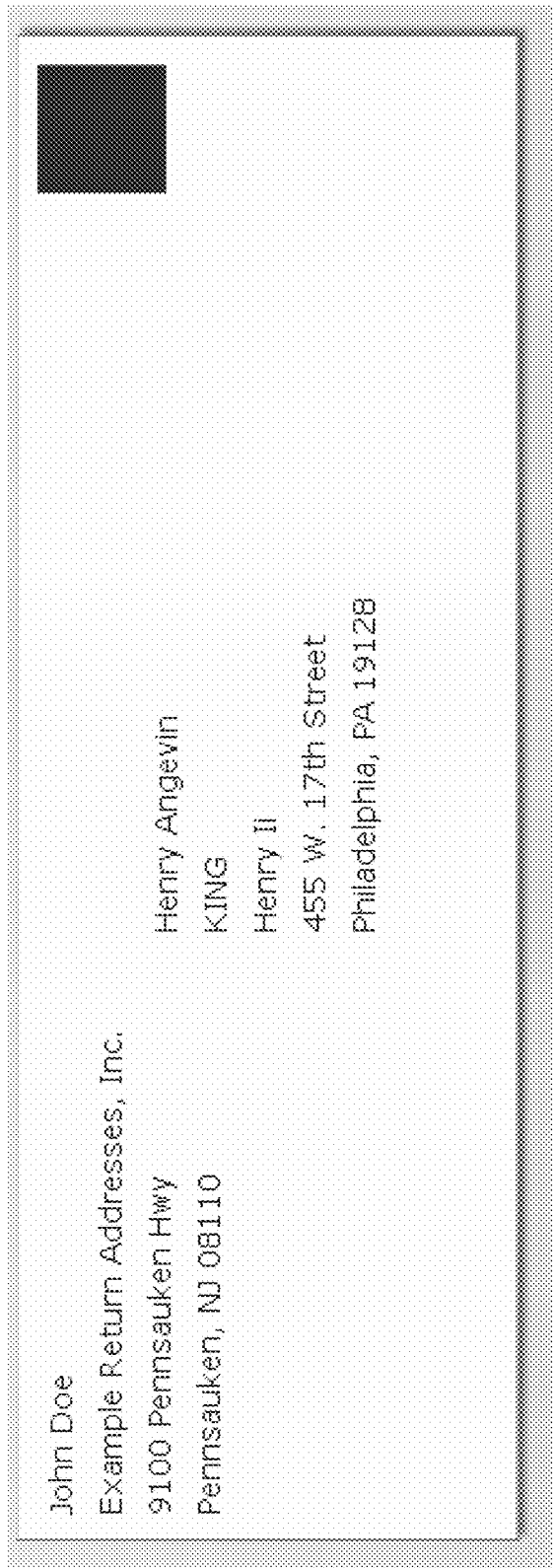
Figure 20C:
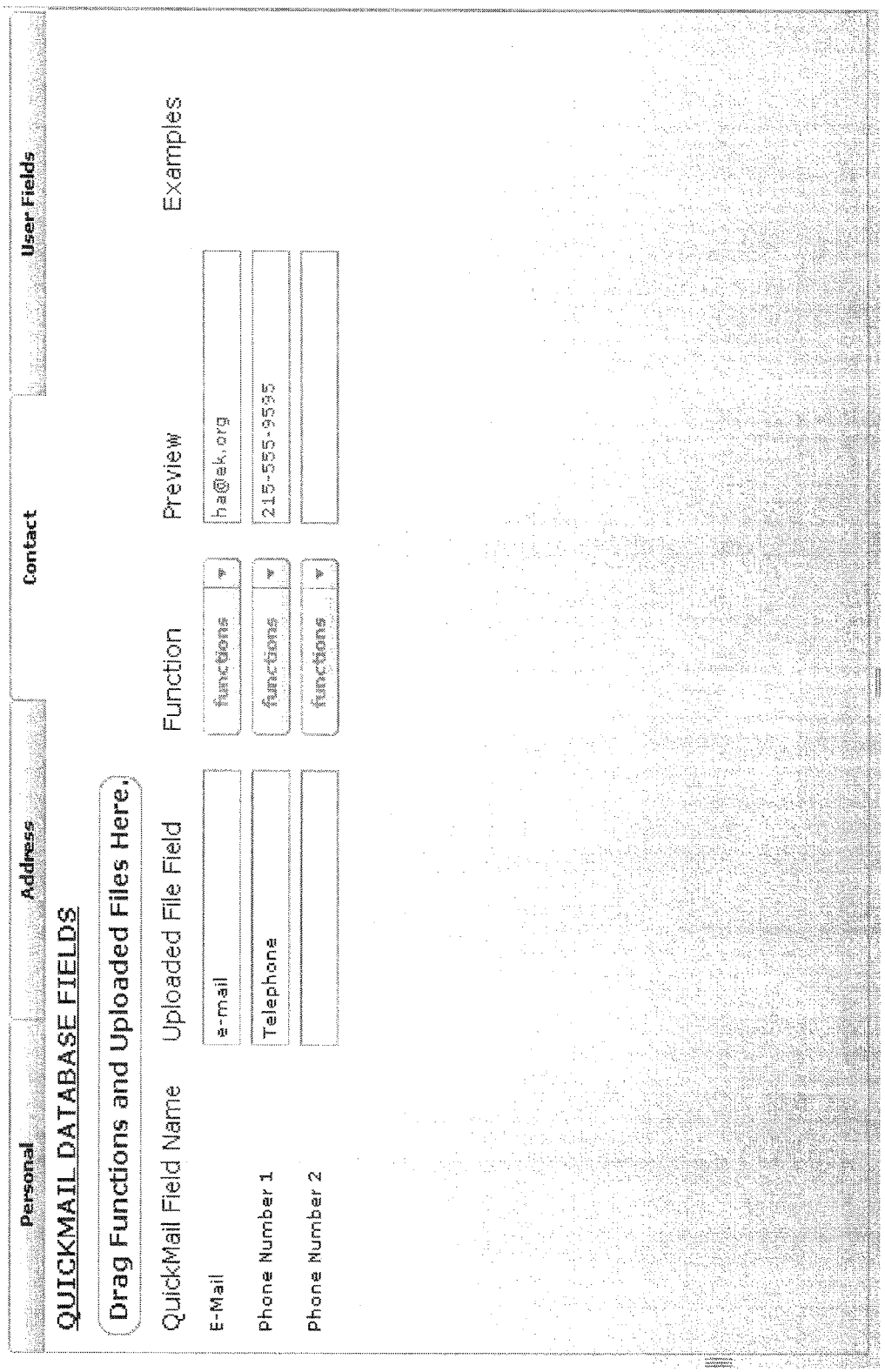
Figure 20D:
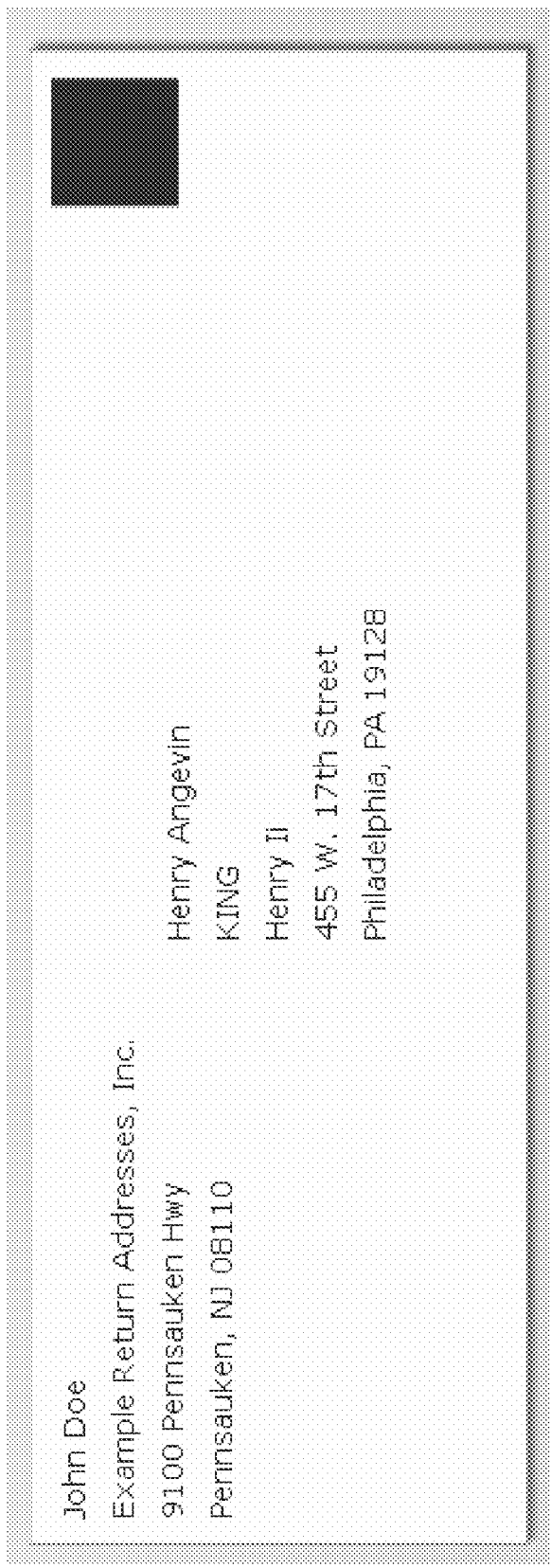
Figure 21C:
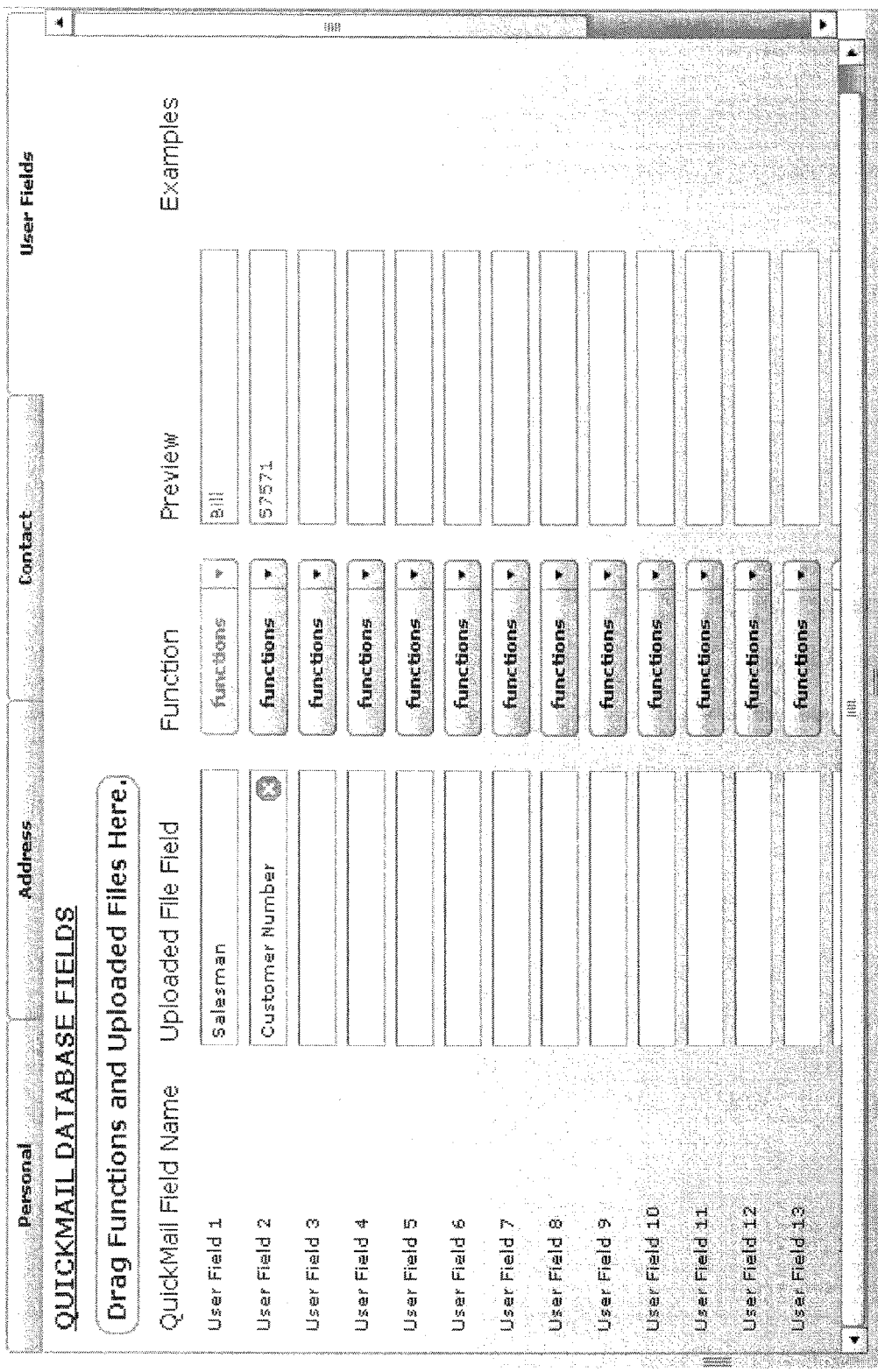
Figure 21D:
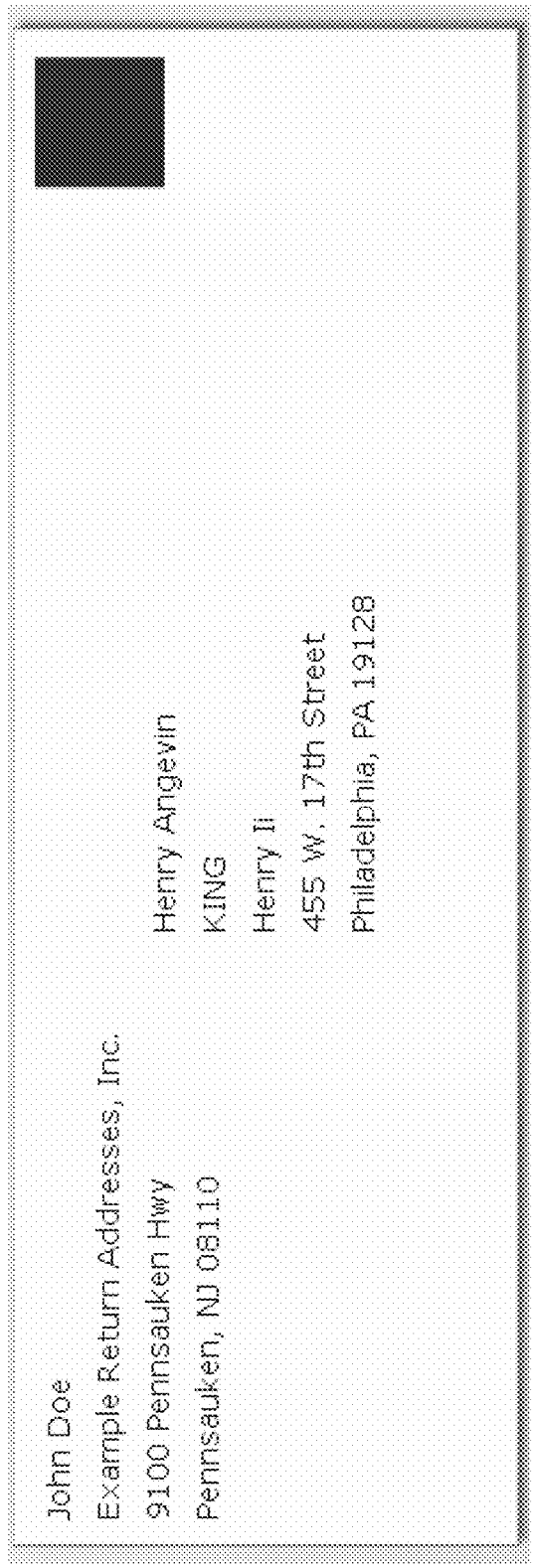
Figure 22D:
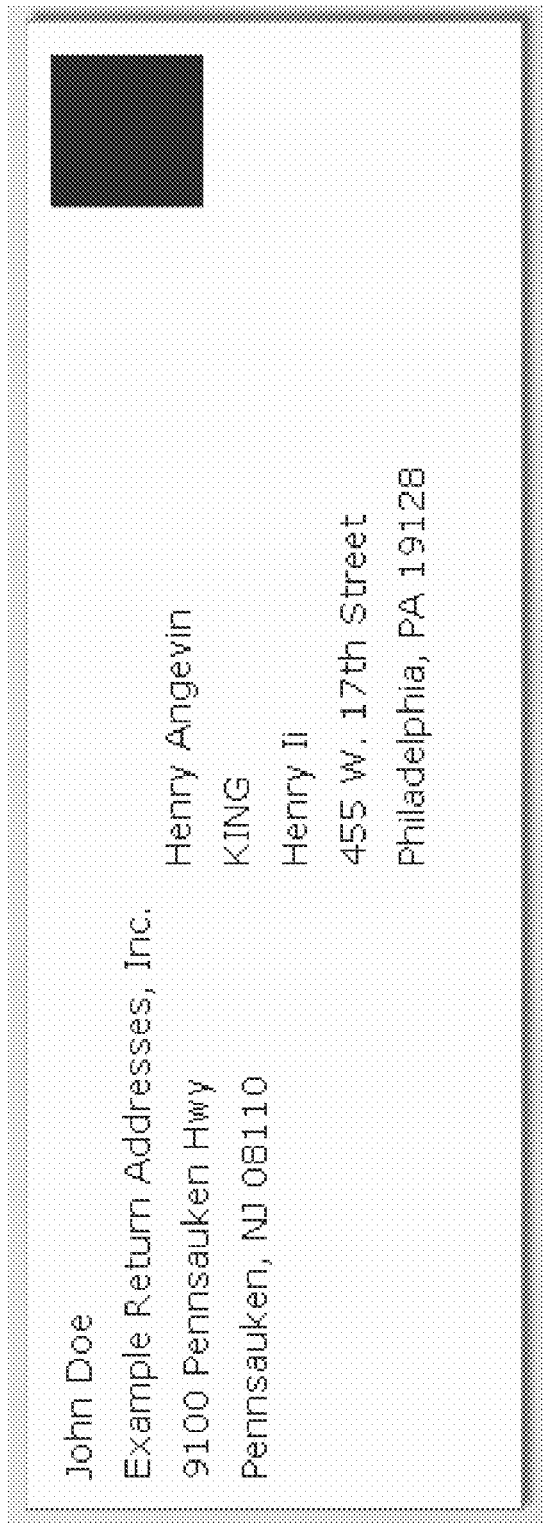
Figure 23C:
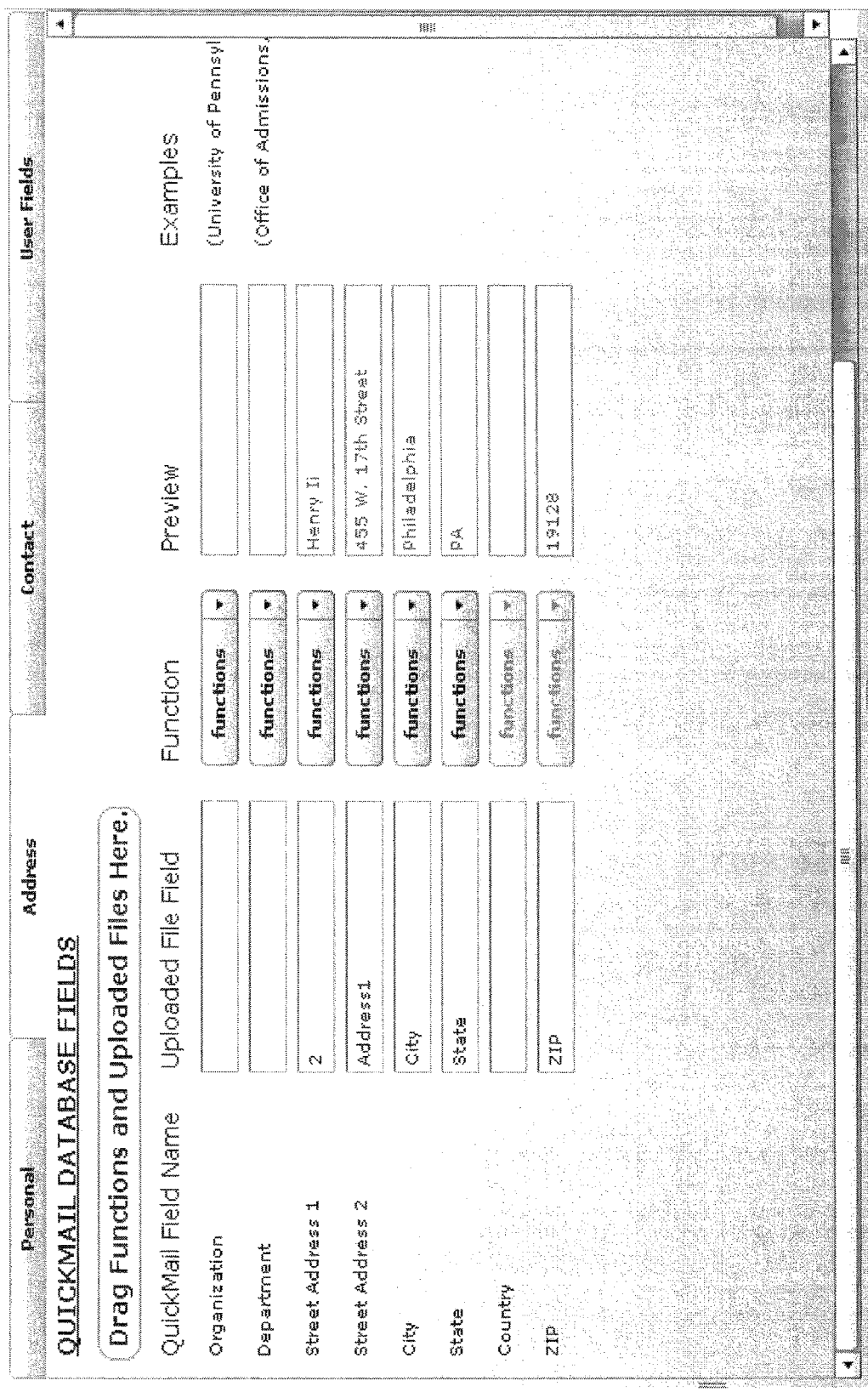
Figure 23D:
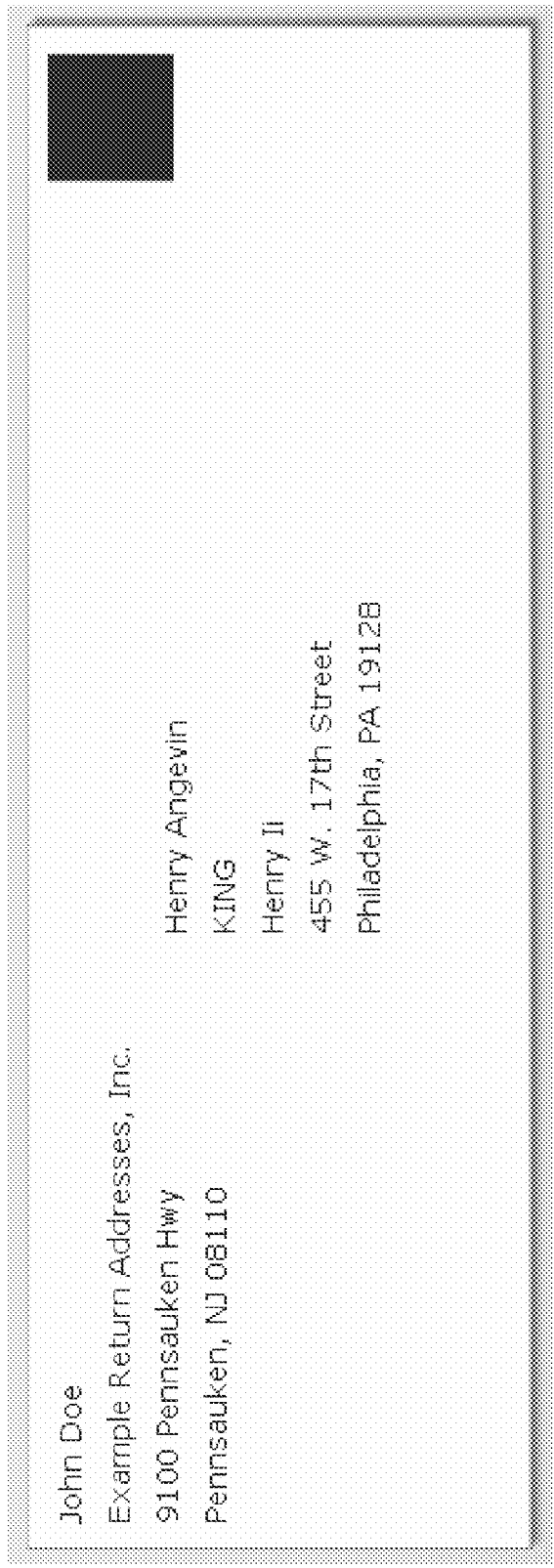

FIG. 8 shows a selection screen. This screen appears when the program detects multiple usable lists within the one file uploaded by the user. From this screen, the user can decide which list to process with the available Data Connectors.

FIGS. 9A-9D, taken together, show the opening screen of the List Mapper program. Within List Mapper, the user may chose to map their list either manually or with the aid of an interview style, automated Data Connector selection. The preview fields are a small subset of the entire list to provide the user with visual guidance.

Figure 10C:
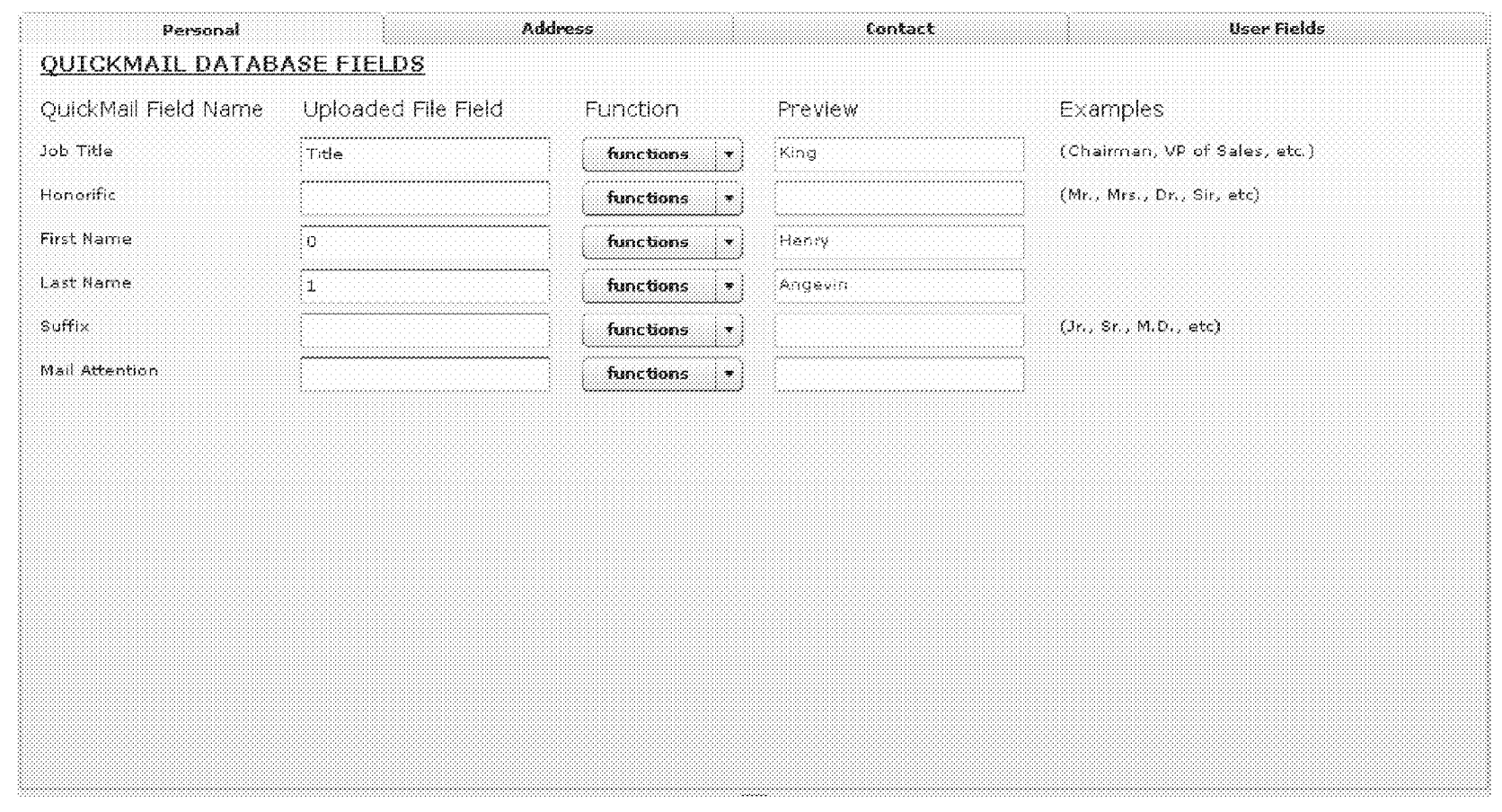

FIGS. 10A-10D, taken together, show the beginning of the automated interview process. The user follows the directions provided on the top left of their screen to complete the mapping process.

FIGS. 11A-11D, taken together, show the functions which can be applied to the selected field while following the automated interview process. Selecting a function will cause a data transformation to occur when the actual list is processed.

FIGS. 12A-12D, taken together, show an example of a user-selected applied function. In this example, the user has selected 'upper case' for the 'title' field. The title "King" now appears in all upper case letters in the preview in both the interview and on the "envelope".

FIGS. 13A-13D, taken together, show the continued process of the automated interview. Having identified the 'title' field, the user is then asked to identify the subsequent desired field. This continues until all required and common optional fields are completed.

FIGS. 14A-14D, taken together, show the List Mapper screen with the automated interview option closed. This screen allows for manual drop and drag manipulation of the data mapping and transformation operations.

FIGS. 15A-15D, taken together, show the user manually selecting a Data field (Address 2) from the source fields.

FIGS. 16A-16D, taken together, show the user dragging the field selected in FIGS. 15A-15D towards the target fields (Street Address 2).

FIGS. 17A-17D, taken together, show the data field dragged in FIGS. 16A-16D successfully dropped into a corresponding target field.

FIGS. 18A-18D, taken together, show the 'address' tab of the target fields successfully filled.

Figure 19C:
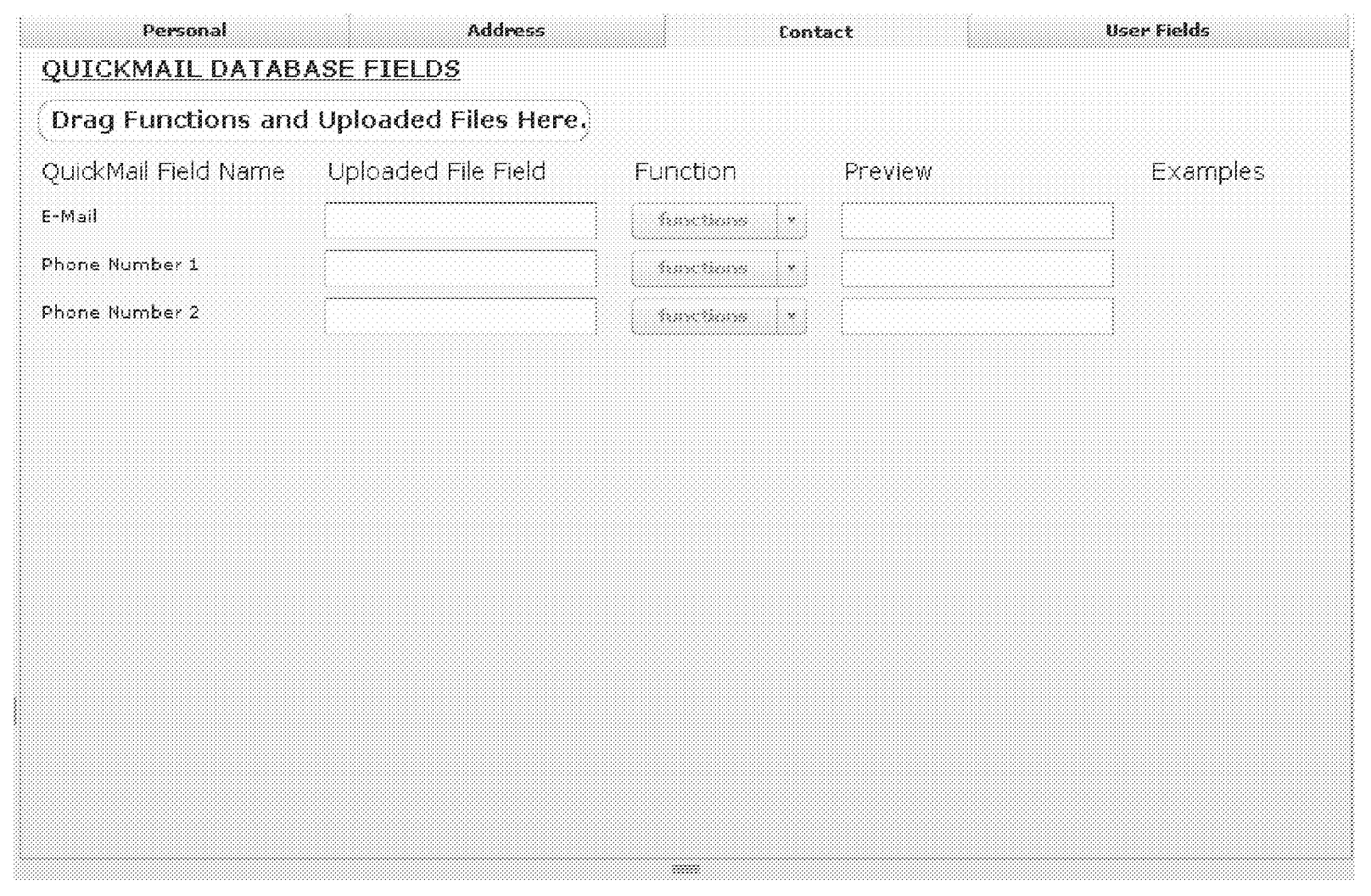

FIGS. 19A-19D, taken together, show the 'contact' tab of the target fields. This tab offers fields relating to contact information (e.g. Phone numbers and e-mail).

FIGS. 20A-20D, taken together, show the 'contact' tab of the target fields successfully filled.

FIGS. 21A-21D, taken together, show the 'user fields' tab of the target fields. Within this tab, the user can define fields not already available within the previous tabs. These fields allow the user map data according to his/her informational needs.

Figure 22C:
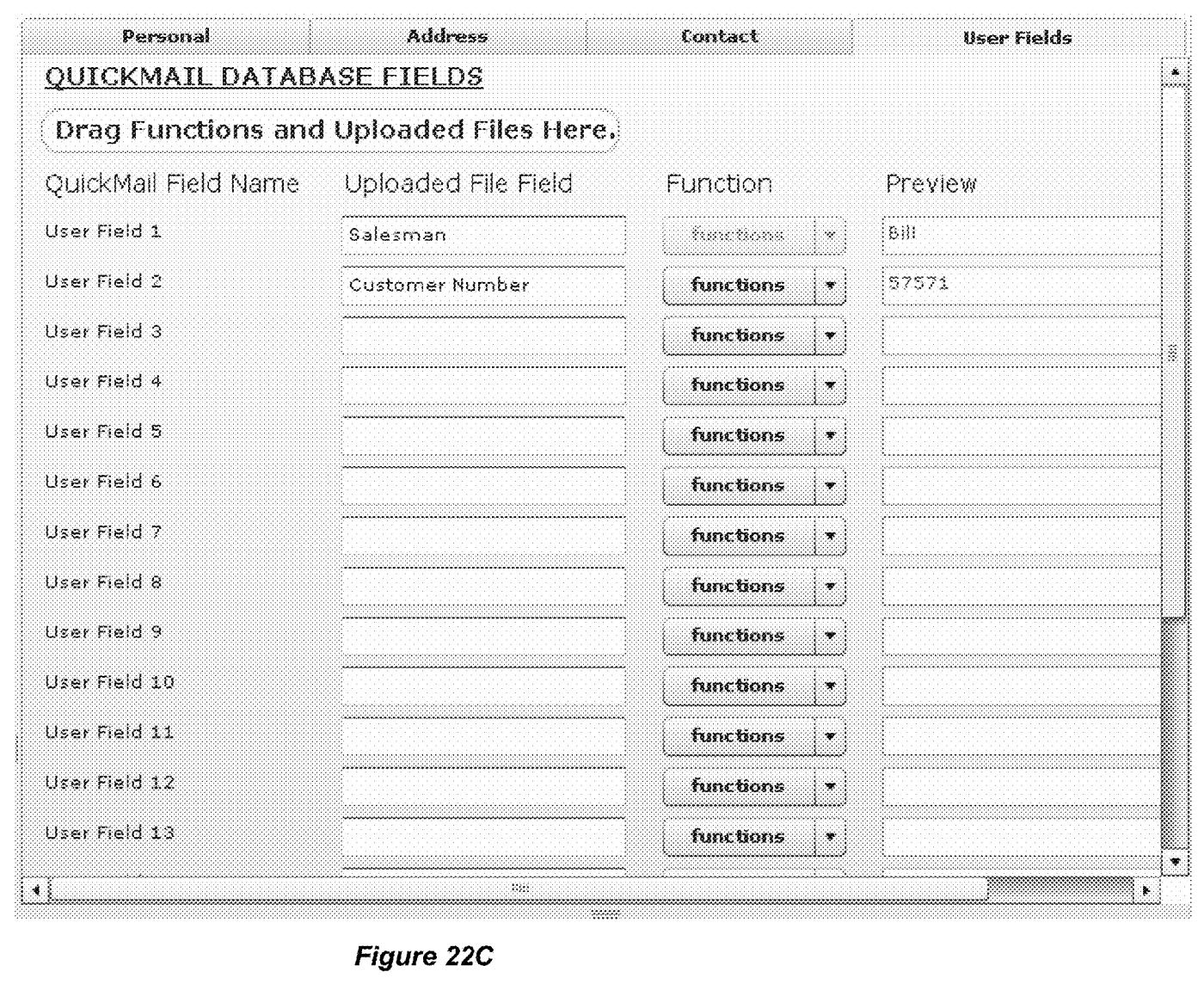

FIGS. 22A-22D, taken together, shows the Data Connector Library open. From this screen, the user can select whichever Data Connector best suits the information entered. The Data Connectors each have a "score." In this example, the scores range from −85 to −100. The higher scores are better; however, negatives scores indicate a less than acceptable match. The creator is also displayed. In this example, the user is the creator for all the available connectors—If public or shared connectors were available for use, their origin would be indicated in the creator field. The field mapping and preview data reflect the selected Data Connector. As the user changes the selected Data Connector, the previews and mapping information are updated. In an automated mode, the system will select the Data Connector with the Highest Score, and then evaluate if the score is greater than the acceptable threshold. If the score is below the acceptable threshold, the user will be prompted to edit an existing Data Connector or create a new Data Connector.

FIGS. 23A-23D, taken together, show the DPV (Delivery Point Validation) Validator open. Since this list is being used for Direct Mail, the United States Postal Service DPV function is being applied to the sample "preview" data to help determine the quality of the transformation and mapping. In this case, the list contains poor data, and may be unsuitable for mailing since a high percentage of the addresses are being evaluated to be undeliverable. The same result would also occur if the mapping and transformation being previewed were incorrect. For other types of lists, the DPV operation would be replaced with an appropriate evaluation. (For instance, for FedEx® distribution, the addresses would be "bounced" off the FedEx ATOM server for verification of deliverability).

Figure 24:
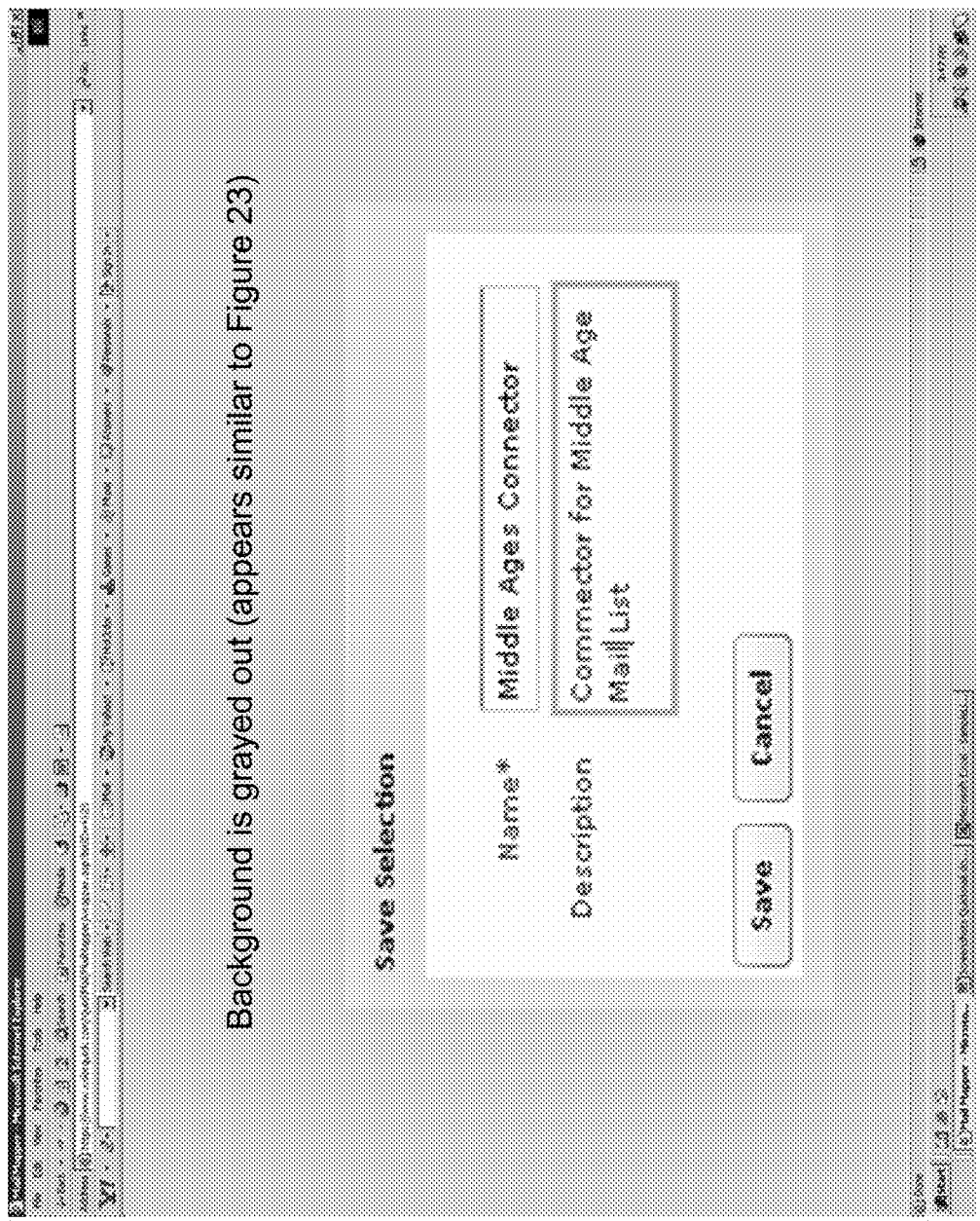
Figure 25C:
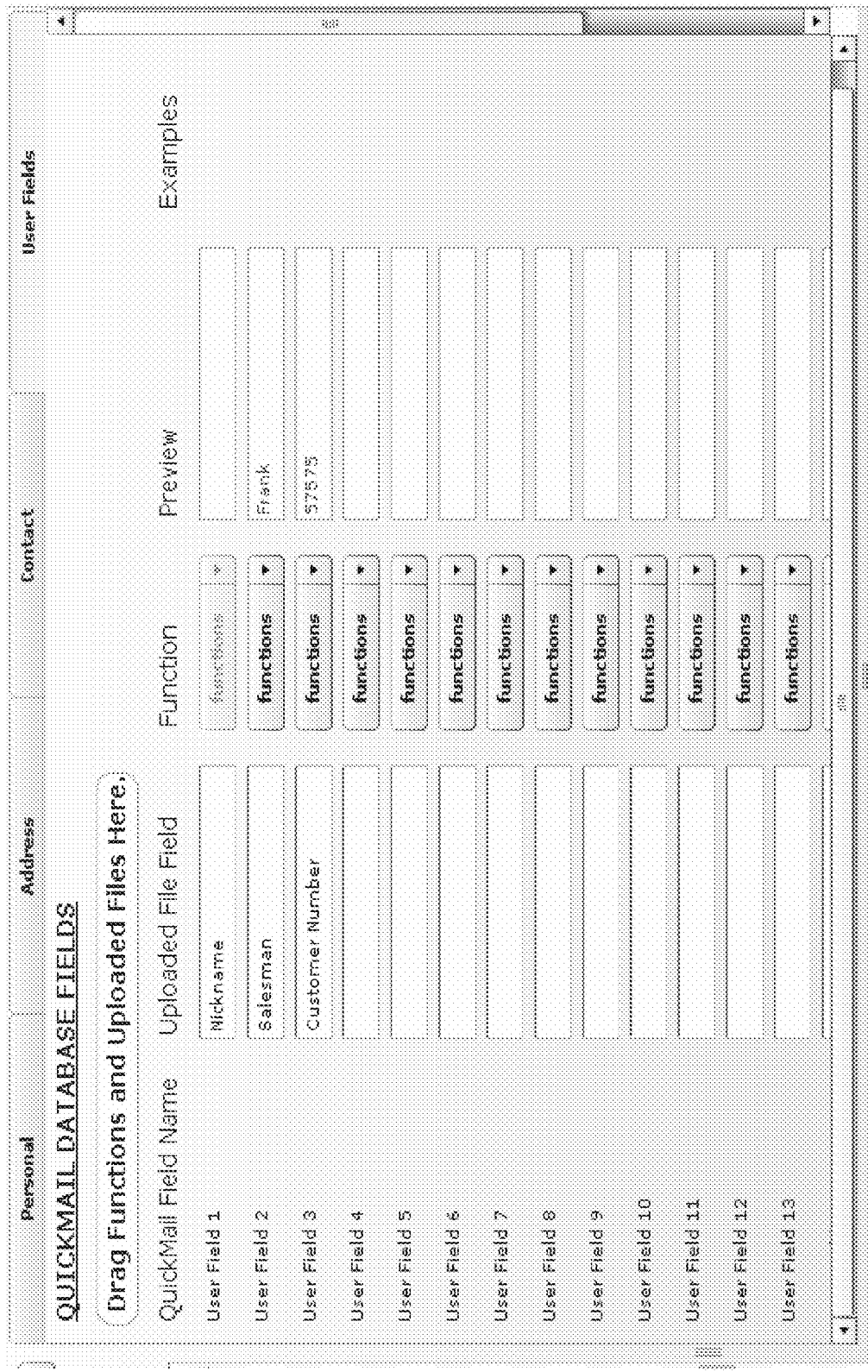
Figure 25D:
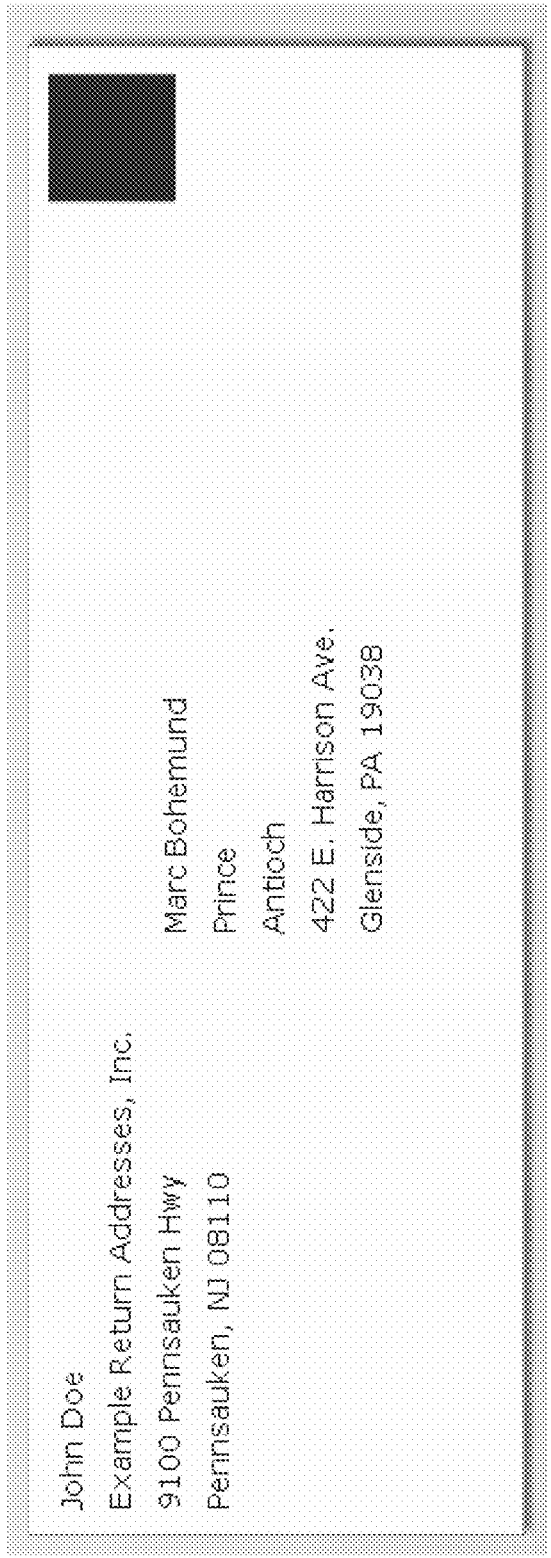

FIG. 24 shows the screen which results from selecting 'Finish' on the List Mapper screens FIG. 9-23. Here, the user has the option to save, name and describe the Data Connector he/she has created either from scratch or by editing an existing Data Connector.

FIGS. 25A-25D, taken together, show that by manipulating the scroll-bar at the bottom of the source field column, the user can view the different records included on the list. This feature is available at all times.

FIG. 26 shows the Administrator Console screen after a list is completed. The user can now see his primary active list named at the top of this screen.

Figure 27:
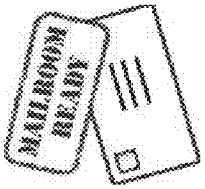

FIG. 27 shows the user's list Assets screen. The user can access this page via the Administrator Console (FIG. 26) by selecting 'Browse/Search Lists'. Lists that have been "normalized" through using the Data Connector Library feature are shown as "Mailroom Ready."

Figure 28:
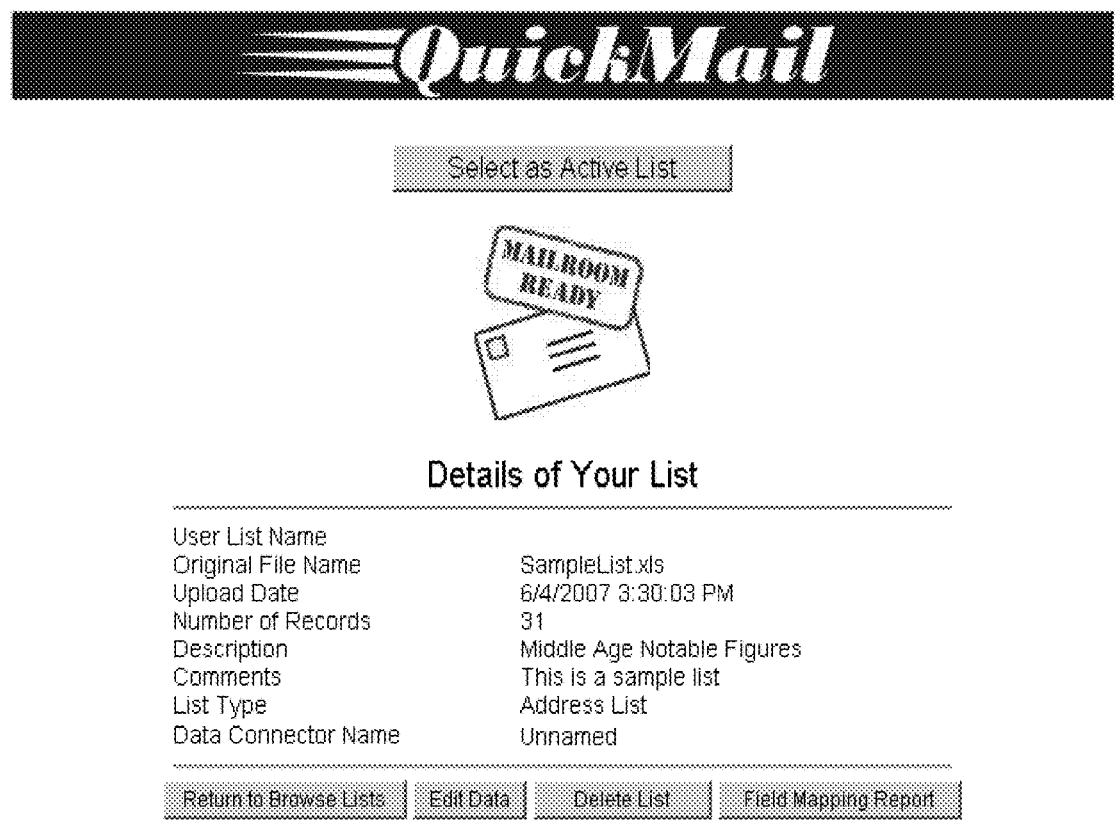

FIG. 28 shows a detail screen for a selected list. By selecting a list in FIG. 27, the user can reach this screen, from which he/she can edit the list's data, delete the list, or view a Field Mapping Report on the list.

FIG. 29 shows the Edit Data screen. The user can reach this screen by selecting 'Edit List Items' from the Administrator Console screen (FIG. 26). This is a view of the user's data after the list has been through the Data Connector normalization process.

Figures 30A, 30B:
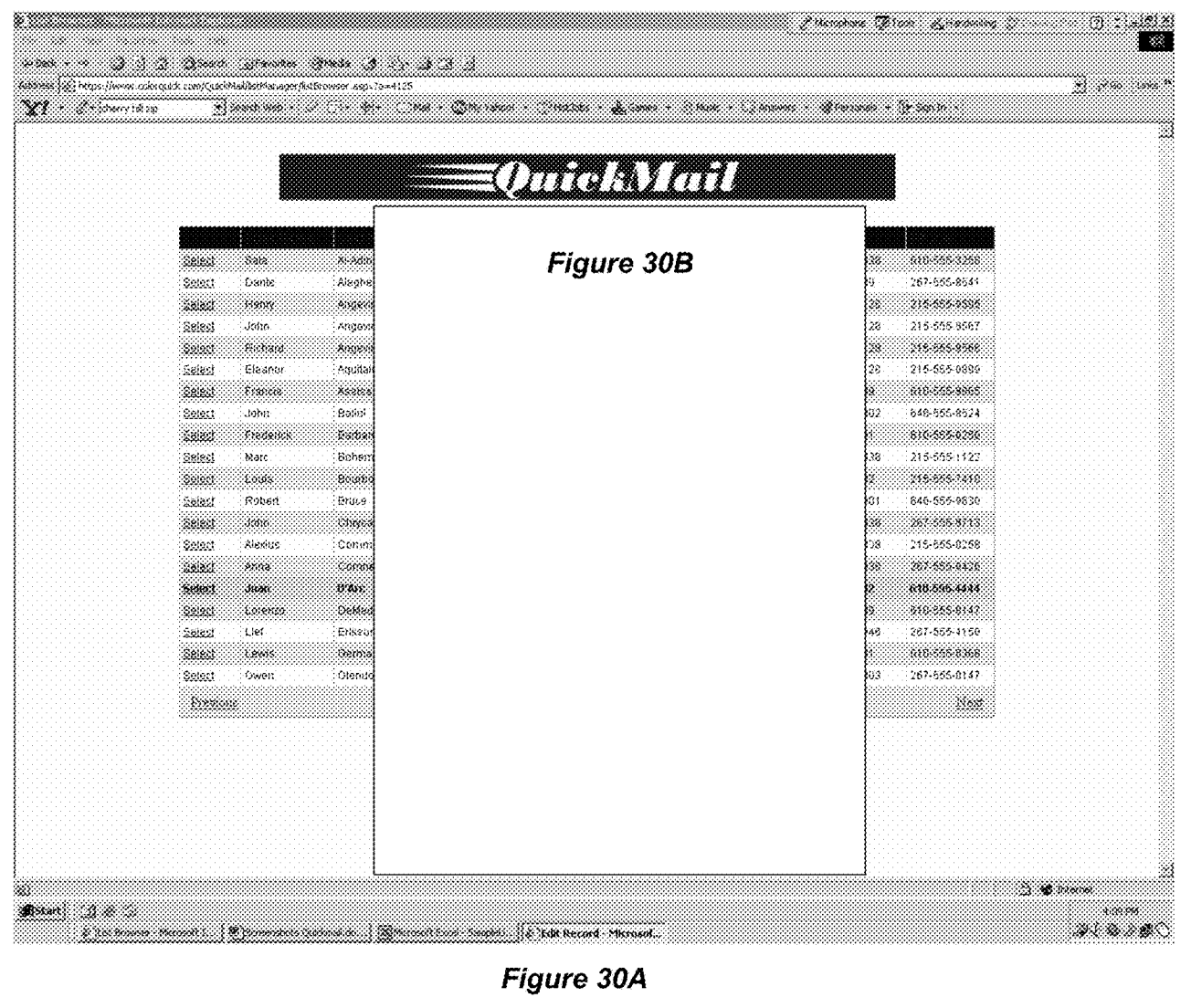
Figure 30B:
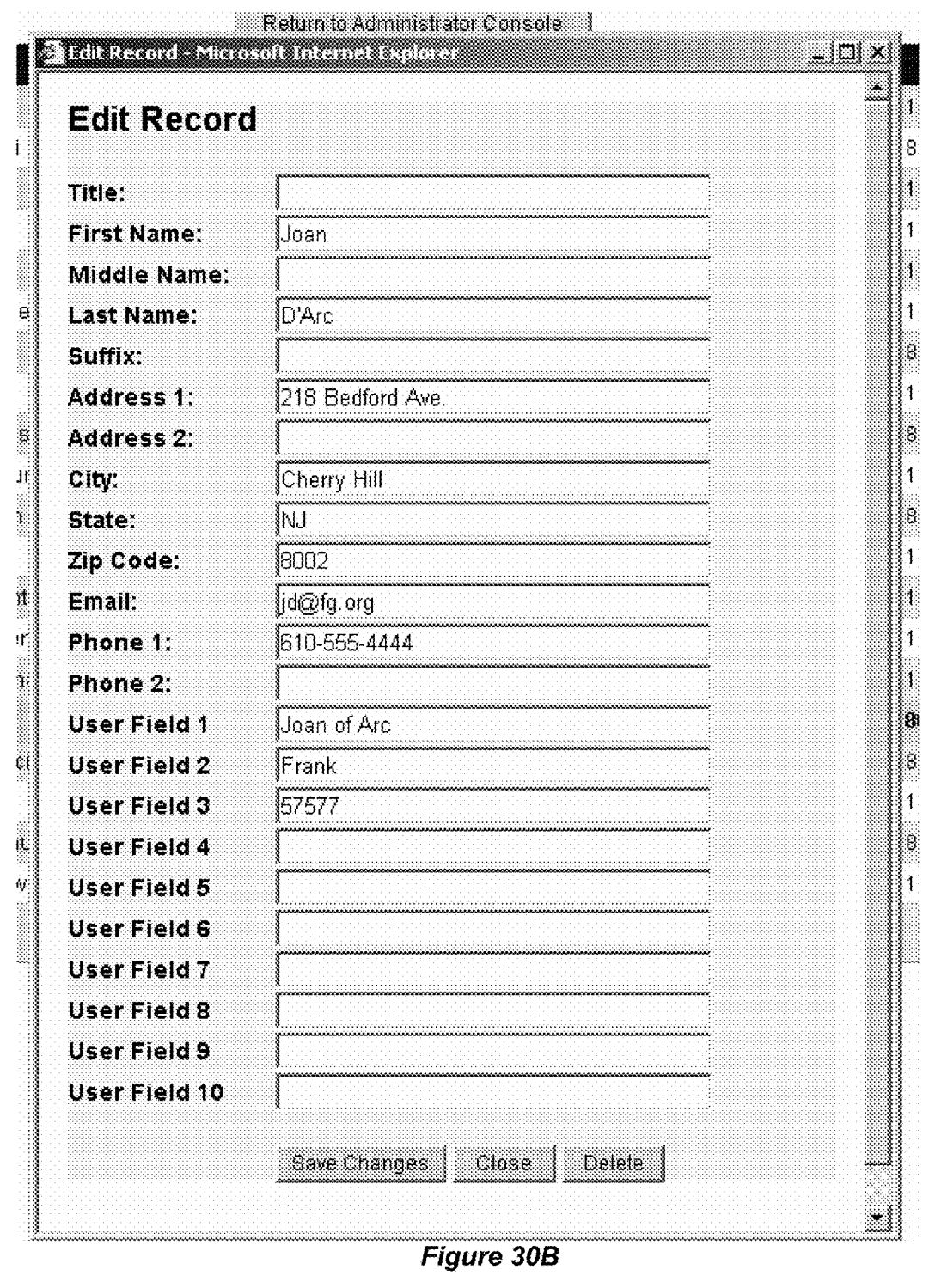

FIGS. 30A-30B, taken together, show the Edit Record screen. This screen can be reached by clicking the 'select' link next to the desired record. Within this screen, the user can edit any of the data imported using the Data Connector.

Figure 31A:
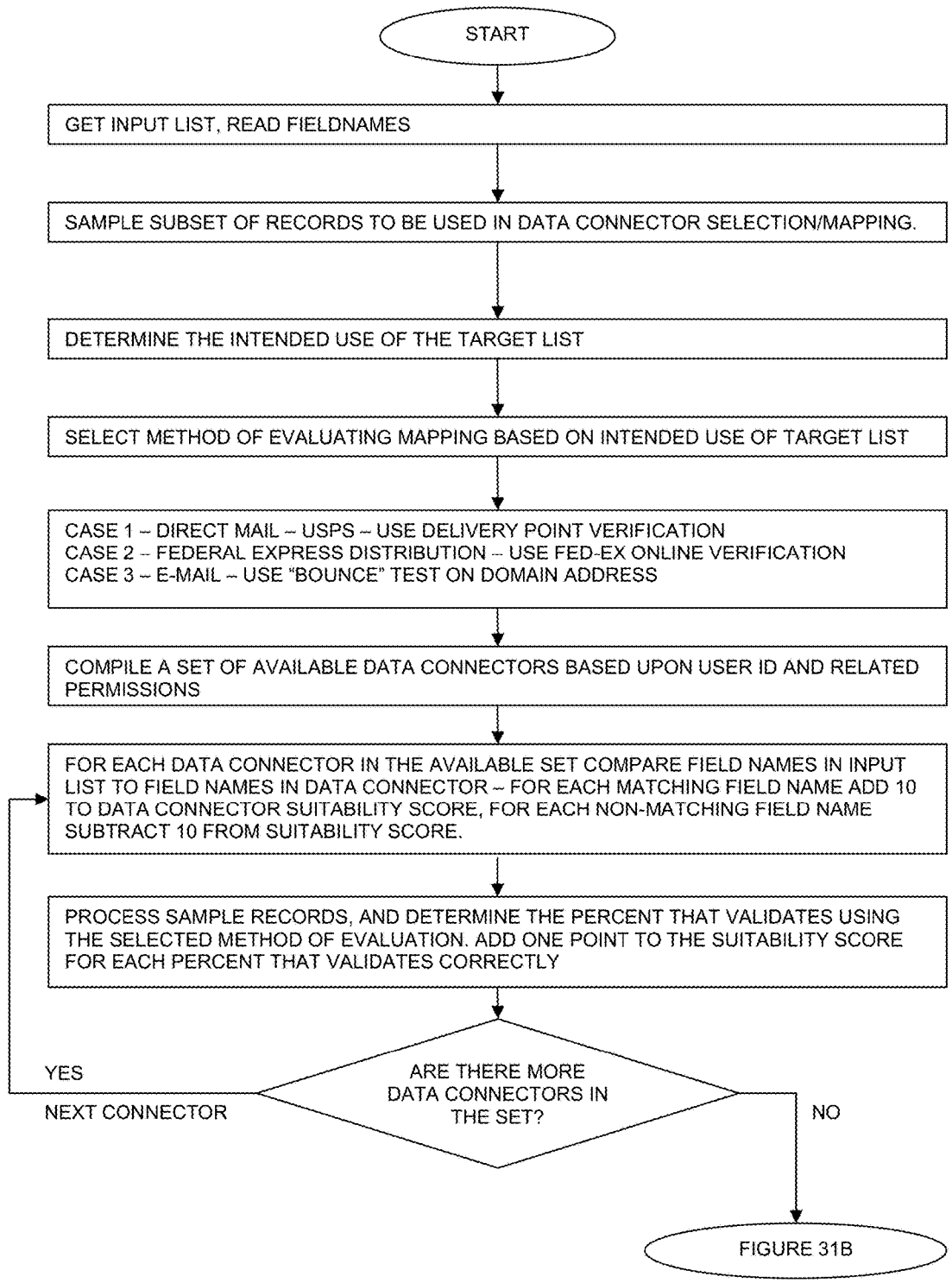
FIGS. 31A and 31B, taken together, show a flowchart of one preferred embodiment of the present invention.
Figure 31B:
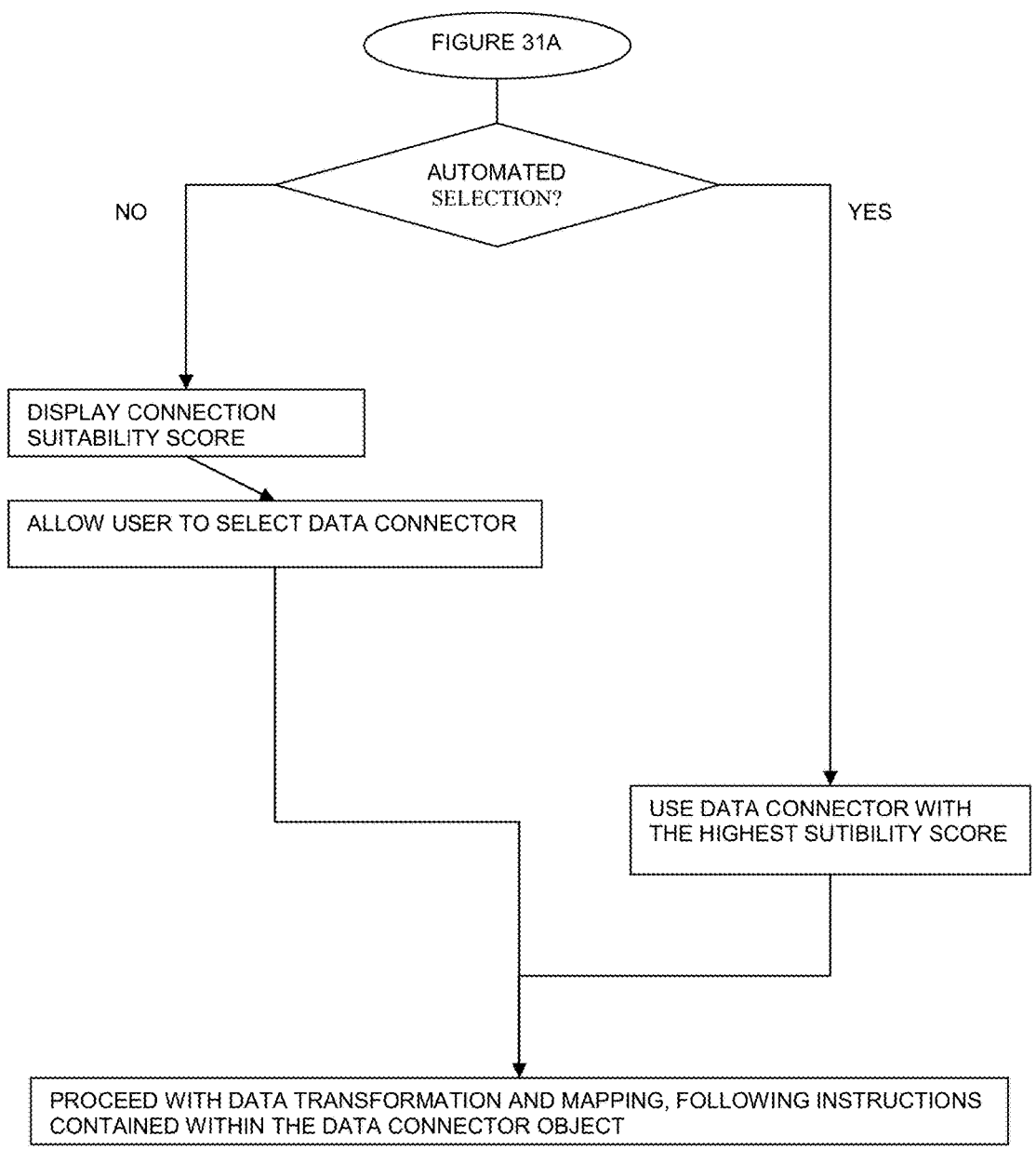

FIGS. 31A and 31B, taken together, show a flowchart of a verification process.

Figure 32:
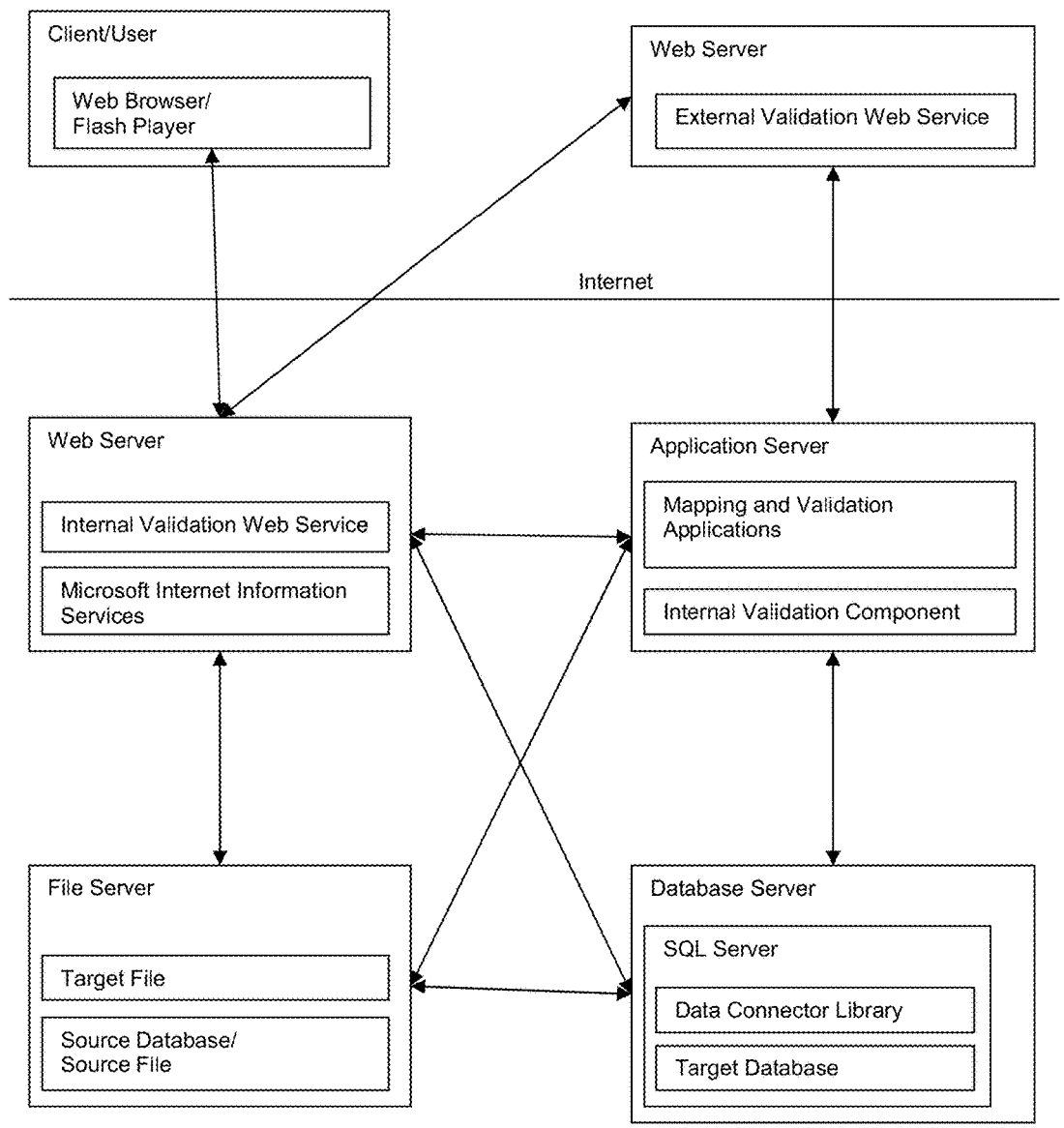
FIG. 32 shows a schematic diagram of a hardware configuration in accordance with one preferred embodiment of the present invention.

FIG. 32 shows a hardware diagram in accordance with one preferred embodiment of the present invention. In this embodiment Microsoft's Internet Information Service is used as the HTTP server. Various validation methods are implemented as described in FIG. 31A such as USPS Delivery Point Validation. These validation methods can be implemented in various locations and through different interfaces. In this case, External Validation Web Services are implemented offsite, Internal Validation Web Services are implemented onsite to allow access by internal applications and a client computer, and Internal Validation Components are implemented for methods that are never called from outside of the system.

The process shown in FIGS. 31A and 31B, particularly, the suitability score, allows the Data Connector to be selected based at least in part on the purpose of the target list or target database. For example, if a target list is to be used for a postal mailing, data connectors that do not map postal address fields would receive a zero or very low suitability score, whereas data connectors that do map postal address fields would receive a relatively higher suitability score. If a target list is to be used for a telephone list, a data connector that does not map telephone numbers would receive a zero or very low suitability score, whereas data connectors that do map a telephone list would receive a relatively higher suitability score.

Figure 33:
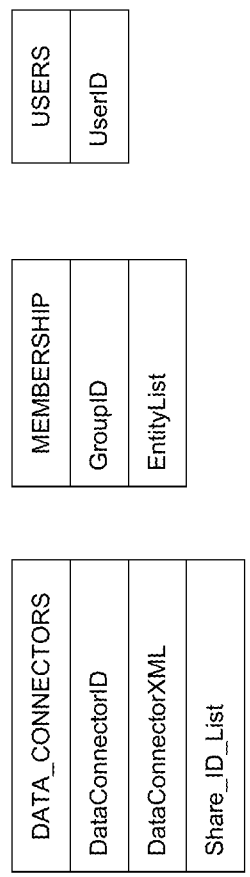
FIG. 33 shows a database schema related to data connectors used in the present invention.

FIG. 33 shows a database schema that allows for restricting access to data connectors. The DATA_CONNECTORS table holds the data connectors as well as a list of IDs that are allowed to access the associated data connector. These IDs can be individual user IDs (from the USERS table) or group IDs from the (GROUP MEMBERSHIP table) which themselves hold a list of member user IDs.

Figure 34A:
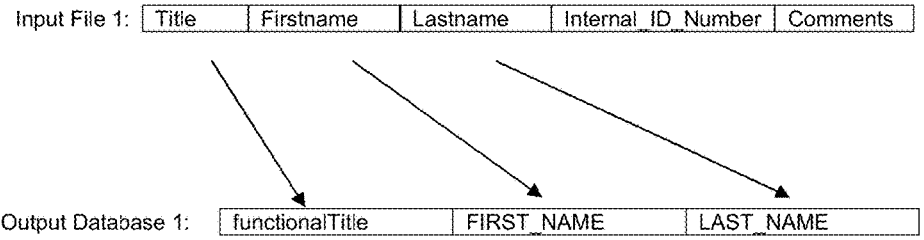
FIGS. 34A-34D and 35-38 show examples of how a data connector is created and used to map one or more source databases/input files to one or more target databases/output files in accordance with one preferred embodiment of the present invention.
Figure 34B:
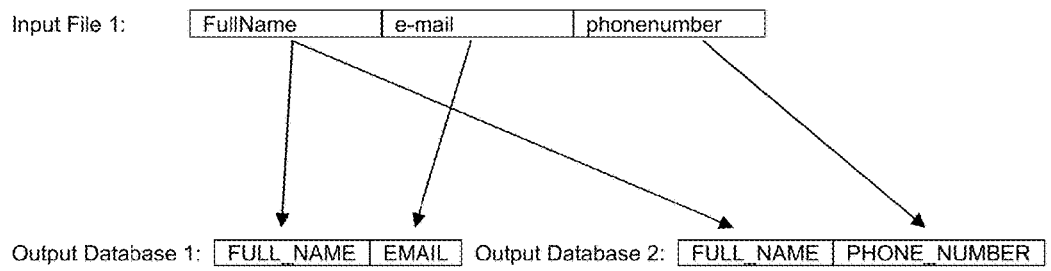
Figure 34C:
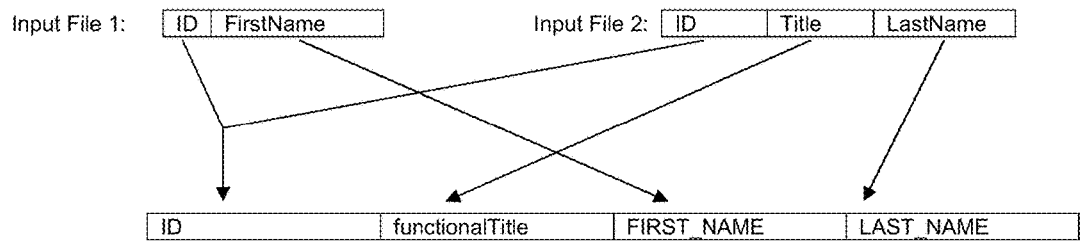
Figure 34D:
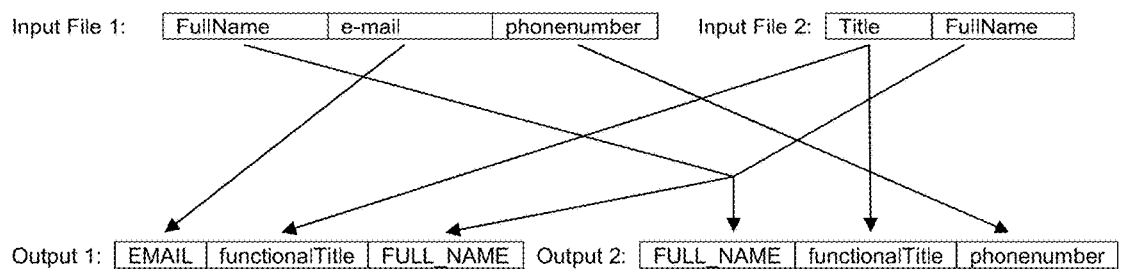

FIGS. 34A, 34B, 34C and 34D show examples of how a data connector is used to map one or more source databases/input files to one or more target databases/output files. FIG. 34A shows a one-to-one mapping, using one data connector, from an internal customer list to a general use customer list. (The solid lines represent mappings performed by a data connector.) FIG. 34B shows a one-to-many mapping from an input file that contains customer contact information to two output files, using one data connector, one being a call list and the other an email list. FIG. 34C shows a many-to-one mapping using one data connector, where a list that contains only a customer first name is merged together with a list that contains customer data which does not include a first name. Records are joined together based on a unique ID that is constant between the lists. FIG. 34D shows a many-to-many mapping using one data connector, where an input file that contains customer contact information is mapped to two output files, one being a call list and the other being an email list. Additionally, a title is mapped to these two output files. The two lists are joined on the full name field.

Figure 35:
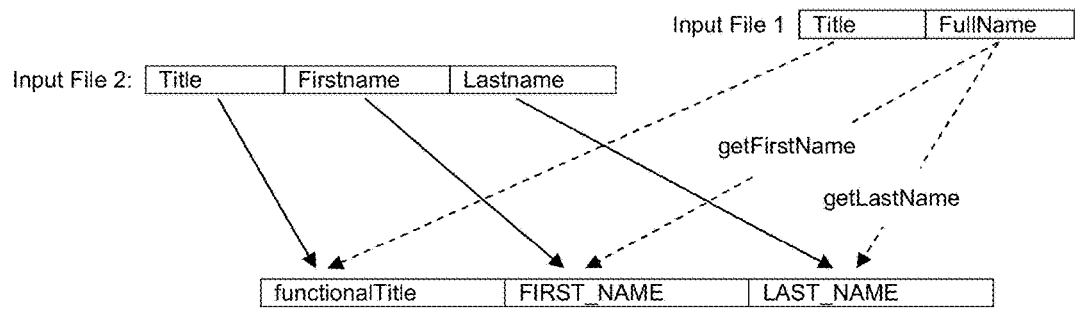

FIG. 35 shows two input files being mapped to one output schema. Each input file is using a different data connector and is being executed at a different time. (The solid lines represent mappings performed by a first data connector and the dashed lines represent the mapping performed by a second data connector.)

Figure 36:
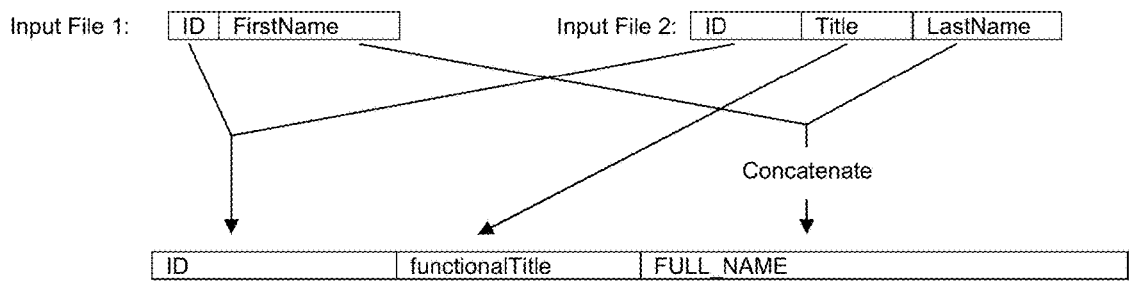

FIG. 36 shows a many-to-one mapping using one data connector, where a list that contains only a customer first name is merged together with a list that contains customer data which does not include a first name. Records are joined together based on a unique ID that is constant between the lists. This figure shows two fields from two different input files being combined into one output field through a function that uses the two input fields as inputs, in this case, concatenation.

Figure 37:
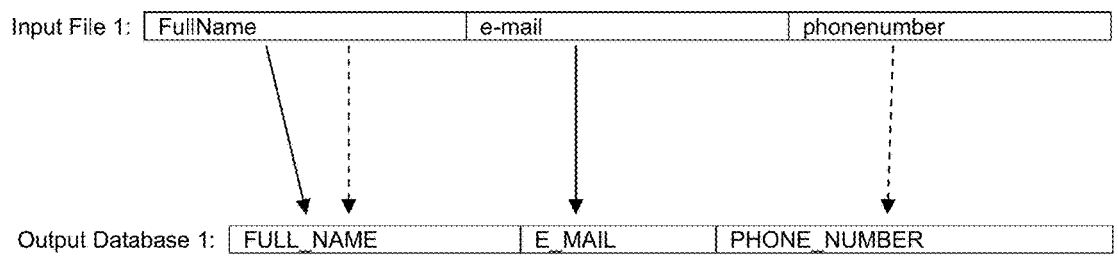

FIG. 37 shows two one-to-one mappings using two data connectors (solid vs. dashed lines for the respective data connectors) where the schema of the input file is the same in both instances, and the schema of the output database is the same in both instances, but the data connectors map the data differently.

Figure 38:
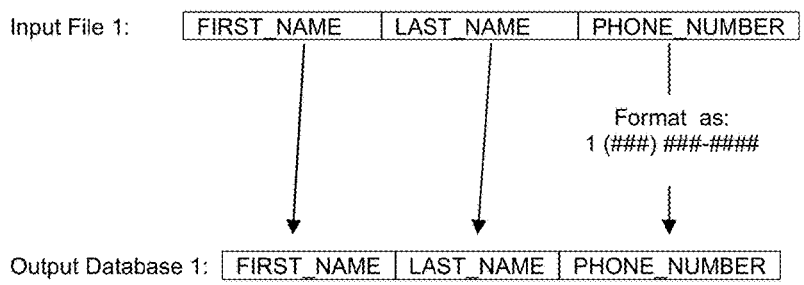

FIG. 38 shows a one-to-one mapping where the input file schema and the output database schema are the same. The mapping may include transformations, such as formatting a phone number.

FIGS. 39-41 show another type of user interface display screen for mapping a source file or database to a target file or database. Fields of a source file are represented by rectangular drag and drop icons on the righthand side of the display screen. Fields of a target database are the fields of the Mailing Database. The transformative operations are represented by oval drag and drop icons on the righthand side of the display screen. FIGS. 40 and 41 show how the source fields and the icons may be dragged and dropped onto the fields of the target database. Multiple transformative operations may be dragged and dropped onto a field of a target database. However, certain transformative operations cannot be used with other transformative operations. For example, only one of the operations "UPPER CASE," "Proper Case," and "lower case" may be selected for a particular field.

In FIGS. 39-41, the text that is shown adjacent to the dark ovals actually appears inside of the dark ovals. Also, for ease of visual use, the "case" ovals may be a different color than the database field ovals.

Figure 42:
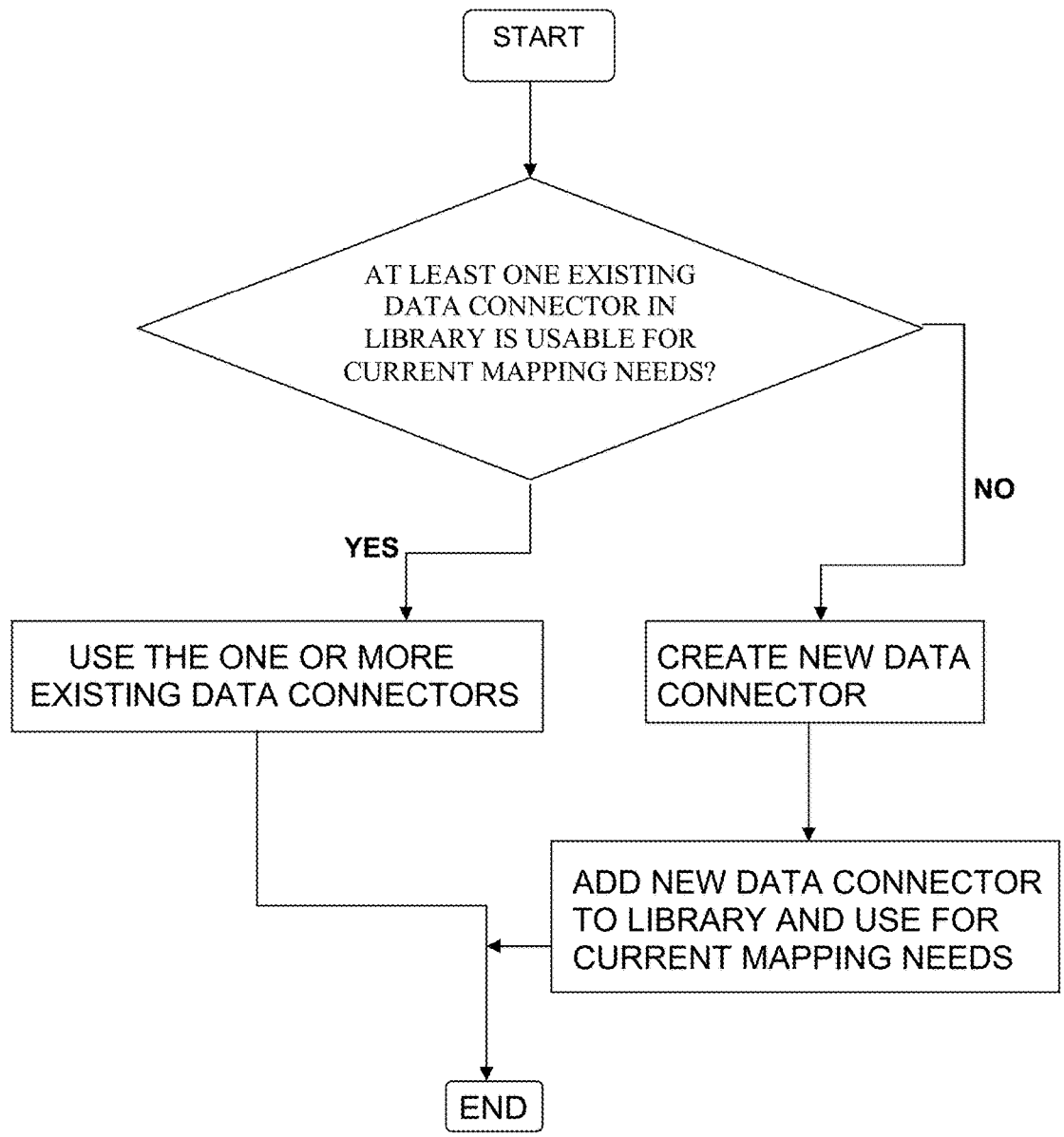
FIG. 42 is a flowchart of a process for creating a new data connector for a library in accordance with one preferred embodiment of the present invention.

FIG. 42 shows a flowchart of a process for determining when to create a new data connector. First, the existing library of data connectors is reviewed to determine if an appropriate (usable) data connector exists. If not, then a new data connector is created and added to the library.

B. Data Connector Explanation

A first embodiment of the present invention provides a system that allows users to upload and normalize mailing lists using their library of Data Connectors.

In one example, a user logs into the system (FIG. 1) and uploads an Excel file over the Internet and enters some descriptive data about the list (FIGS. 2-7). The user then selects the worksheet with the list of interest (FIG. 8). This step is skipped for file formats that can contain only a single list.

Once the list is selected as a "Source List," the List Mapper interface is presented (FIGS. 9A-9D). This provides the user with a number of options to facilitate the remapping of the selected uploaded list into a normalized target format. When the List Mapper is initially loaded, the Field Names in the Source File are compared to field names stored in the user's Library of Data Connectors, and a small sample of data from the new Source File is mapped using each connector with over 50% matching field names. These mappings are then evaluated using a USPS Data Point Validation process to see if the mapping results in deliverable addresses. The Field Name matching and DVP results are then used to rank the available Data Connectors. The Data Connector with the highest rank is then used as a starting point for the user. This is displayed in the List Mapper interface.

If the user is satisfied with the list mapping, the "Finish Button" is pressed and the currently selected Data Connector will be used to Normalize and Transform the data in their list.

If the user is not satisfied with the automatically selected Data Connector, he may use an Interview Process to map his list, and improve the results he is obtaining (FIGS. 9-13). Alternatively, he may use the Drop & Drag Interface (FIGS. 14-21) to map and transform his data.

FIGS. 11A-11D show an example of selecting one data transformative operation (i.e., "Applied Function") for the selected field and visually associating the transformative operation with the displayed mapping. However, the scope of the invention includes selecting a plurality of transformative operations for the selected field. For example, the following transformative operations may be selectable for the "First Name" field:

1. Case formatting: Select one of Proper Case, UPPER CASE, lower case
2. Name parsing: Get first name, Get first word A transformative operation such as a case formatting changes the appearance, but not the value, of a field. (The phrases "transformative operation," "data transformation," and the word "transformation" are all used interchangeably herein.) At the lowest data level, a case formatting changes the ASCII character set, but the meaning of the text string is identical. (The "value" of a field is used synonymously herein with the "meaning" of a field.) As illustrated above, transformative operations may be general (e.g., case formatting may be applied to any field) or field-specific (e.g., name parsing applies only to fields with names). A data connector always specifies a mapping but does not necessarily have to include any transformative operations.

A data connector may also be used when it is desired to perform a transformative operation on a source file or database without changing the number or identification name of the fields. The target file or database is thus identical to the source file or database, but with the transformative operation applied to the data in the fields of the source file or database. Consider an example wherein the transformative operation is a value transformation, such as by adding 3% to all values in a particular field of the source file or database to implement a price change to all articles for sale in a database. The target file or database can then be copied back into the source file or database after the transformative operation is verified. In effect, the source and target are the same. In this example, the mapping of the data connector is a one-to-one mapping.

Furthermore, the data connector may include conditional operations. For example, the transformative operation may be conditional such that 3% is added only if a field meets certain conditions (e.g., an article type field indicates that the article type is clothing).

FIGS. 11A-11D show a dropdown menu implementation of selecting a data transformative operation. In an alternative embodiment, a drag and drop operation may be used to select the data transformative operation by dragging the data transformative operation and dropping it in or near the selected field that the transformative operation acts upon.

At any time, the user may display the Available Data Connectors (FIGS. 22A-22D), and select a different one. When selected, the Tabbed Interface with the field mapping and transformations will be updated to reflect the selected data connector. In addition, the Preview information on the "Envelope" is also updated. If no existing Data Connectors meet the user's needs, he may create a new one entirely from scratch by clicking on the "New" button. The user may then return to the Interview, or Drop and Drag the Source File Fields onto the Tabbed Target File area. Data transformations may also be selected to be executed when creating the target database. Depending on the user, and their security settings and group association, data lists may be kept in separate databases, tables, or created virtually as part of a larger single table.

The user selectable data transformations allow for field mapping of multiple source fields into a single target field. For instance, a First_Name field and a Last_Name field from a Source list could be concatenated together to create a Full_Name in the target. Conversely, a Full_Name field from a Source list could be broken down by a data transformation that extracts the first name and maps that to the First_Name field in the Target list, and extracts the Last Name for the Last_Name field and maps that to the target list.

Fields can also be used to drive conditional mapping. For example, if in the Source list Address2 field is blank, then map Address1 to the Address2 field. (Standard USPS addressing uses the second address field only and leaves the first address field blank in the case of a single address line.)

The user may also display the DPV results for the sample data at any time (FIGS. 23A-23D) Poor list data can cause a good data connector/list format match to have a poor outcome, so this test doesn't always reflect the quality of the mapping and transformations contained in the Data Connector. It does, however, give the user an accurate indication of the quality that the resultant list is likely to have, which is really more valuable information.

Another display feature of the List Mapper is the ability to page through the sample records (FIGS. 25A-25D). This allows the user to see how the data mapping and transformations apply to different records, prior to processing an entire list.

If a new or edited Data Connector is created during the user session, when the Finish button is pressed, a Save Box is displayed (FIG. 24). This collects a name and description of the Data Connector for use in future selections, and then adds the Data Connector to the user's Library of Data Connectors. If a user agrees to share its Data Connector(s) and if a System Administrator approves them, then the Data Connector(s) become Public Data Connector(s).

Once the list is processed by following the instructions contained in the selected Data Connector, it is available as a digital asset in a normalized form. This allows the user to use a common interface, and tools to further manage their mailing list (FIGS. 26-30).

Other embodiments substitute different tests of data usability for the DPV test, and change the "Envelope" preview to a more appropriate symbol. For instance, in testing for Federal Express delivery, the sample address is sent to a verification service provided by Federal Express as a web service, and the result code from Federal Express is used to validate the address record given the current Data Connector mapping and transformations. The "Envelope" is made to look like a Federal Express Overnight Package.

Another example would be testing for e-mail addresses. In this case, one possible test would be extracting the domain from the e-mail address, and looking up the MX record from the domain name service. (An MX record or "Mail exchanger record" is a type of resource record in the Domain Name System (DNS) specifying how Internet e-mail should be routed. MX records point to the servers that should receive an e-mail, and their priority relative to each other.) Based upon the information, a connection to that domain could be made on port 25, and the result of this attempt would be returned. If positive, a further test of establishing an SMTP connection would be done. The results of this, either positive or negative, would be an indicator of the validity of the e-mail address. The connections would then be properly terminated. In this case, the "Envelope" display would be superimposed on a drawing of a computer screen to represent "e-mail".

Data mapping can also be tested by checking fields for expected patterns, data types and relation to other field data in the record. For instance, a domestic telephone number should have 10 digits, the first three being a valid area code. This is easy to check as a validity test for the correct mapping of a telephone number. A test for first name and gender mapping could check against a database of first names and expected gender to see if there is a high percentage of records that agree. If there is not a high percentage of agreement, either the first name or gender fields are likely mapped incorrectly.

Depending on the purpose of the target list, many other verification tests could be used to ensure that the data mapping is correct, and the list transformation produces usable results. These tests can be used independently or as a series to evaluate the quality of the data connector being applied to map one or more source lists to one or more target lists. When used in series, the test results can be weighted to provide for different relative importance of the various fields being mapped and possibly transformed.

During the verification/validation process for determining the quality of a database mapping, the target database that is created using the sampled subset may be an actual target database or may be a temporary or virtual database that is used just for this process. If the target database is a temporary or virtual database, then once a final decision is made regarding which data connector should be used, the full set of source files are then mapped into the actual target database.

When performing a quality analysis of a database mapping, it may be presumed that the records in the source file or database are of high quality. A database mapping may have low quality due to bad raw data in the source file (e.g., poorly formatted data, missing data), and not due to mapping problems. In many instances, however, a user will not know whether the quality problems exist with the database mapping or with the raw data. However, knowing that there is a problem early on in the process is still an improvement over the prior art even if the exact source of the problem is not known. Likewise, when evaluating the quality of a database mapping, an assumption can also be made that the correct validation test has been selected.

Another embodiment of the present invention allows for the selection of multiple source and target lists. This allows for lists maintained in different tables in a relational database to be processed. In this case, the XML would simply identify more than one Source or Target table, but the interface, field match testing, data transformation, and validity testing would remain the same. Lists from independent Sources could also be handled in this fashion, but a step establishing the relationship upon which to join the lists would have to be added. Creating multiple independent target lists does not require that any relationship be established between them, although it may be useful for reasons such as rejoining the lists.

C. Data Connector Examples

Two data connector examples are provided in the XML files shown below. The xml encodes the field mapping instructions. In the first example, the source file has the name already split into two separate fields: "Firstname" and "Lastname." The "Firstname" source field is mapped directly (with a formatting instruction in this case) to the "FIRST_NAME" field of the target database. The "Lastname" source field will be mapped directly to the "LAST_NAME" field of the target database as well.

In the second example, a source file has been provided which has a "Fullname" field. ("Firstname" and "Lastname" fields may not exist in this file or the user may simply have declined to include them in the mapping.) In this case, a subset of the information is extracted from the "Fullname" source field and then mapped to a field in the target database. The first name in the source field "Fullname" is extracted and mapped to the field "FIRST_NAME" in the target database and the last name in source field "Fullname" is mapped to the "LAST_NAME" field in the target database. Additional transformations may be done before or after this extraction as shown. These differences are seen in the resulting XML.

EXAMPLE 1

```
<connector version="2">
  <outfield id="functionalTitle">
    <infield id="Title" />
  </outfield>
  <outfield id="FIRST_NAME">
    <op name="properCase" label="Proper Case">
      <infield id="Firstname"/>
    </op>
  </outfield>
  <outfield id="LAST_NAME">
    <op name="properCase" label="Proper Case">
      <infield id="Lastname" />
    </op>
  </outfield>
  <outfield id="BUSINESS">
    <infield id="Company" />
  </outfield>
  <outfield id="ADDRESS_LINE_1">
    <infield id="Address1" />
  </outfield>
  <outfield id="ADDRESS_LINE_2">
    <infield id="Address2" />
  </outfield>
  <outfield id="CITY">
    <infield id="City" />
  </outfield>
```

```
<outfield id="STATE">
 <infield id="State" />
</outfield>
<outfield id="ZIP_CODE">
 <infield id="ZIP" />
</outfield>
<outfield id="eMail">
 <infield id="e-mail" />
</outfield>
<outfield id="Phone1">
 <infield id="Telephone" />
</outfield>
<outfield id="USER_DEFINED_1">
 <infield id="Nickname" />
</outfield>
<outfield id="USER_DEFINED_2">
 <infield id="Salesman" />
</outfield>
<outfield id="USER_DEFINED_3">
 <infield id="Customer Number" />
</outfield>
</connector>
```

EXAMPLE 2

```
<connector version="2">
<outfield id="functionalTitle">
 <infield id="Title" />
</outfield>
<outfield id="FIRST_NAME">
 <op name="getFirstName" label="Get First Name">
  <op name="properCase" label="Proper Case">
   <infield id="Fullname" />
  </op>
 </op>
</outfield>
<outfield id="LAST_NAME">
 <op name="getLastName" label="Get First Name">
  <op name="properCase" label="Proper Case">
   <infield id="Fullname" />
  </op>
 </op>
</outfield>
<outfield id="BUSINESS">
 <infield id="Company" />
</outfield>
<outfield id="ADDRESS_LINE_1">
 <infield id="Address1" />
</outfield>
<outfield id="ADDRESS_LINE_2">
 <infield id="Address2" />
</outfield>
<outfield id="CITY">
 <infield id="City" />
</outfield>
<outfield id="STATE">
 <infield id="State" />
</outfield>
<outfield id="ZIP_CODE">
 <infield id="ZIP" />
</outfield>
<outfield id="eMail">
 <infield id="e-mail" />
</outfield>
<outfield id="Phone1">
 <infield id="Telephone" />
</outfield>
<outfield id="USER_DEFINED_1">
 <infield id="Nickname" />
</outfield>
<outfield id="USER_DEFINED_2">
 <infield id="Salesman" />
</outfield>
<outfield id="USER_DEFINED_3">
 <infield id="Customer Number" />
</outfield>
```

```
</outfield>
</connector>
```

These data connector examples are provided in XML. However the scope of the invention includes other implementations of data connectors, such as by using data objects, a list of executable instructions, or an object containing executable code that performs the mapping.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computer-implemented method of assessing the results of a database mapping, the method comprising:
    (a) mapping fields of a source file to fields of a target database using a database mapping;
    (b) converting data in a sampled subset of the records in the source file to records containing the sampled data in the target database using the field mappings;
    (c) selecting a data validator from a plurality of different data validators to test the data in the mapped fields, wherein the selection is made based at least in part on the purpose of the target database; and
    (d) testing the data in the sampled subset of the converted records with the selected data validator to determine the percentage of the records in the sampled subset that are validated using the selected data validator.

2. The method of claim 1 wherein the target database is a mailing database.

3. The method of claim 1 further comprising:
    (e) performing transformative operations on data in at least some of the fields, and step (b) further comprises converting records containing data in the source file to records containing data in the target database using the field mappings and the transformative operations.

4. The method of claim 1 wherein the purpose of the target database is direct mail addressing.

5. The method of claim 1 wherein the purpose of the target database is courier addressing.

6. The method of claim 1 wherein the purpose of the target database is email addressing.

7. A computer-implemented method of assessing the results of a database mapping, the method comprising:
    (a) providing a plurality of different database mappings that map fields of a source file to fields of a target database;

(b) converting data in a sampled subset of records in the source file to records containing the sampled data in the target database using the database mappings, wherein a sampled subset of records is converted for each of the plurality of different database mappings;

(c) testing the data in the sampled subset of records for each of the plurality of different database mappings with a data validator using the data in the mapped fields for the respective database mapping; and (d) identifying the database mapping that provides the highest percentage of records in the sampled subset that are validated using the data validator.

8. The method of claim 7 further comprising:

(e) automatically selecting the plurality of different database mappings to be used in step (a) based on an analysis of the similarity of fields in the source file with fields in the target database.

9. The method of claim 7 wherein the target database is a mailing database.

10. The method of claim 7 further comprising:

(e) performing transformative operations on at least some of the fields, and step (b) further comprises converting records containing data in the source file to records containing data in the target database using the field mappings and the transformative operations.

11. The method of claim 7 further comprising:

(e) selecting the data validator from a plurality of different data validators, wherein the selection is made based at least in part on the purpose of the target database.

12. A computer-implemented method of assessing the results of a database mapping and performing a database mapping, the method comprising:

(a) providing a plurality of different database mappings that map fields of a source file to fields of a target database;

(b) converting data in a sampled subset of records in the source file to records containing the sampled data in the target database using the database mappings, wherein a sampled subset of records is converted for each of the plurality of different database mappings;

(c) testing data in the sampled subset of records for each of the plurality of different database mappings with a data validator using the mapped fields for the respective database mapping;

(d) identifying the database mapping that provides the highest percentage of records containing data in the sampled subset that are validated using the data validator; and (e) mapping the fields of the source file to fields of the target database for all records in the source file using the database mapping that was identified as providing the highest percentage of records in the sampled subset that are validated using the data validator.

13. The method of claim 12 further comprising:

(f) automatically selecting the plurality of different database mappings to be used in step (a) based on an analysis of the similarity of fields in the source file with fields in the target database.

14. The method of claim 12 wherein the target database is a mailing database.

15. The method of claim 12 further comprising:

(f) performing transformative operations on at least some of the fields, and step (b) further comprises converting records in the source file to records in the target database using the field mappings and the transformative operations.

16. The method of claim 12 further comprising:

(f) selecting the data validator from a plurality of different data validators, wherein the selection is made based at least in part on the purpose of the target database.

* * * * *